(12) United States Patent
Miller et al.

(10) Patent No.: US 11,592,117 B2
(45) Date of Patent: *Feb. 28, 2023

(54) PIPE THAT IS FRICTION FORGE BONDED TO A LADDER SUPPORT THROUGH A STUD AND A BRACKET

(71) Applicant: Forge Tech, Inc., Kemah, TX (US)

(72) Inventors: Michael Lee Miller, Kemah, TX (US);
Daniel J. Rybicki, Kemah, TX (US);
Mathew A. Rybicki, Kemah, TX (US);
Lawrence J. Povse, Kemah, TX (US);
Kenneth R. Vejr, Kemah, TX (US);
Andre S. Todd, Kemah, TX (US);
John M. Griffin, Kemah, TX (US)

(73) Assignee: Forge Tech, Inc., Kemah, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/694,526

(22) Filed: Mar. 14, 2022

(65) Prior Publication Data

US 2022/0205550 A1 Jun. 30, 2022

Related U.S. Application Data

(63) Continuation of application No. 16/999,056, filed on Aug. 20, 2020, now Pat. No. 11,274,763, which is a
(Continued)

(51) Int. Cl.
*F16K 27/00* (2006.01)
*F16L 55/18* (2006.01)
(Continued)

(52) U.S. Cl.
CPC ............ *F16K 27/00* (2013.01); *B23K 20/122* (2013.01); *B23K 20/123* (2013.01); *B23P 6/00* (2013.01); *B23P 6/04* (2013.01); *F16K 41/00* (2013.01); *F16K 43/00* (2013.01); *F16L 23/165* (2013.01); *F16L 55/1683* (2013.01); *F16L 55/18* (2013.01); *F16M 13/00* (2013.01); *B23K 20/1285* (2013.01); *B23K 20/14* (2013.01); *F16L 3/00* (2013.01); *F16L 3/24* (2013.01); *F16L 55/168* (2013.01); *Y10T 29/49405* (2015.01); *Y10T 29/49407* (2015.01); *Y10T 29/49746* (2015.01); *Y10T 29/49826* (2015.01);
(Continued)

(58) Field of Classification Search
CPC ... F16L 59/135; F16L 3/00; F16L 3/22; F16L 3/14; F16L 3/24
USPC ........ 138/106, 107, 103, 177, 178; 248/126, 248/62, 68.1
See application file for complete search history.

(56) References Cited

U.S. PATENT DOCUMENTS 3,823,652 A * 7/1974 Lambert ............. F24F 13/0263
454/306
4,077,592 A * 3/1978 Forbes ................ F24F 13/0254
248/59
(Continued)

FOREIGN PATENT DOCUMENTS

CN 211058696 U * 7/2020

*Primary Examiner* — Patrick F Brinson
(74) *Attorney, Agent, or Firm* — Michael G. Smith, Esq.

(57) ABSTRACT

In some implementations, an apparatus comprises a pipe, a stud that is forge-welded to the pipe, creating a forge-welded stud, a bracket that is operably coupled to the forge-welded stud, and a ladder support operably coupled to the bracket.

15 Claims, 68 Drawing Sheets

Related U.S. Application Data continuation of application No. 16/174,162, filed on Oct. 29, 2018, now abandoned, which is a continuation of application No. 15/832,759, filed on Dec. 5, 2017, now Pat. No. 10,113,659, which is a continuation of application No. 15/187,776, filed on Jun. 20, 2016, now Pat. No. 9,835,262, and a continuation of application No. 13/918,956, filed on Jun. 15, 2013, now Pat. No. 9,371,951.

(60) Provisional application No. 61/835,563, filed on Jun. 15, 2013, provisional application No. 61/760,646, filed on Feb. 4, 2013.

(51) Int. Cl.
| | |
|---|---|
| *B23P 6/04* | (2006.01) |
| *F16K 41/00* | (2006.01) |
| *F16L 55/168* | (2006.01) |
| *F16M 13/00* | (2006.01) |
| *B23P 6/00* | (2006.01) |
| *F16K 43/00* | (2006.01) |
| *B23K 20/12* | (2006.01) |
| *F16L 23/16* | (2006.01) |
| *B23K 20/14* | (2006.01) |
| *F16L 3/00* | (2006.01) |
| *F16L 3/24* | (2006.01) |

(52) U.S. Cl.
CPC ...... *Y10T 137/0491* (2015.04); *Y10T 137/598* (2015.04); *Y10T 408/567* (2015.01)

(56) References Cited

U.S. PATENT DOCUMENTS

| | | | | |
|---|---|---|---|---|
| 5,429,330 | A * | 7/1995 | Bond | F16L 3/24 248/316.5 |
| 5,924,656 | A * | 7/1999 | Okada | F16L 3/00 248/58 |
| 6,029,774 | A * | 2/2000 | Cothern | E06C 7/188 182/214 |
| 6,962,237 | B2 * | 11/2005 | Underhill | E06C 7/48 248/238 |
| 2005/0230186 | A1 * | 10/2005 | Bigard | E06C 1/381 182/100 |
| 2008/0251316 | A1 * | 10/2008 | Libert | E06C 1/34 182/115 |
| 2010/0180533 | A1 * | 7/2010 | Spiegel | F03D 13/20 228/2.1 |
| 2010/0193060 | A1 * | 8/2010 | McCarthy | F16L 3/006 285/182 |
| 2011/0068232 | A1 * | 3/2011 | Streetman | F16L 3/24 248/58 |
| 2014/0000745 | A1 * | 1/2014 | Bednarz | F01N 13/1855 138/106 |
| 2022/0025702 | A1 * | 1/2022 | Hebert | E06C 7/082 |

\* cited by examiner

PRIOR ART

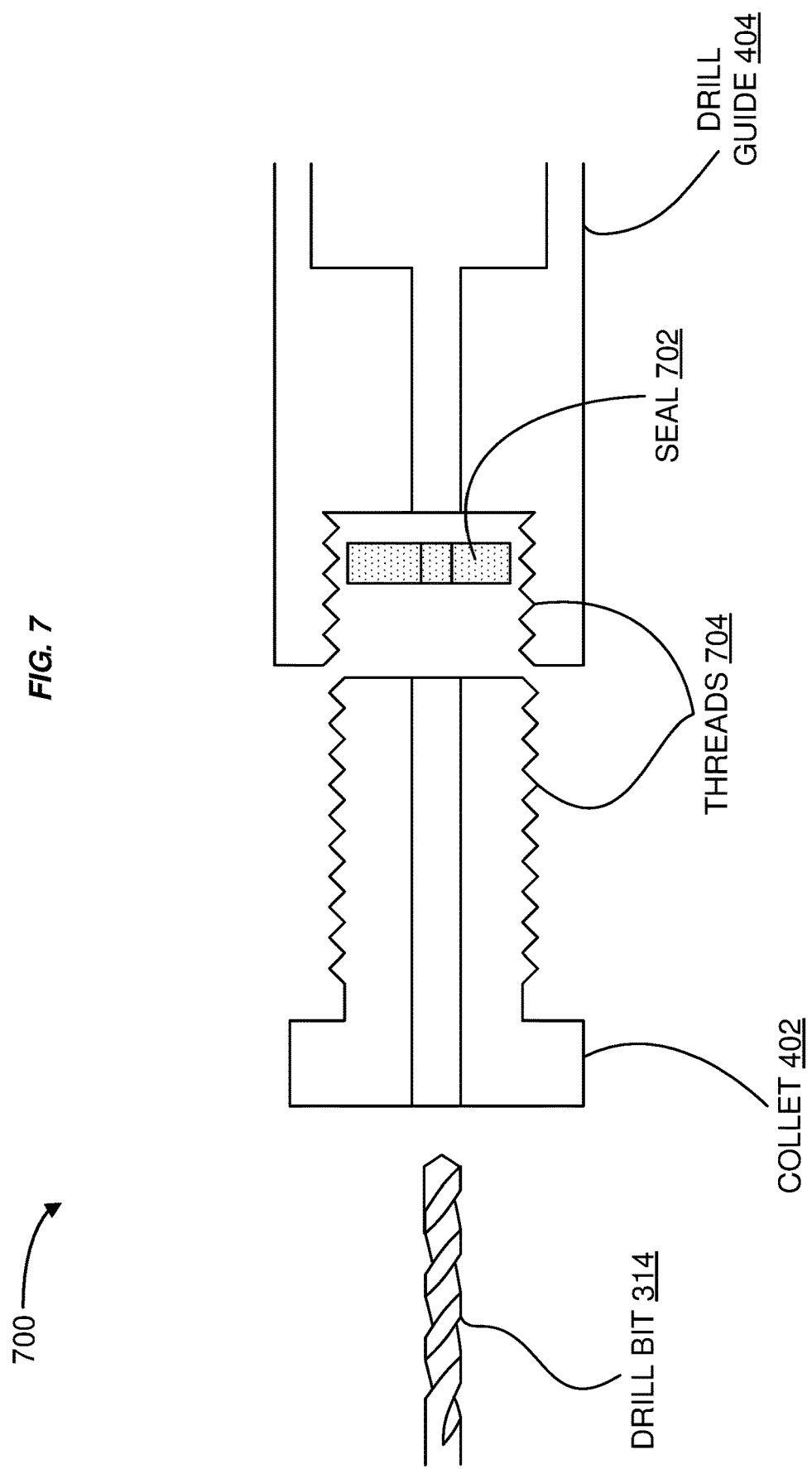

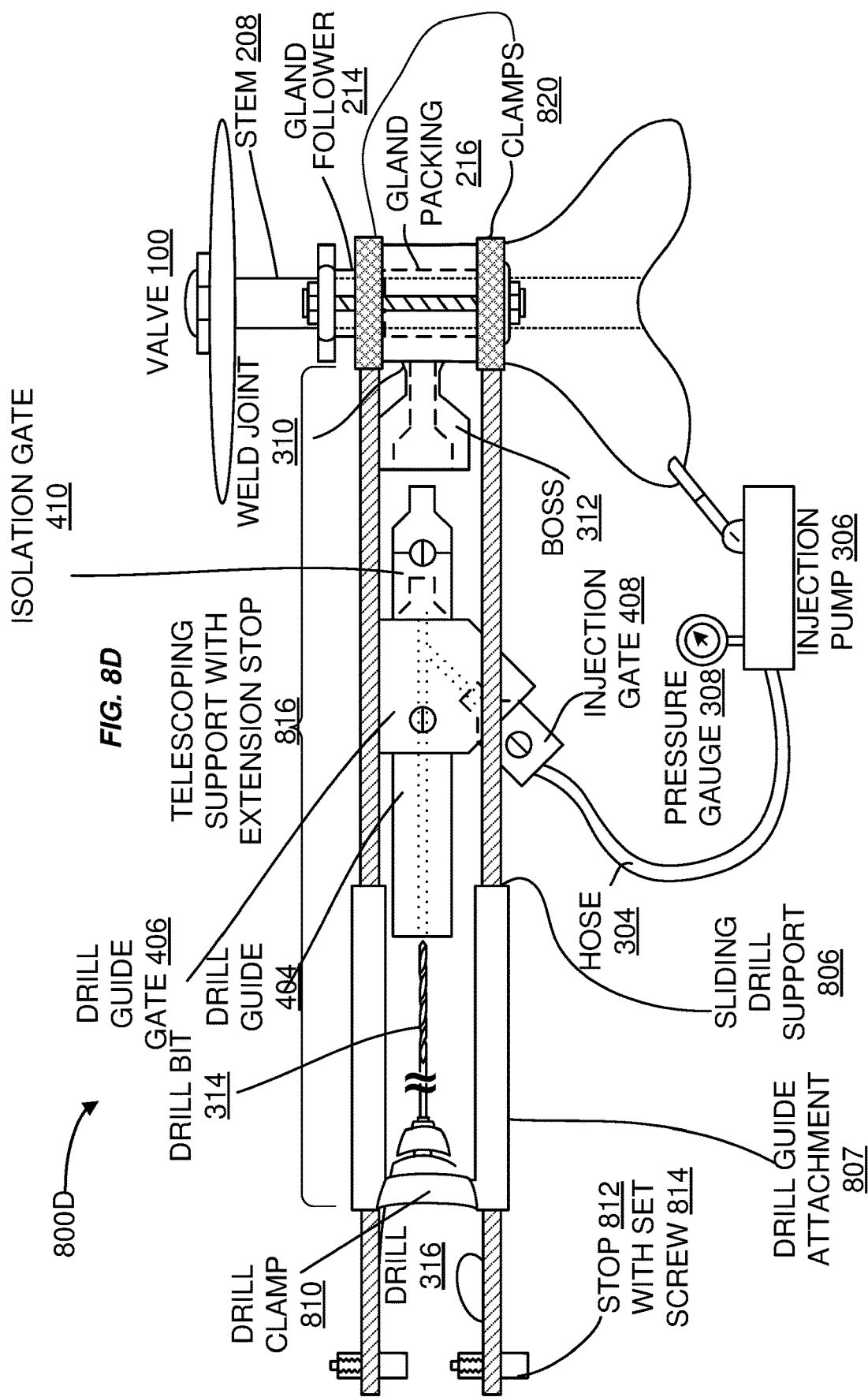

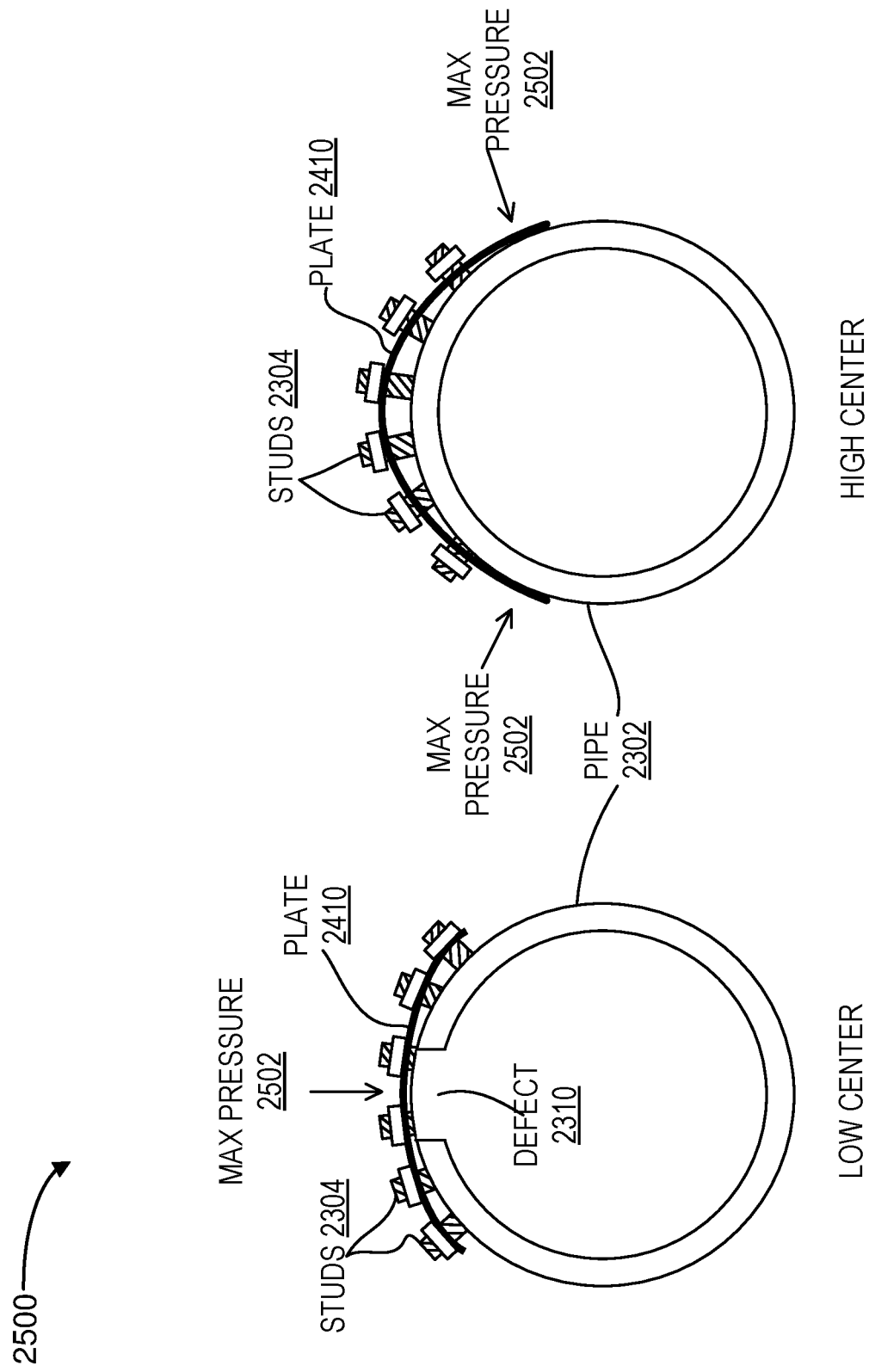

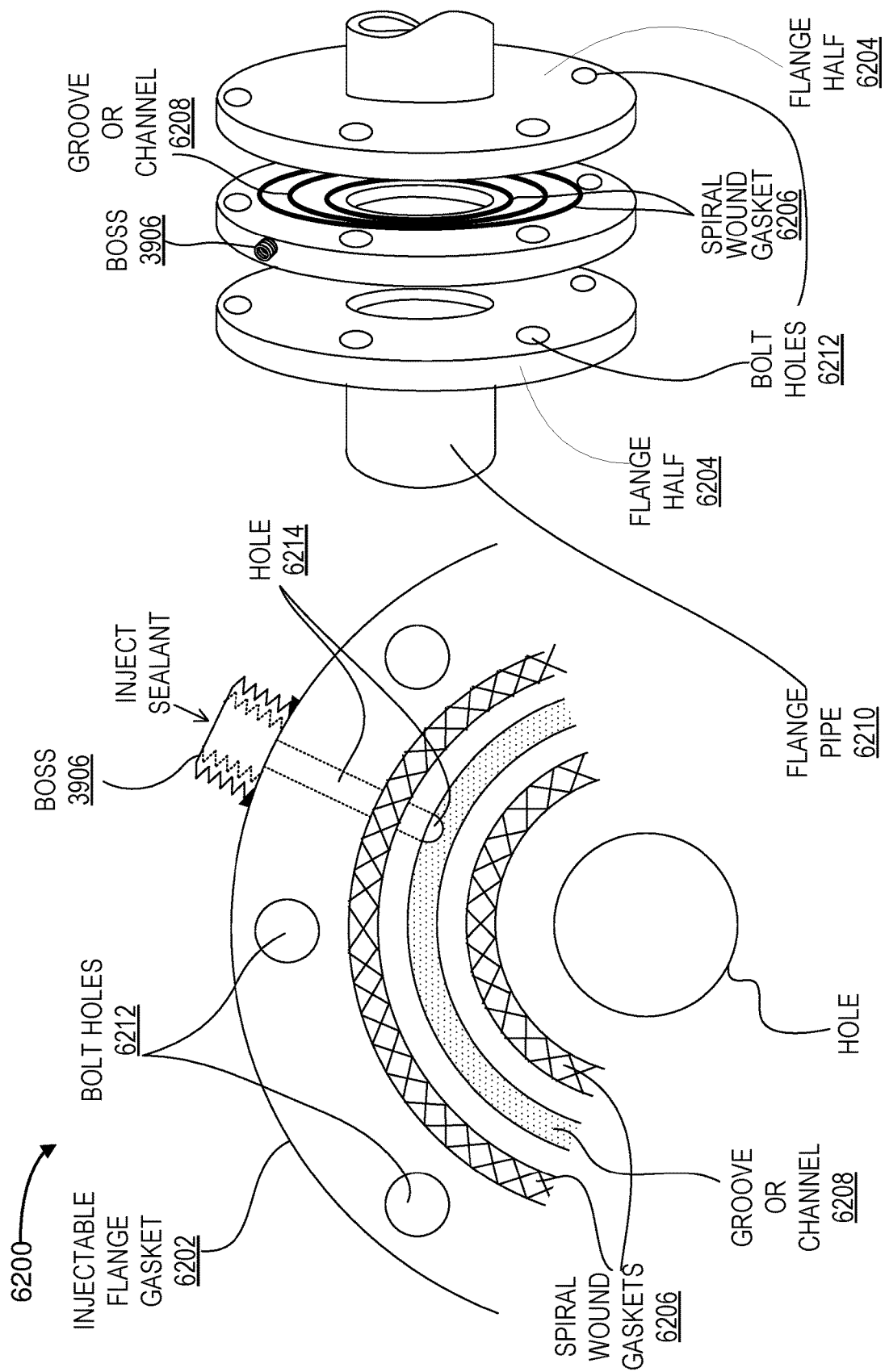

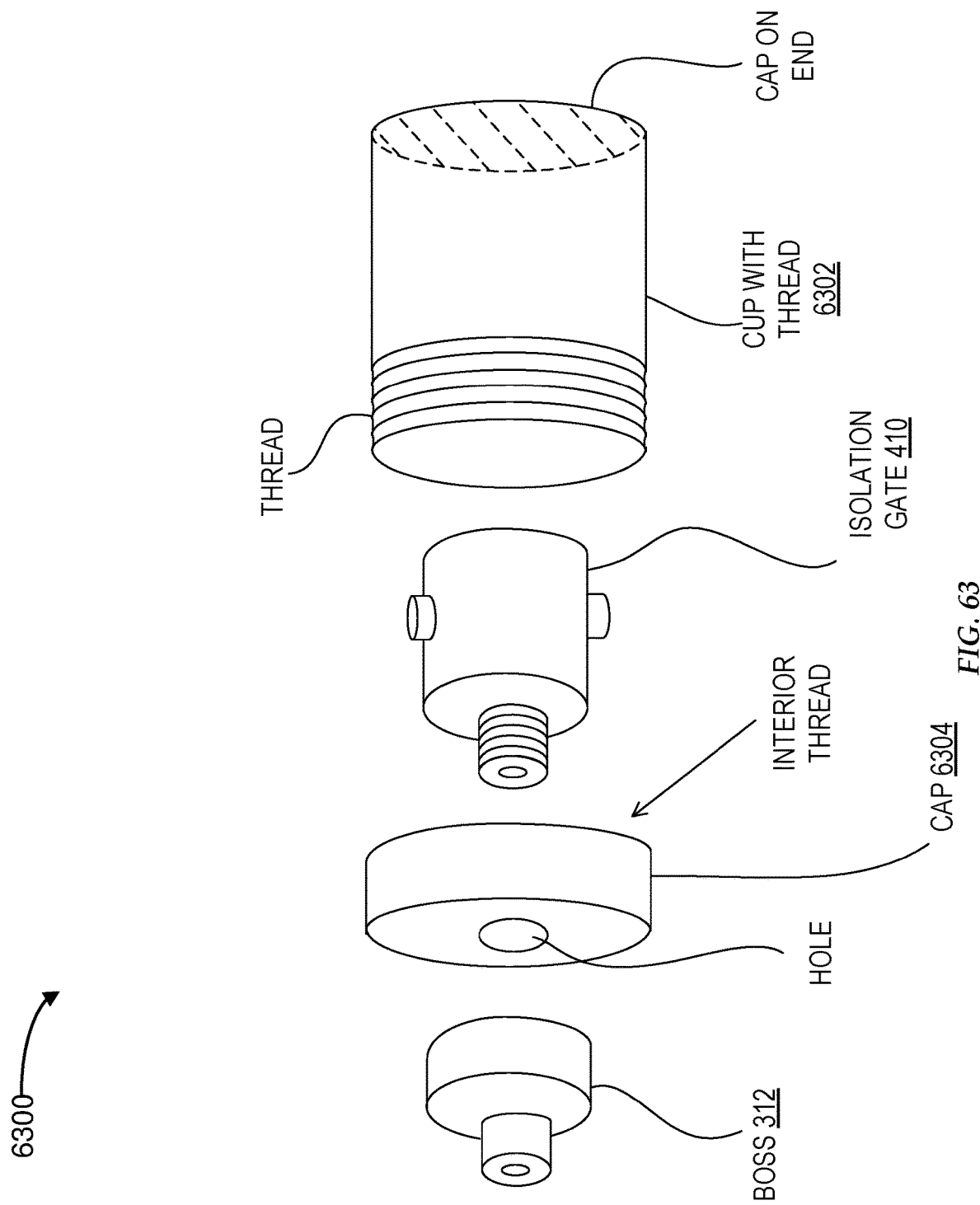

US 11,592,117 B2

PIPE THAT IS FRICTION FORGE BONDED TO A LADDER SUPPORT THROUGH A STUD AND A BRACKET

RELATED APPLICATIONS

This application is a continuation of, and claims the benefit and priority under 35 U.S.C. 120 of U.S. application Ser. No. 16/999,056 filed on 20 Aug. 2020, which is a continuation of, and claims the benefit and priority under 35 U.S.C. 120 of U.S. application Ser. No. 16/174,162 filed on 29 Oct. 2017, which is a continuation of, and claims the benefit and priority under 35 U.S.C. 120 of U.S. application Ser. No. 15/832,759 filed on 5 Dec. 2017 now patent Ser. No. 10/113,659 issued on 30 Oct. 2018 which is a continuation of, and claims the benefit and priority under 35 U.S.C. 120 of U.S. application Ser. No. 15/187,776 filed on 20 Jun. 2016 now U.S. Pat. No. 9,835,262 issued on 5 Dec. 2017 which is a continuation of, and claims the benefit and priority under 35 U.S.C. 120 of U.S. application Ser. No. 13/918,956 filed on 15 Jul. 2013 now U.S. Pat. No. 9,371,951 issued on 21 Jun. 2016, which is hereby incorporated by reference in its entirety, which claims the benefit of U.S. Provisional Application Ser. No. 61/760,646 filed 4 Feb. 2013 under 35 U.S.C. 119(e), which also claims the benefit of U.S. Provisional Application Ser. No. 61/835,563 filed 15 Jun. 2013 under 35 U.S.C. 119(e).

FIELD

The present disclosure generally relates to repair of valves, pipes and pipe components and more specifically relates to techniques and apparatus of repair of valves, pipes and pipe components.

BACKGROUND

Millions of miles of piping and millions of control valves are installed throughout the world. These valves control the flow of fluids and gas through pipes that route chemicals through refineries, storage facilities, underground, marine vessels and space. Pipes need repair and sometimes feature enhancements such as electric terminals for cathodic protection or mechanical fasteners for stairs, ladders and walkways. Valves are mechanical devices with moving parts. The moving parts wear out or corrode over time, causing leaks. With aging equipment fighting increased clean air, water and soil standards, the need for valve, pipe and pipe component repair is growing rapidly.

Many pipes, valves and pipe components contain chemicals that are volatile or caustic with unsafe leakage levels measured in parts per million (ppm). Not only are these chemicals hazardous to the environment, but also to the technicians who are repairing them.

When a valve begins to leak in a refinery, the refinery must be taken out of service, costing millions of dollars a day or the valve leak needs to be repaired while it is in-service. To do this, petrochemical service technicians, drill a hole partially through the valve housing near the gland packing, thread this hole and then screw on a fitting that will eventually allow drilling and injecting new sealant. This threading process is fraught with problems. First, if the technician drills too deep into the bell housing, he could be exposed to hazardous chemicals threatening his life. In addition, once the fitting is attached to the thin wall of the housing, it is secured by only a few threads. This makes the fitting subject to breakage in the harsh physical environment of a refinery. In addition, threads can become a point of leakage as corrosion and mechanical vibration weaken the connection. During the process of injecting new sealant into the valve, existing injection processes allow hazardous material to escape into the environment, exposing the repair technician to hazardous chemicals and violating ever tightening EPA rules.

In the past, if a fastener such as a stud, boss, nut, pin, screw, hinge, fitting, lever or clamp were attached to a pipe or valve, arc, MIG, TIG welding, GMAW, GTAW, FCAW or SMAW or oxy-acetylene torch brazing was utilized. Because of the high temperatures and sparks associate with these welding processes, they cannot be used in hazardous environments.

BRIEF DESCRIPTION OF THE DRAWINGS

It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the drawings presented herein, in which:

FIG. 7 is cross section exploded view of a collet and drill guide, according to an implementation;

FIG. 8D is a complete system of FIG. 3 with the inclusion of drill guide attachments, according to an implementation;

FIGS. 25A and 25B are cross section diagrams of a plate that is pre-warped to mismatch the curvature of a pipe, according to an implementation;

FIG. 62A is a cross section view of an injectable flange gasket, according to an implementation;

FIG. 62B is an isometric view of an injectable flange gasket, according to an implementation;

FIG. 63 is an isometric view of a threaded cup containment device for adding a backup seal for the isolation gate, according to an implementation;

DETAILED DESCRIPTION OF THE DRAWINGS

The detailed description below describes methods and apparatus for repairing and sealing of valves, pipes and pipe components.

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily limit any of the various claimed inventions. To the contrary, the description of the exemplary embodiments are intended to cover alternative, modifications, and equivalents as may be included within the spirit and scope of the invention as defined by the claims. Moreover, some statements may apply to some inventive features but not to others.

Figure 1:
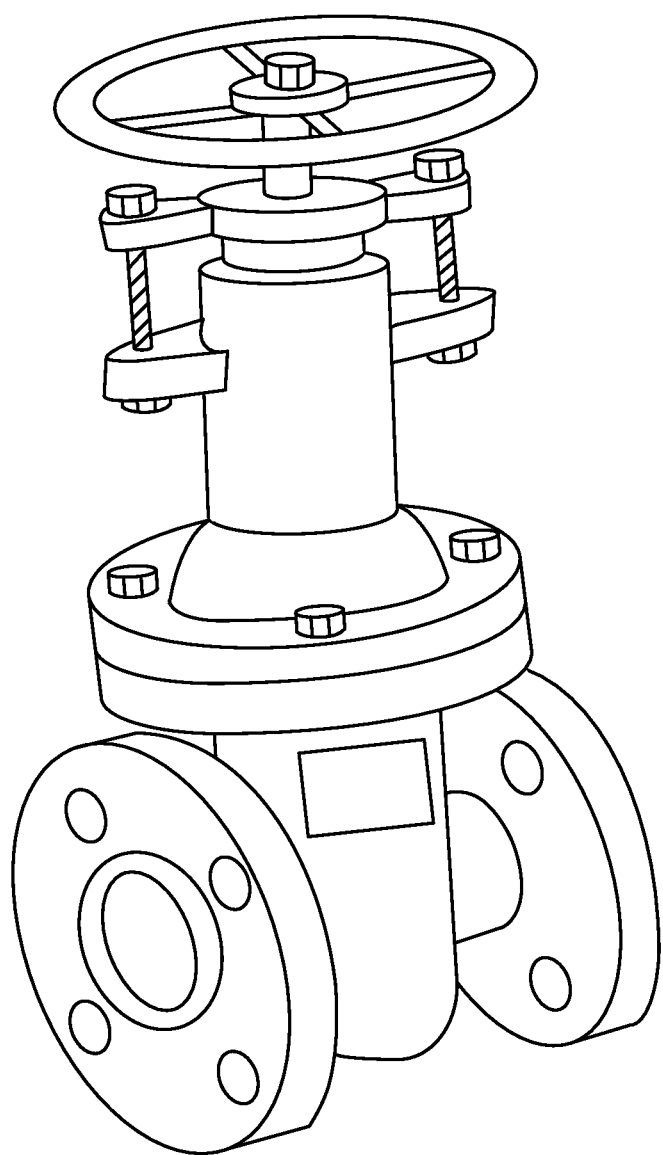
FIG. 1 is an isometric diagram of a conventional gate valve, according to an implementation.

FIG. 1 is an isometric diagram of a valve 100, according to an implementation. Valve 100 is used in refineries, factories, public utilities, maritime, office buildings, pharmaceuticals, food processing, pipeline transportation and storage, offshore, mining, power and many other areas. In some implementations the valve 100 is a conventional gate valve.

Figure 2:
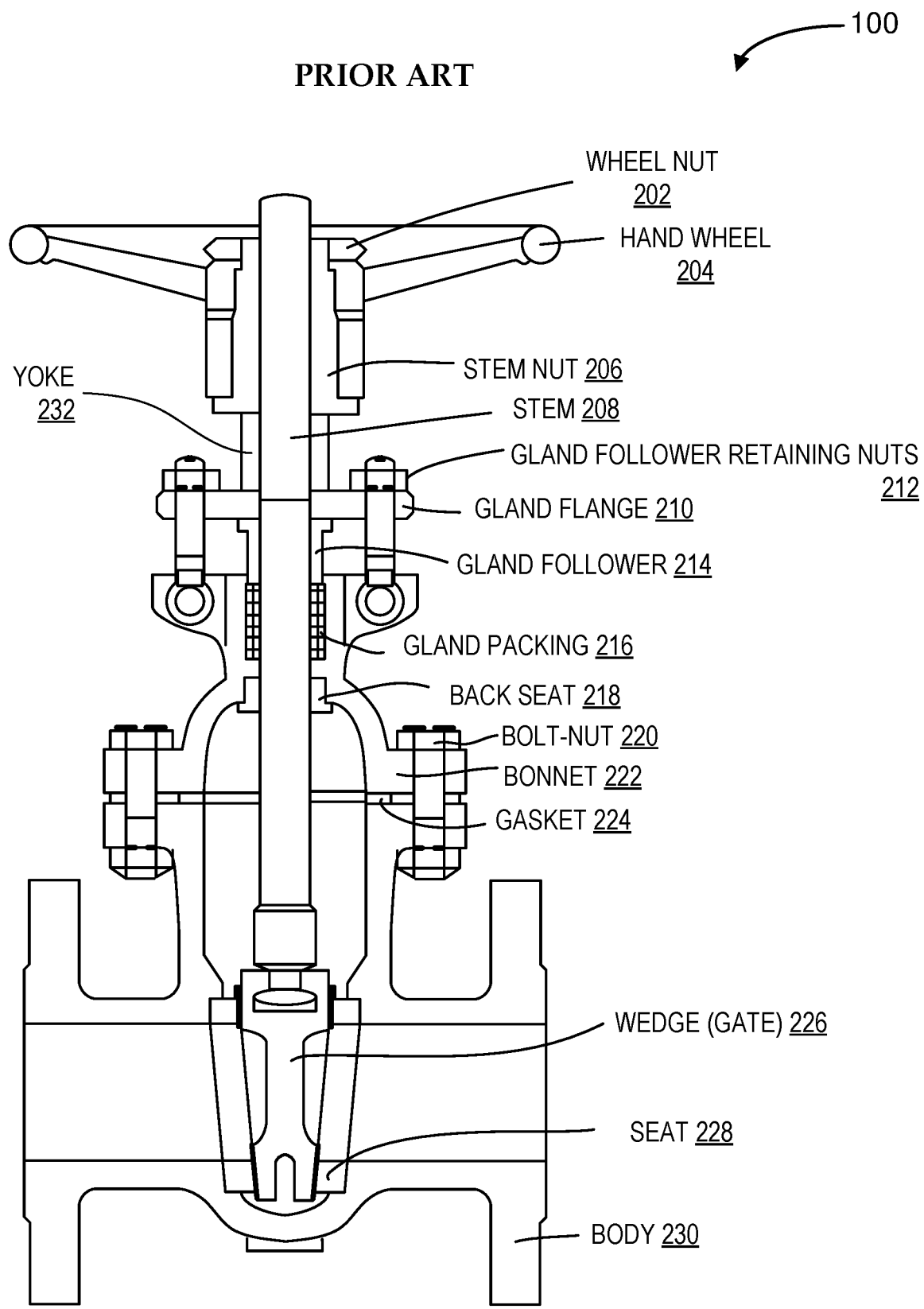
FIG. 2 is a cross section diagram of the gate valve in FIG. 1, according to an implementation.

FIG. 2 is a cross section diagram of the valve 100 in FIG. 1, according to an implementation. The portions referenced in the disclosure are the gland packing 216, gland follower 214, stem 208 and the gland follower retaining nuts 212. The gland packing 216 seals the stem 208 from leakage and the gland follower 214 compresses the gland packing 216 when the gland follower retaining nuts 212 are tightened.

Valve 100 includes a wheel nut 202 that is operably coupled to a hand wheel 204 and a stem nut 206. The stem nut 206 is operably coupled to a stem 208. The stem 208 is operably coupled to a gland flange 210 and the gland flange 210 is operably coupled to gland follower retaining nuts 212. The gland flange 210 is operably coupled to a gland follower 214. Gland follower 214 is operably coupled to a gland packing 216. The gland packing 216 is operably coupled to a back seat 218. The back seat 218 is operably coupled to a bolt-nut 220. The bolt-nut 220 is operably coupled to a bonnet 222. The bonnet 222 is operably coupled to gasket 224. The gasket 224 is operably coupled to a wedge (gate) 226. The wedge (gate) 226 is operably coupled to a valve seat 228. The valve seat 228 is operably coupled to a body 230.

In some gate valves, stem 208 will have a partial outer thread (not shown in FIG. 2) and a yoke 232 and/or stem nut 206 will have an inner thread (not shown in FIG. 2). When hand wheel 204 is rotated, the threads are activated and the stem places an upward or downward force on the wedge (gate) 226 to open or close the valve.

Figure 3:
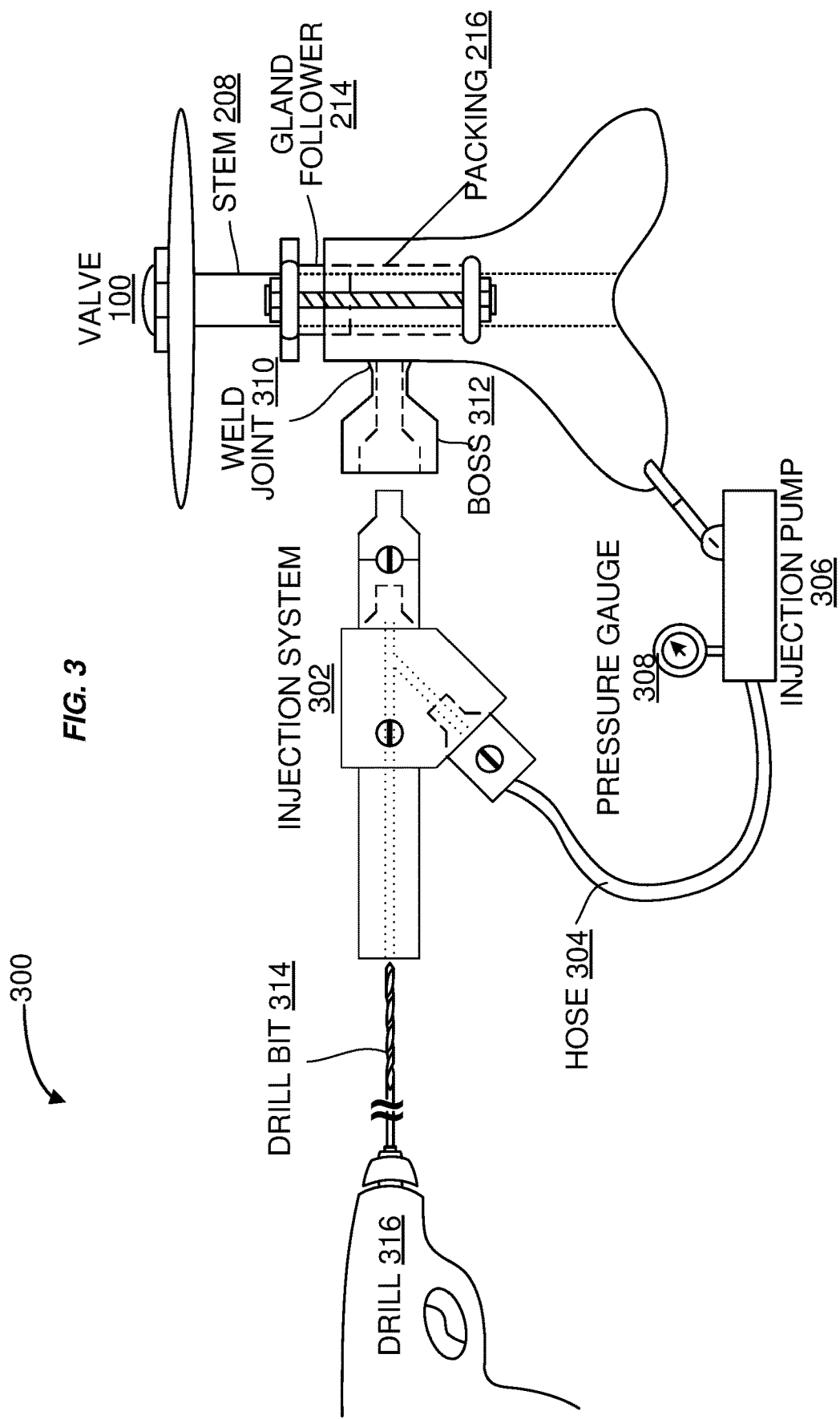
FIG. 3 is a complete repair system with the injection system aligned with a valve, according to an implementation.

FIG. 3 is a system 300 with an injection system that is aligned with a valve, according to an implementation. System 300 includes injection system 302. The injection system 302 is operably coupled to a hose 304. The hose 304 is operably coupled to an injection pump 306. The injection jump 306 has a pressure gauge 308. System 300 includes a valve 100, the valve 100 includes a stem 208, gland follower 214, a gland packing 216, a weld joint 310, and a boss 312. A drill bit 314 of a drill 316 enters the injection system 302. In system 300, the boss 312 is attached to the valve 100. The injection pump 306, the drill 316 and the drill bit 314 combined with the injection system 302 complete the repair system. Subsequent figures demonstrate the use of the system 300 for repairing valves without the release of hazardous chemicals from the valve 100 into the atmosphere.

Figure 4:
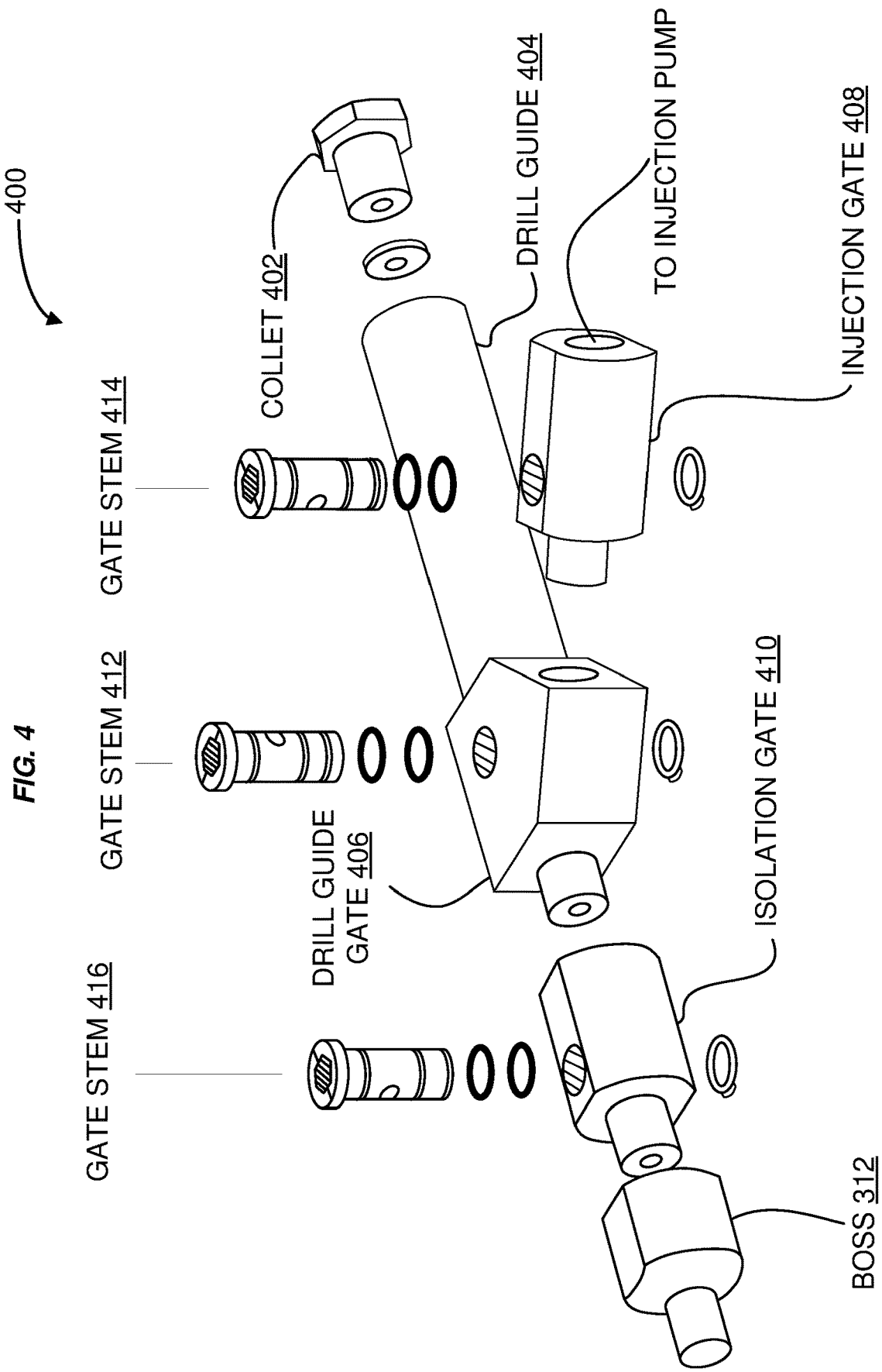
FIG. 4 is an exploded isometric view of an injection system, according to an implementation.

FIG. 4 is an exploded isometric view of an injection system 400, according to an implementation. Injection system 400 is one implementation of injection system 302 in FIG. 3. Three gates 406, 408 and 410 are used to route the flow of sealant under pressure throughout the injection system 400. O-rings provide a seal for each gate. A collet 402 is used to seal the opening when a drill bit is inserted. The isolation gate 410, the injection gate 408 and the drill guide 404 are threaded for assembly purposes. Clip rings hold the isolation gate 410 in place and allow them to rotate freely.

The collet 402 is operably coupled to a drill guide 404. The drill guide 404 is operably coupled to a drill guide gate 406. The drill guide gate 406 is operably coupled to an injection gate 408 and to an isolation gate 410. The isolation gate 410 is operably coupled to a boss 312. The drill guide gate 406 includes a gate stem 412. The injection gate 408 includes a gate stem 414. The isolation gate 410 includes a gate stem 416.

The boss 312 can be attached using friction forge bonding or any other attachment apparatus that eliminates possible ignition sources. The injection system 400 is maintained under pressure during a portion of the drilling process, so that when the drill bit 314 penetrates the valve 100, hazardous chemicals or other materials are contained inside the valve 100 or inside injection system 302, which provides valve repair with zero hazardous emissions, but also zero emissions of any type. The drill bit 314 to collet seal plus all three gates 406, 408 and 410 are sealed with sealant, preventing any possible leakage, which provides valve repair with zero emissions.

In some implementations, the injection system is pressure tested before drilling through a wall of the valve 100. During this testing, much higher pressures that what is typically needed to maintain positive pressure (about 3,000 to 5,000 psi) can be used to test the boss-to-valve attachment. This pressure testing serves to seal the gates 406, 408 and 410 and collet 402 as well. Also, injection system 400 takes fewer steps to test than conventional systems, which provides valve repair with zero emissions. The isolation gate 410 can be rotationally oriented for convenience and clearance and is more compact than the conventional systems. To inject the valve 100 after a first injection into valve 100, the injection system 400 is not needed; instead a pressure pump can be attached to the isolation gate 410 and re-injection performed through the isolation gate 410. If the isolation gate 410 freezes closed due to corrosion or damage, the frozen isolation gate 410 can be replaced with a new isolation gate 410 or a new isolation gate 410 can be screwed into the frozen isolation gate 410 and the frozen isolation gate 410 can be drilled through.

Figure 5:
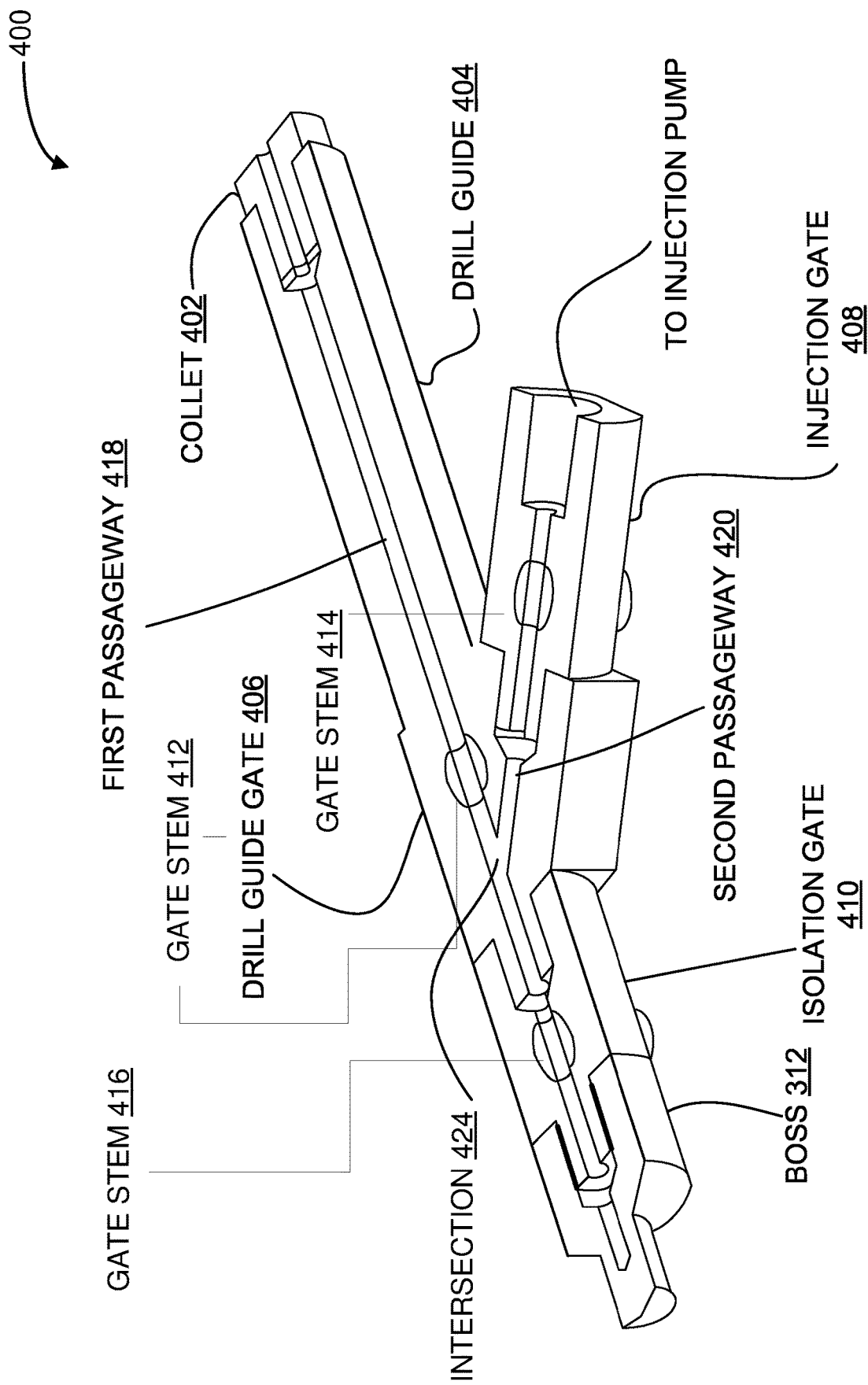
FIG. 5 is a cross sectional isometric view of the injection system shown in FIG. 4, according to an implementation.

FIG. 5 is a cross sectional isometric view of the injection system 400 shown in FIG. 4, according to an implementation. The injection system 400 includes a drill guide gate 406, an isolation gate 410 attached to the drill guide 404 and an injection gate 408 attached to the drill guide 404. An end of the drill guide 404 is not attached to the isolation gate 410. The end includes a collet 402. In some implementations of the injection system 400, the drill guide gate 406 includes a junction having a first passageway 418 and a second passageway 420, the second passageway 420 intersecting the first passageway 418 at an intersection 424, each of the passageways having a first end and a second end. In some implementations of the injection system 400, the first passageway 418 includes a first gate stem 412 in which the first gate stem 412 is positioned between the second end of the first passageway 418 and the intersection 424. In some implementations of the injection system 400, the second passageway 420 includes a second gate stem 414 in which the second gate stem 414 is positioned between a second end of the second passageway 420 and the intersection 424. In some implementations of the injection system 400, the first end of the first passageway 418 has a complimentary interface to the isolation gate 410. In some implementations of the injection system 400, the second end of the second passageway 420 has a complimentary interface to the injection gate 408. In some implementations of the injection system 400 (not shown), the first passageway 418 includes a gate stem 412 between the second end of the second passageway 420 and the intersection 424. In some implementations of the injection system 400, the drill guide gate 406 is attached to the isolation gate 410 and the injection gate 408 through complimentary male-female interfaces. In some implementations of the injection system 400, the drill guide gate 406 is attached to the isolation gate 410 and the injection gate 408 through threaded interfaces. In some implementations of the injection system 400, each of the drill guide gate 406, the isolation gate 410 and the injection gate 408 includes a gate stem. In some implementations of the injection system 400, the drill guide gate 406 includes a gate stem 412. In some implementations of the injection system 400, the isolation gate 410 includes a gate stem 416. In some implementations of the injection system 400, the injection gate 408 includes a gate stem 414.

Figure 6:
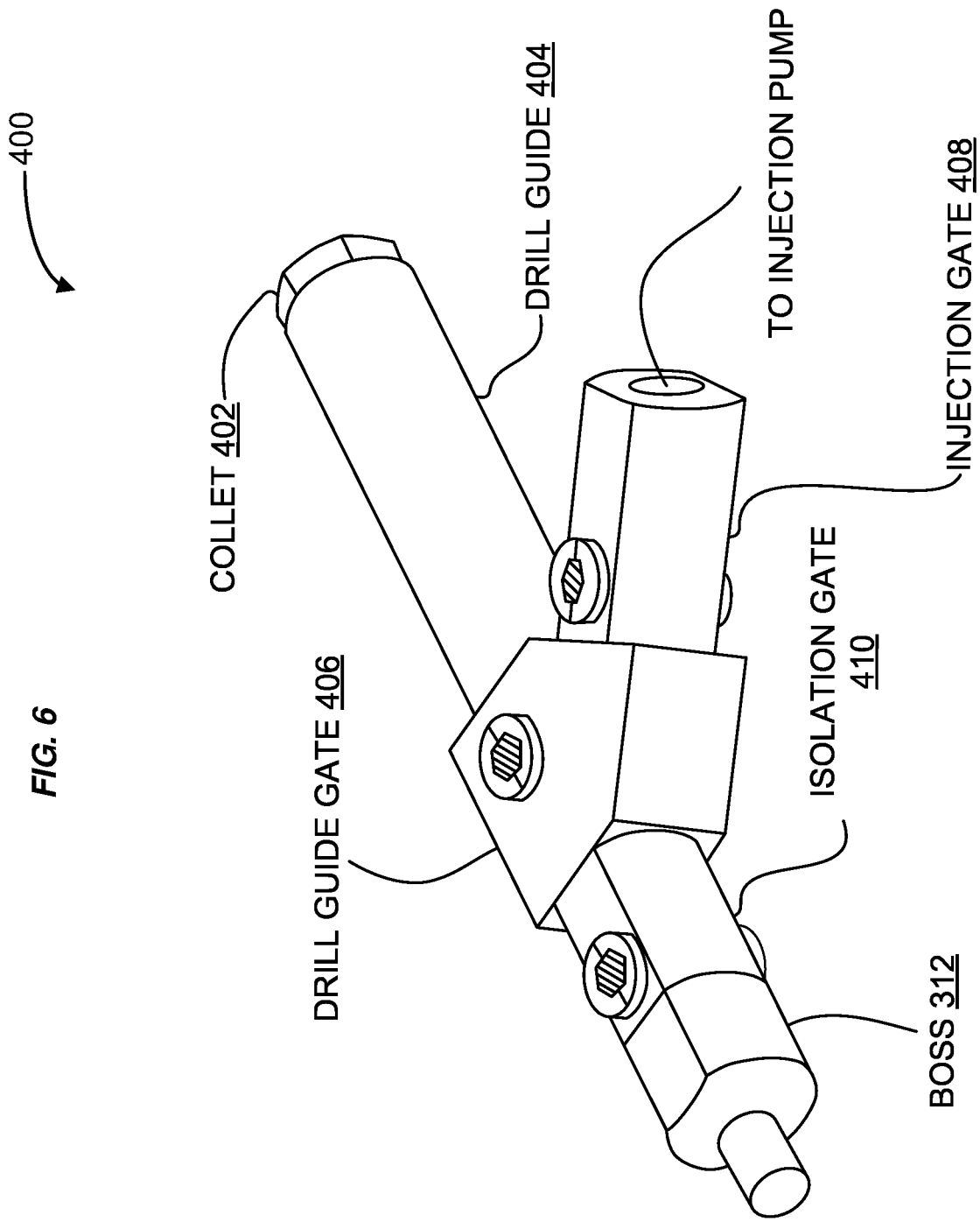
FIG. 6 is an assembled isometric view of the injection system show in FIG. 4, according to an implementation.

FIG. 6 is an isometric view of an assembled injection system 400 of FIG. 4, according to an implementation. The position of the gates can be controlled by a hex wrench. The collet 402 is operably coupled to a drill guide 404. The drill guide 404 is operably coupled to a drill guide gate 406. The drill guide gate 406 is operably coupled to an injection gate 408 and to an isolation gate 410. The isolation gate 410 is operably coupled to a boss 312.

FIG. 7 is cross section exploded view 700 of a collet and drill guide, according to an implementation. A seal 702, a threaded collet 402 and a drill bit 314 are all shown. After the drill bit 314 is inserted into the collet 402, through the seal 702 and into the drill guide 404, the collet 402 is screwed into the drill guide 404 with the threads 704. Tightening the collet 402 against the seal 702 compresses the seal 702 around the drill bit 314. The seal 702 prevents sealant from leaking past the drill bit 314. If pressure in the drill guide 404 is too large, however, the drill bit 314 can be forced out of the collet 402. FIG. 7 includes a collet 402 that is operably coupled to seal 702 and a thread 704. The drill bit 314 is inserted into a collet 402 and a seal 702, and a drill guide 404.

Figure 8A:
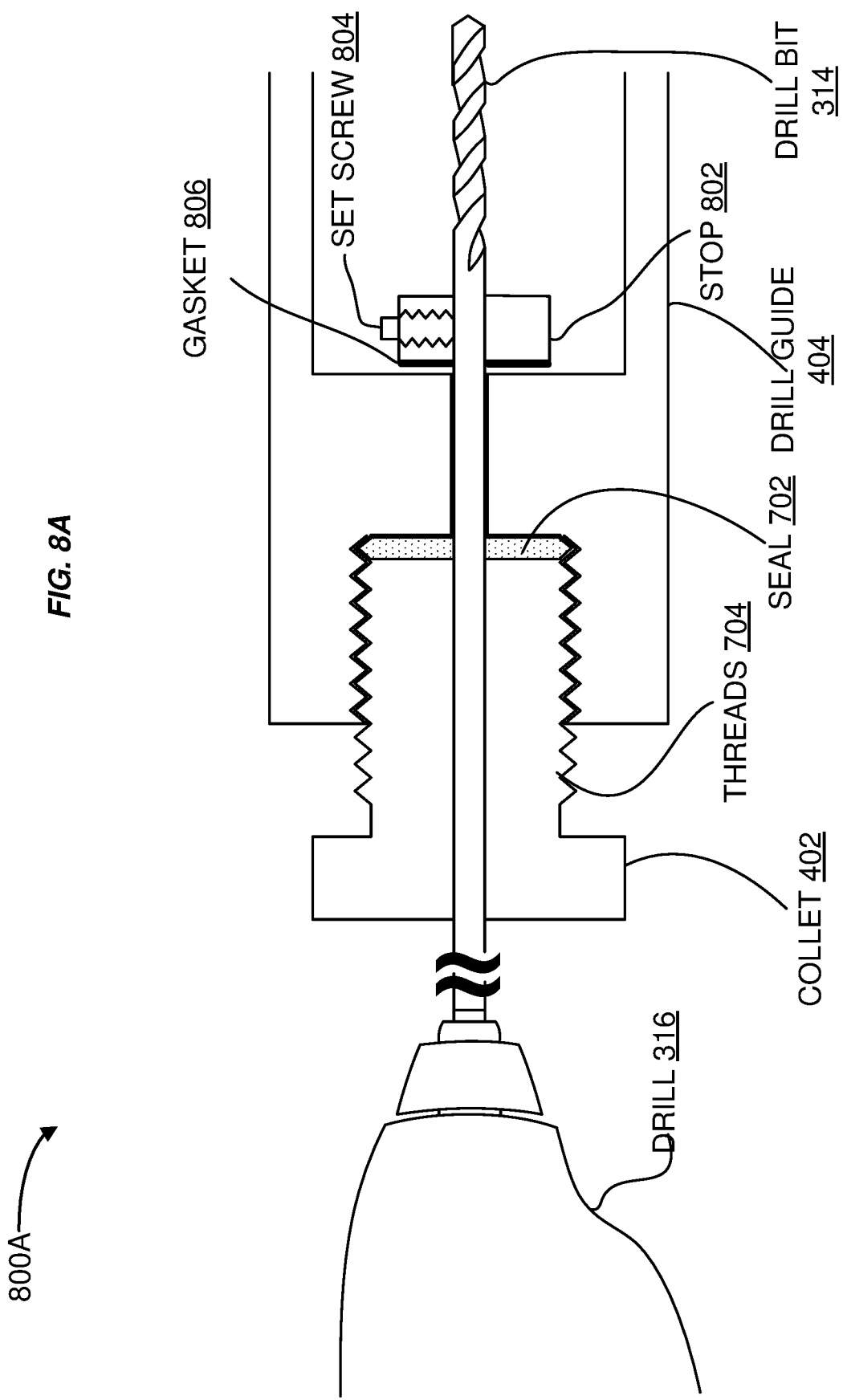
FIG. 8A-8C are cross sectional views of a collet sealing the drill bit, according to an implementation.
Figure 8B:
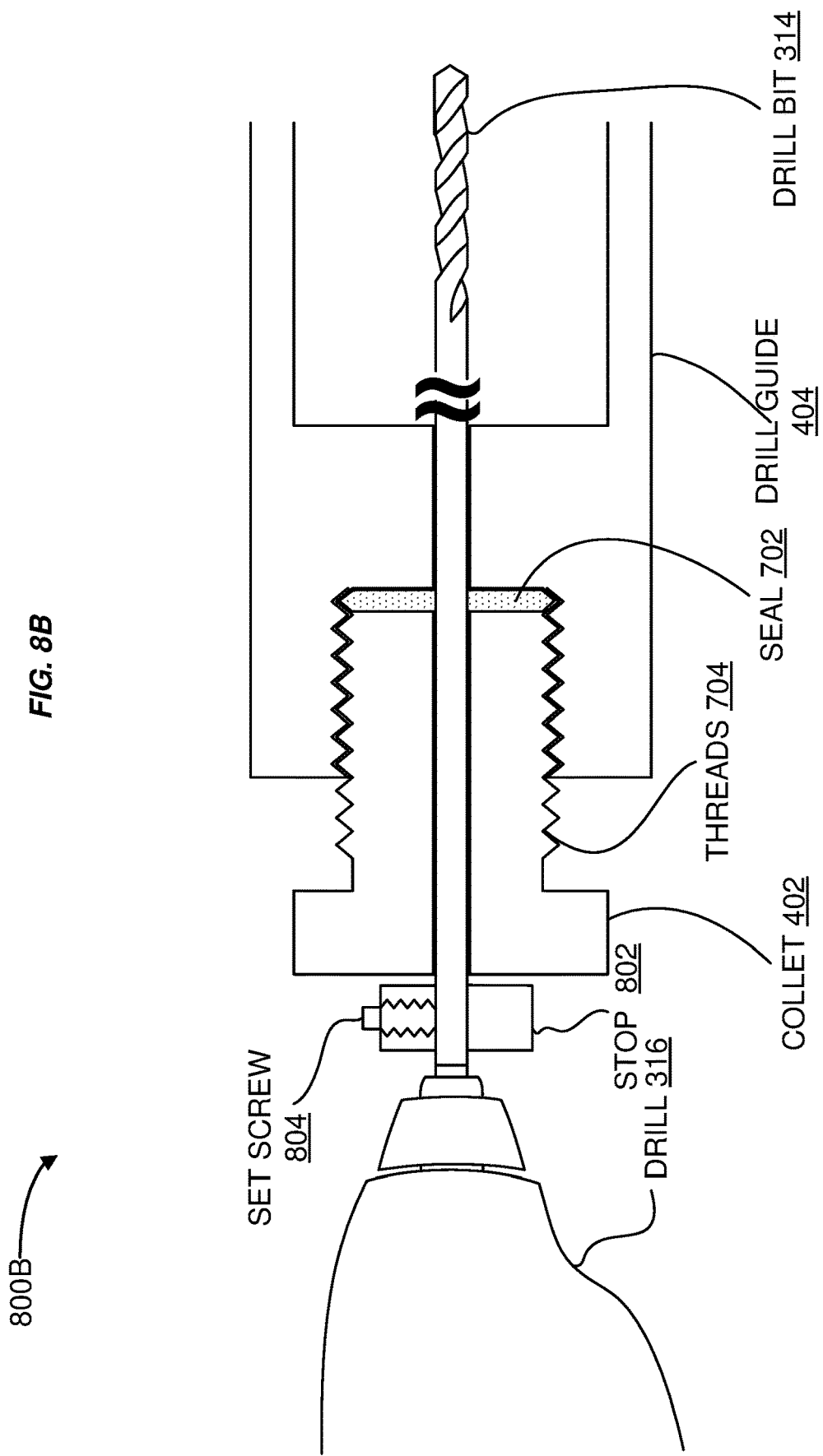
Figure 8C:
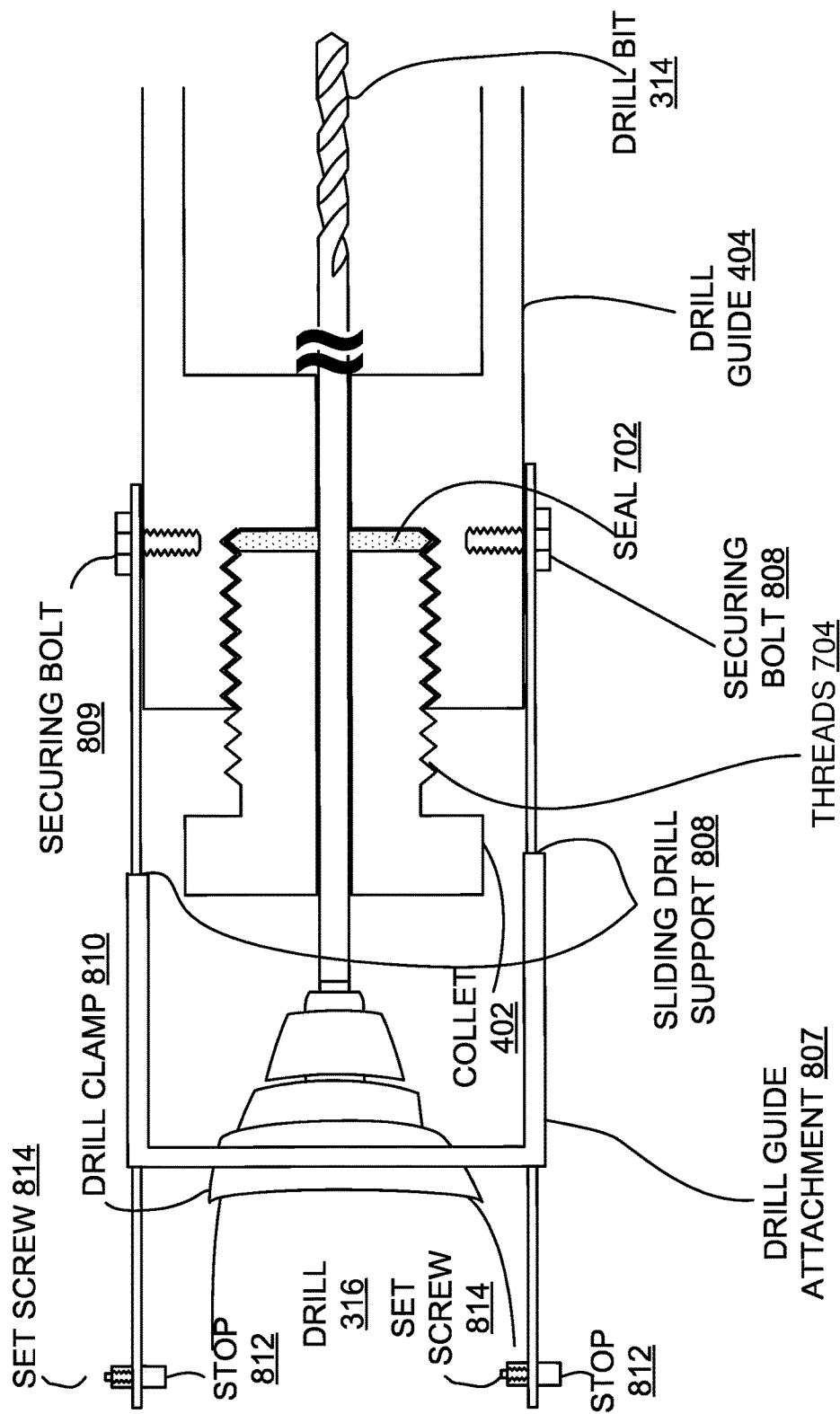

FIG. 8A-8C are cross sectional views 800A, 800B and 800C of a collet sealing the drill bit, according to an implementation. In addition to the collet in FIG. 7, a stop is attached to the drill bit to prevent pressure from forcing the drill bit out of the drill guide 404.

FIG. 8A includes a collet 402 that has threads 704 and that is operably coupled to a seal 702. The drill bit 314 is inserted into the collet 402 and the seal 702, and a drill guide 404. A stop 802 having a set screw 804 and a gasket 806 is operably coupled to the drill bit 314 on the opposite side of the collet 402 from the drill 316.

FIG. 8B includes a collet 402 that has threads 704 and that is operably coupled to a seal 702. The drill bit 314 is inserted into the collet 402 and the seal 702, and a drill guide 404. A stop 802 having a set screw 804 is operably coupled to the drill bit 314 between the collet 402 and the drill 316.

FIG. 8C includes a collet 402 that has threads 704 and that is operably coupled to a seal 702. A sliding drill support 808 having a drill guide attachment 807 is fixedly attached to a drill guide 404 by securing bolts 808. A drill clamp 810 is operably coupled to the sliding drill support 808 and the drill guide attachment 807. The drill bit 314 is inserted into the drill clamp 810, the sliding drill support 806, the collet 402 and the seal 702, and the drill guide 404. The sliding drill support 808 also includes stops 812 and set screws 814.

FIG. 8D is system 800D of FIG. 3 with the inclusion of drill guide attachments, according to an implementation. FIG. 8D includes a telescoping support with extension stop 816 that is fixedly attached to a valve 100. A drill clamp 810 is operably coupled to the drill guide attachment 807. A drill guide attachment 807 is a sliding drill support 808 and the drill guide attachment 807 is a part of the telescoping support with extension stop 816. A drill clamp 810 is operably coupled to the telescoping support with extension stop 816. The drill bit 314 is inserted into the drill clamp 810, the drill guide attachment 807 and telescoping support with extension stop 816 in the injection system 302. The telescoping support with extension stop 816 also includes stops 812 and set screws 814. The injection system 302 is operably coupled to a hose 304. The hose 304 is operably coupled to an injection pump 306. The injection jump has a pressure gauge 308. FIG. 8D includes a valve 100. The valve 100 includes a stem 208, gland follower 214, a gland packing 216, a weld joint 310, and a boss 312. The telescoping support with extension stop 816 is attached to the valve 100 by clamps 820.

In one example of operating the system 800D, the boss 312 is attached through friction bonding to the valve 100 in line with or near the gland packing 216, creating the weld joint 310. The boss can be attached using any type of non-ignition, non-penetrating bonding technique such as: friction welding, inertia welding, ultrasonic bonding, cold bonding, diffusion welding, adhesives or any other attachment apparatus for metal. The packing material used within gland packing 216 is a soft yet firm, rope-like material that seals chemicals inside the valve 100 from leaking out. The weld joint 310 can be tested for strength with a torque wrench. The isolation gate 410 is screwed into the threaded end of the boss 312 and the drill guide 404 is screwed into the isolation gate 410. The drill guide gate 406 is part of drill guide 404. The injection gate 408 is then screwed into the drill guide 404 and the hose 304 is screwed into the injection gate 408. The injection pump 306 is attached to hose 304. The injection gate 408 is opened and the isolation gate 410 and the drill guide gate 406 are closed. The injection system 302 is injected with sealant at a high pressure between 3,000 psi and 5,000 psi to seal all three gates 406, 408 and 410 and any joints from leakage. The pressure is held to verify that the injection system 302 is leak free. Subsequently, the isolation gate 410 is opened. Under high pressure from the injection pump 306, sealant is injected through the isolation gate 410 and into the boss 312. This pressurizes the injection system 302 and tests the quality of injection system 302, including the weld joint 310 and the boss 312, before drilling into the valve 100. In another implementation, the two injection actions can be combined into one action and the isolation gate is opened before the two injection actions. Thereafter, the injection gate 408 is closed, stopping the flow of sealant into the injection system 302. The drill bit 314 is inserted into the drill guide 404 until the drill bit 314 makes contact with the drill guide gate 406. The collet 402 (not shown in FIG. 8D) is tightened around the drill bit 314 to provide a seal and the drill guide gate 406 is opened. At this time, a small amount of sealant backs up into drill guide 404 causing pressure in injection system 302 to drop. Through use of a non-sparking pneumatic drill 316, the drill bit 314 is used to drill through the sealant until the drill bit 314 enters the boss 312. The drilling continues until the drill bit 314 penetrates the wall of the valve 100 into or near gland packing 216. During the drilling process, metal shavings and sealant particles are created and deposited in the space between the drill guide gate 406 and the collet 402 (not shown in FIG. 8D). Also, at the moment that drill bit 314 penetrates the wall of valve 100, pressure inside valve 100 may cause chemicals to enter injection system 302. Before the drill bit 314 is withdrawn from valve 100, injection gate 408 is opened and sealant is released into the injection system 302 to increase the pressure in injection system 302 to be greater than or equal to the pressure in valve 100. This prevents further chemical release from the valve. The drill bit 314 is then withdrawn to a point just past the drill guide gate 406. The drill guide gate 406 is then closed. As the drill bit 314 is withdrawn from valve 100, sealant passing through injection gate 408 fills the void left by the drill bit 314. Injection gate 408 can be used to increase or decrease the flow of sealant into the void left behind in the sealant as the drill bit 314 is withdrawn. No chemicals are released from the valve 100 or the injection system 302 into the environment, because of the positive pressure (equal to or slightly greater than the pressure in valve 100) in injection system 302. Because the positive pressure prevents any hazardous chemicals from escaping from valve 100 into the atmosphere repair technicians remain safe. An expansion region is created in gland packing 216 by loosening the gland follower retaining nuts 212 (see FIG. 2). New pliable sealant is injected into gland packing 216 by opening the injection gate 408 and using injection pump 306. During this injection process, chemicals that have entered the injection system 302 are forced back into valve 100 where they came from. Also, some of the metal shavings and sealant particles may be forced into valve 100, but these shavings and particles are small enough to not create a problem. Once a sufficient amount of sealant is injected into the valve 100 the isolation gate 410 is closed. Pressure is then relieved from the injection pump 306 and the drill guide 404 is removed from the injection system 302. The isolation gate 410 is left attached to the boss 312 in the closed position, to maintain a seal for the drill hole made by the drill bit in the valve 100. The gland follower retaining nuts are retightened to apply pressure to gland packing 216 to ensure a seal on the valve 100. System 800D improves repair technician safety during valve and pipe repair by eliminating hazardous chemical emission from inside the valve 100 or from the injection system 302. System 800D allows pipes and valves to be repaired in a hazardous environment because of the elimination of combustible processes and it eliminates atmospheric emissions during the repair process, which is environmentally beneficial.

Figure 9:
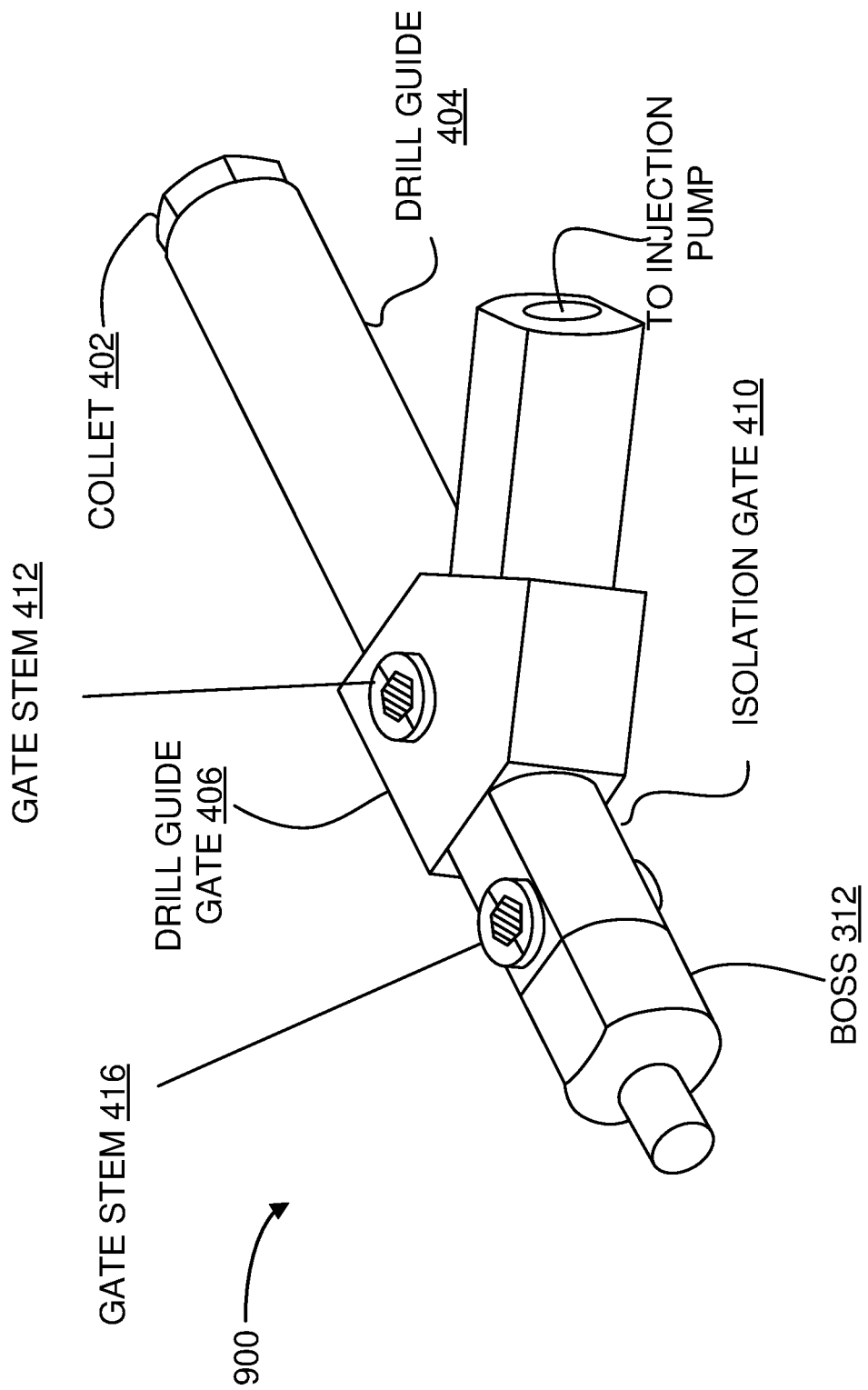
FIG. 9 is an isometric view of an injection system with two gates, according to an implementation.

FIG. 9 is an isometric view of an injection system 900 with only two gates, according to an implementation. Two gates 406 and 410 are used to route the flow of sealant under pressure throughout the system 900. O-rings provide a seal for each gate. A collet 402 is used to seal the opening to the valve 100 when a drill bit is inserted. The isolation gate 410 and the drill guide gate 406 are threaded for assembly purposes. The collet 402 is operably coupled to a drill guide 404. The drill guide 404 is operably coupled to the drill guide gate 406. The drill guide gate 406 is operably coupled to an isolation gate 410. The isolation gate 410 is operably coupled to a boss 312. The drill guide gate 406 includes a gate stem 412. The isolation gate 410 includes a gate stem 416. In this implementation, since the injection gate 408 has been eliminated, the injection pump is used to control flow of sealant into injection system 302 instead of injection gate 408. In this way, system 800D can be used as described above to seal pipes and valves without the use of injection gate 408.

Figure 10:
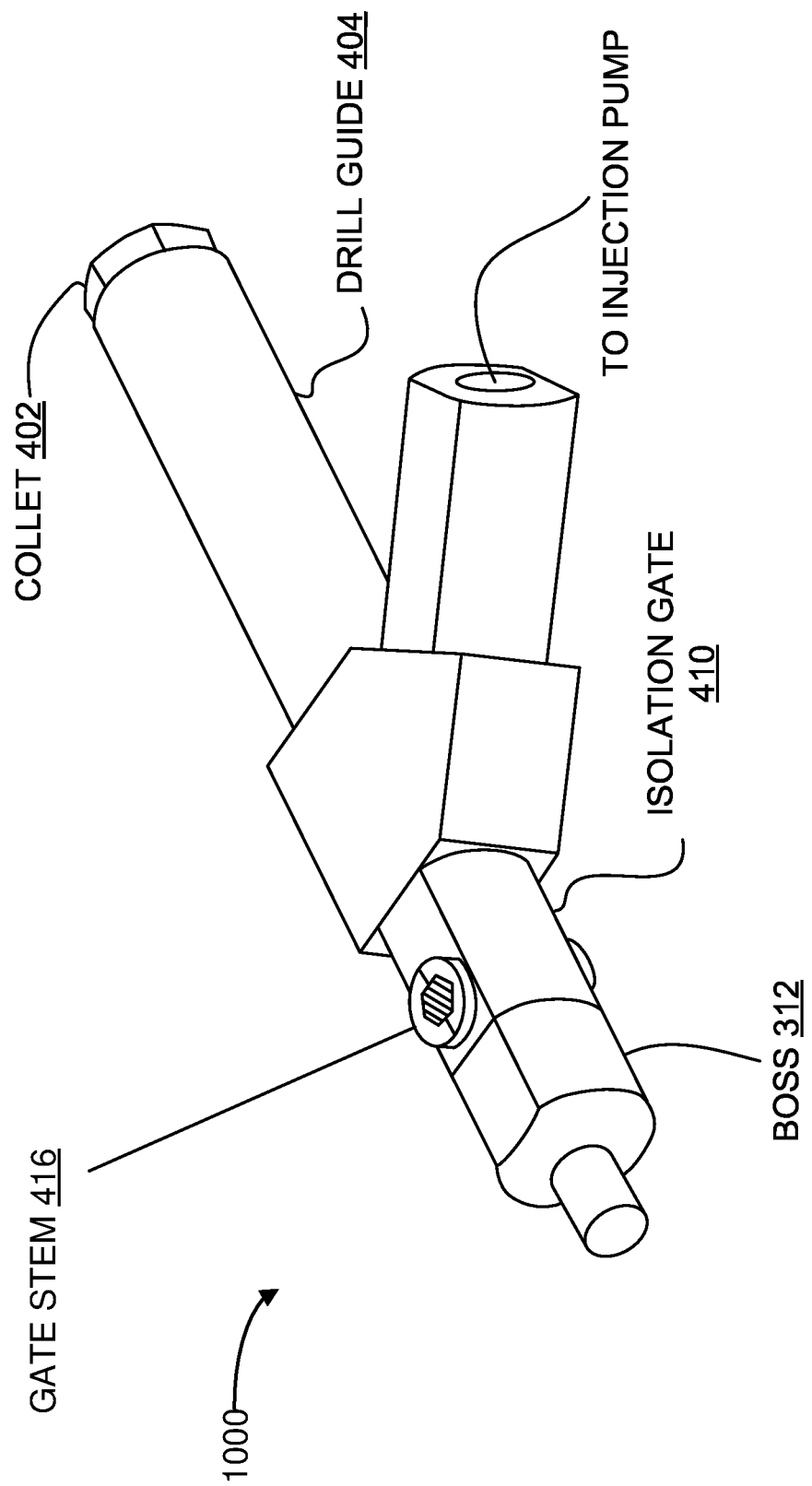
FIG. 10 is an isometric view of an injection system with one gate, according to an implementation.

FIG. 10 is an isometric view of an injection system 1000 with only one gate, according to an implementation. A gate 410 is used to route the flow of sealant under pressure throughout the system 1000. O-rings provide a seal for the gate. A collet 402 is used to seal the opening to die valve 100 when a drill bit is inserted. The isolation gate 410 is threaded for assembly purposes. The collet 402 is operably coupled to a drill guide 404. The drill guide 404 is operably coupled an isolation gate 410. The isolation gate 410 is operably coupled to a boss 312. The isolation gate 410 includes a gate stem 416. In tins implementation, the collet 402 is used to gate the flow of sealant through drill guide 404 instead of the drill guide gate 406.

Some implementations of the injection system of FIGS. 3-6 and 9-10 include two or more isolation gates 410 and that are all coupled together in-line between the boss 312 and the drill guide 404.

Figure 11:
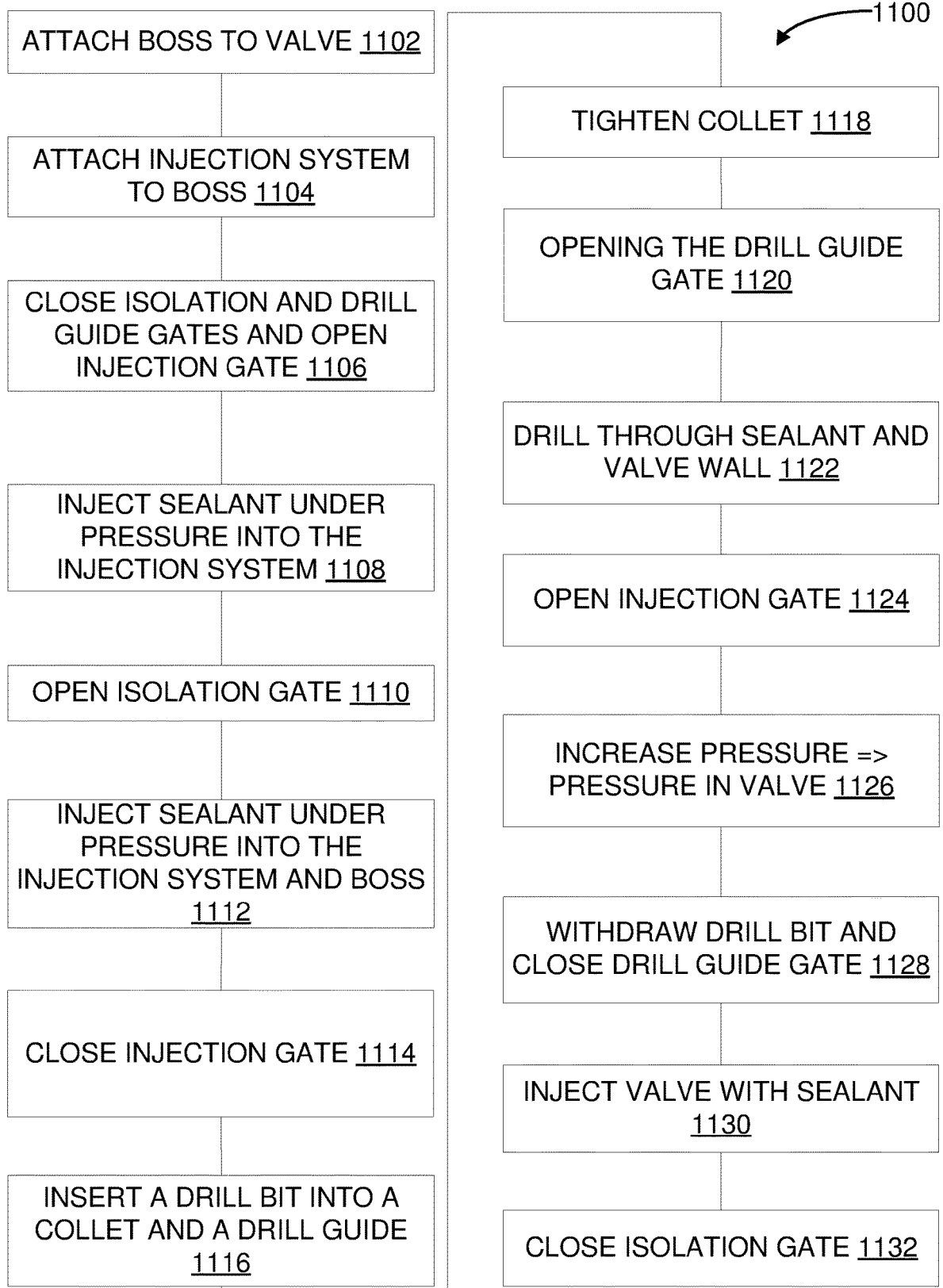
FIG. 11 is a flow chart of a valve repair method that uses the injection system of FIG. 6, according to an implementation.

FIG. 11 is a flow chart of a valve repair method 1100 that uses the injection system of FIG. 6, according to an implementation. In some implementations, method 1100 includes attaching a boss to a valve, at block 1102. In some implementations, method 1100 includes attaching an injection system to the boss, at block 1104. In some implementations, method 1100 includes closing isolation and a drill guide gate and opening an injection gate, at block 1106. In some implementations, method 1100 includes injecting a sealant under pressure into the injection system, at block 1108. In some implementations, method 1100 includes opening an isolation gate, at block 1110. In some implementations, method 1100 includes injecting the sealant under pressure into the injection system, at block 1112. In some implementations, method 1100 includes closing the injection gate at block 1114. In some implementations, method 1100 includes inserting a drill bit into a collet and a drill guide, at block 1116. In some implementations, method 1100 includes tightening a collet, at block 1118. In some implementations, method 1100 includes opening the drill guide gate, at block 1120. In some implementations, method 1100 includes drilling through the sealant and a valve wall, at block 1122. In some implementations, method 1100 includes opening the injection gate, at block 1124. In some implementations, method 1100 includes increasing pressure to be equal to or greater than pressure in the valve, at block 1126. In some implementations, method 1100 includes withdrawing the drill bit and closing the drill guide gate, at block 1128. In some implementations, method 1100 includes injecting the valve with the sealant, at block 1130. In some implementations, method 1100 includes closing the isolation gate, at block 1132. In another implementation of method 1100, block 1108 is eliminated.

Figure 12:
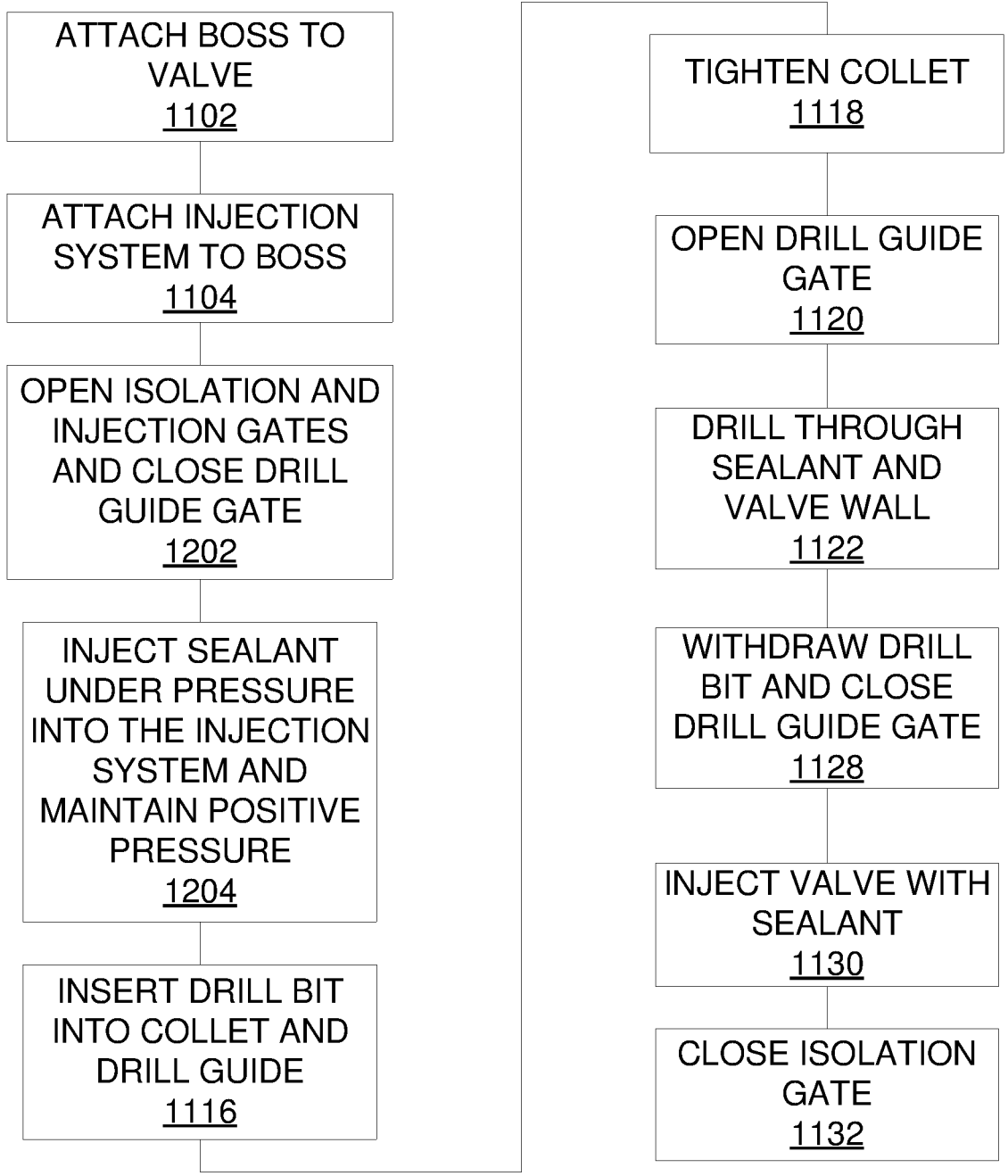
FIG. 12 is a flow chart of a valve repair method that uses the injection system of FIG. 6, according to an implementation.

FIG. 12 is a flow chart of a valve repair method 1200 that uses the injection system of FIG. 6, according to an implementation. In some implementations, method 1200 includes attaching a boss to a valve at block 1102. In some implementations, method 1200 includes attaching an injection system to the boss at block 1104. In some implementations, method 1200 includes opening isolation and injection gates and closing a drill guide gate at block 1202. In some implementations, method 1200 includes injecting a sealant under pressure into the injection system and maintaining positive pressure at block 1204. In some implementations, method 1200 includes inserting a drill bit into a collet and a drill guide at block 1106. In some implementations, method 1200 includes tightening the collet at block 1118. In some implementations, method 1200 includes opening the drill guide gate at block 1120. In some implementations, method 1200 includes drilling through sealant and a valve wall, at block 1122. In some implementations, method 1200 includes withdrawing the drill bit and closing the drill guide gate, at block 1128. In some implementations, method 1200 includes injecting the valve with the sealant at block 1130. In some implementations, method 1200 includes closing the isolation gate, at block 1132.

Figure 13:
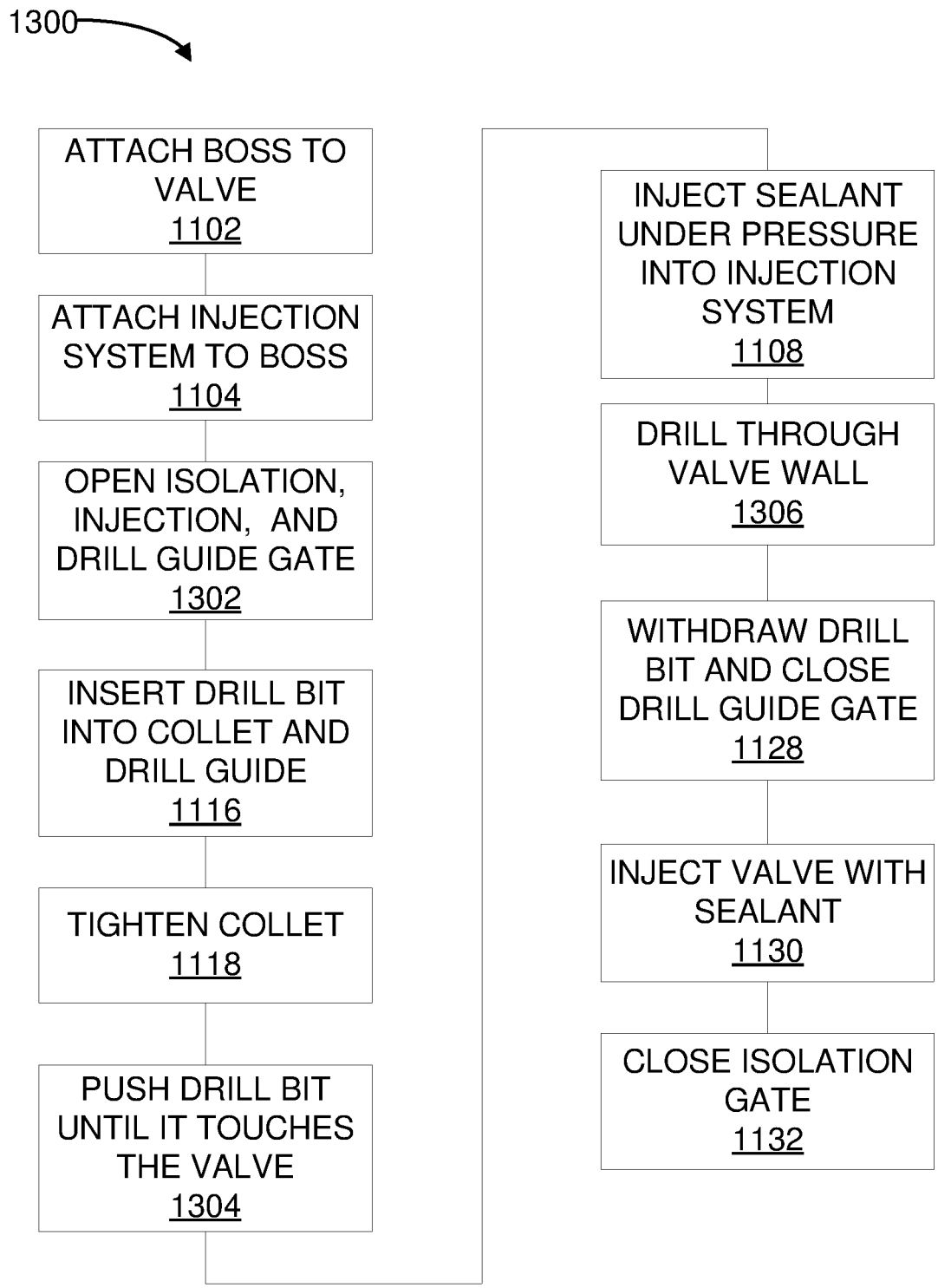
FIG. 13 is a flow chart of a valve repair method that uses the injection system of FIG. 6, according to an implementation.

FIG. 13 is a flow chart of a valve repair method 1300 that uses the injection system of FIG. 6, according to an implementation. In some implementations, method 1300 includes attaching a boss to a valve at block 1102. In some implementations, method 1300 includes attaching an injection system to the boss at block 1104. In some implementations, method 1300 includes opening isolation, injection, and drill guide gates at block 1302. In some implementations, method 1300 includes inserting a drill bit into a collet and a drill guide at block 1116. In some implementations, method 1300 includes tightening the collet at block 1118. In some implementations, method 1300 includes pushing the drill bit until it touches the valve at block 1304. In some implementations, method 1300 includes injecting a sealant under pressure into injection system at block 1108. In some implementations, method 1300 includes drilling through a valve wall at block 1306. In some implementations, method 1300 includes withdrawing the drill bit and closing the drill guide gate at block 1128. In some implementations, method 1300 includes injecting the valve with the sealant at block 1130. In some implementations, method 1300 includes closing the isolation gate at block 1132.

Figure 14:
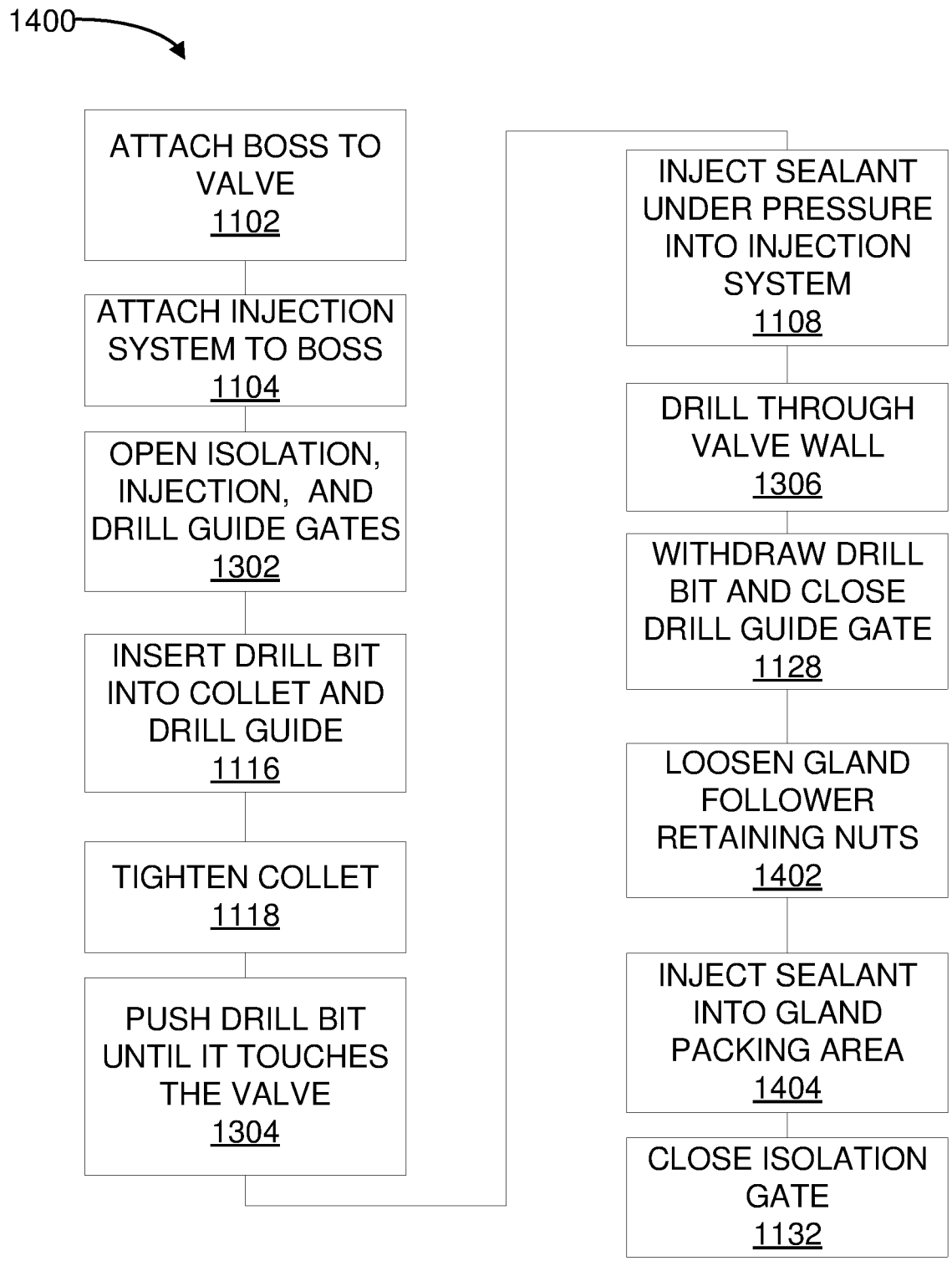
FIG. 14 is a flow chart of a valve repair method that uses the injection system of FIG. 6, according to an implementation.

FIG. 14 is a flow chart of a valve repair method 1400 that uses the injection system of FIG. 6, according to an implementation. In some implementations, method 1400 includes attaching a boss to a valve at block 1102. In some implementations, method 1400 includes attaching an injection system to the boss at block 1104. In some implementations, method 1400 includes opening isolation, injection, and drill guide gates at block 1302. In some implementations, method 1400 includes inserting a drill bit into a collet and a drill guide at block 1116. In some implementations, method 1400 includes tightening the collet at block 1118. In some implementations, method 1400 includes pushing the drill bit further until it touches the valve at block 1304. In some implementations, method 1400 includes injecting a sealant under pressure into injection system at block 1108. In some implementations, method 1400 includes drilling through a valve wall at block 1306. In some implementations, method 1400 includes withdrawing the drill bit and closing the drill guide gate at block 1128. In some implementations, method 1400 includes loosening a gland follower retaining nuts at block 1402. In some implementations, method 1400 includes injecting the sealant into a gland packing area at block 1404. In some implementations, method 1400 includes closing an isolation gate at block 1132.

Figure 15:
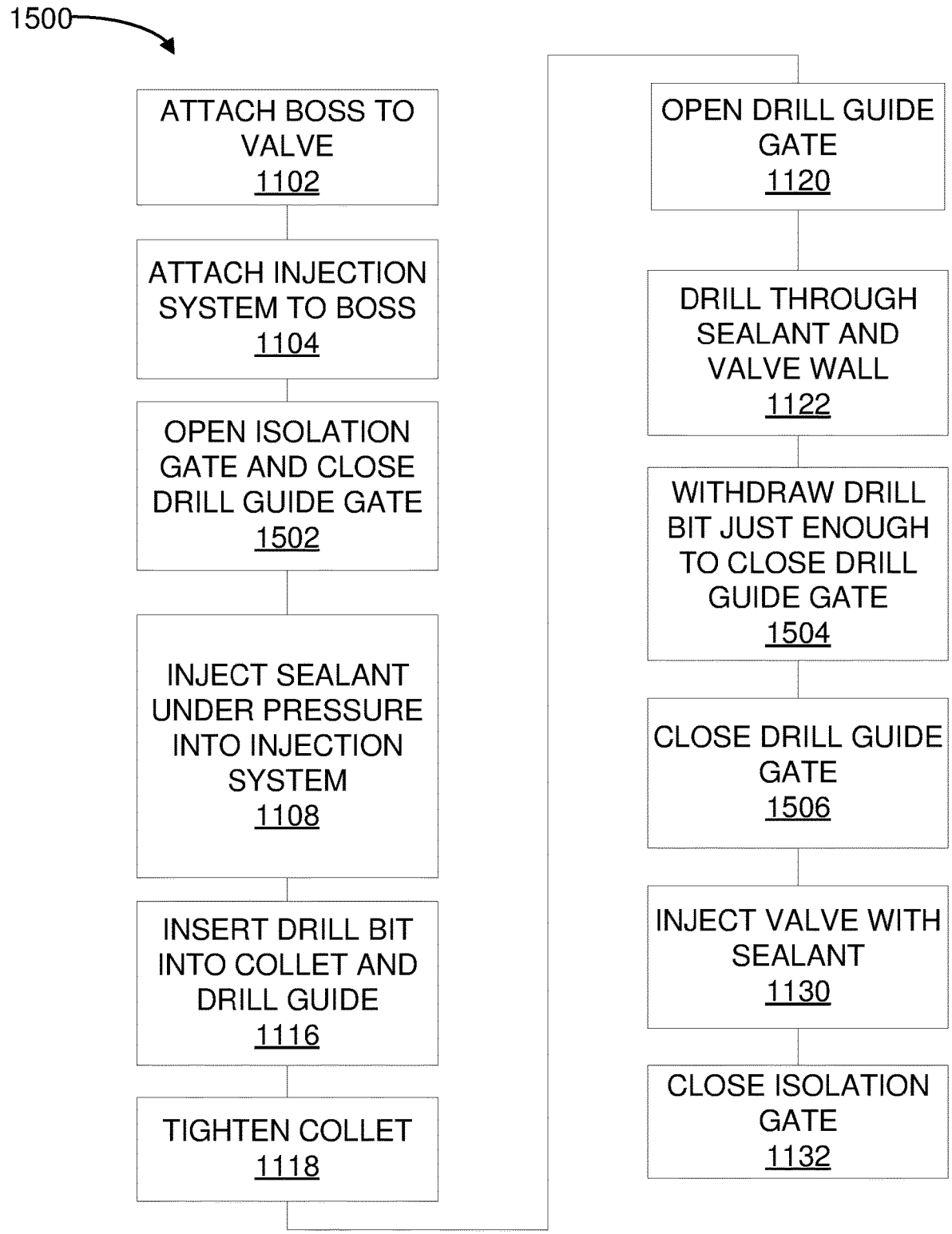
FIG. 15 is a flow chart of a valve repair method that uses the injection system of FIG. 9, according to an implementation.

FIG. 15 is a flow chart of a valve repair method 1500 that uses the injection system of FIG. 9, according to an implementation. In some implementations, method 1500 includes attaching a boss to a valve, at block 1102. In some implementations, method 1500 includes attaching an injection system to the boss, at block 1104. In some implementations, method 1500 includes opening an isolation gate and closing a drill guide gate, at block 1502. In some implementations, method 1500 includes injecting a sealant under pressure into the injection system, at block 1108. In some implementations, method 1500 includes inserting a drill bit into a collet and a drill guide, a block 1116. In some implementations, method 1500 includes tightening the collet, at block 1118. In some implementations, method 1500 includes opening the drill guide gate, at block 1120. In some implementations, method 1500 includes drilling through the sealant and a valve wall, at block 1122. In some implementations, method 1500 includes withdrawing the drill bit just enough to close the drill guide gate, at block 1504. In some implementations, method 1500 includes closing the drill guide gate, at block 1506. In some implementations, method 1500 includes injecting the valve with the sealant, at block 1130. In some implementations, method 1500 includes closing the isolation gate at block 1132.

Figure 16:
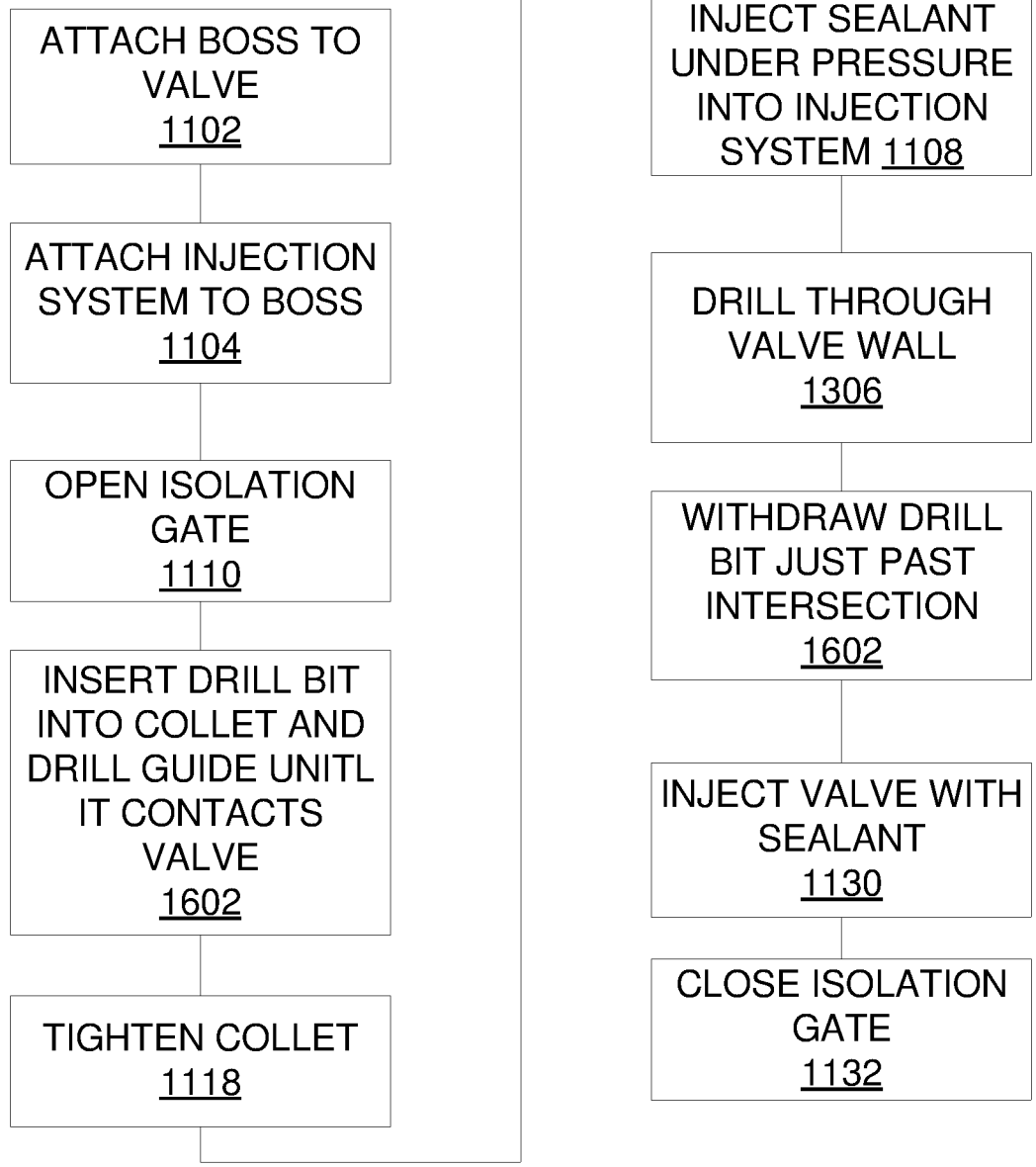
FIG. 16 is a flow chart of a valve repair method that uses the injection system of FIG. 10, according to an implementation.

FIG. 16 is a flow chart of a valve repair method 1600 that uses the injection system of FIG. 10, according to an implementation. In some implementations, method 1600 includes attaching a boss to a valve, at block 1102. In some implementations, method 1600 includes attaching an injection system to the boss, at block 1104. In some implementations, method 1600 includes opening an isolation gate, at block 1110. In some implementations, method 1600 includes inserting a drill bit into a collet and a drill guide until it contacts the valve, at block 1602. In some implementations, method 1600 includes tightening the collet, at block 1118. In some implementations, method 1600 includes injecting sealant under pressure into the injection system at block 1108. In some implementations, method 1600 includes drilling through the valve, at block 1306. In some implementations, method 1600 includes withdrawing the drill bit just past intersection 424, at block 1602. In some implementations, method 1600 includes injecting the valve with the sealant, at block 1130. In some implementations, method 1600 includes closing the isolation gate, at block 1132.

Figure 17:
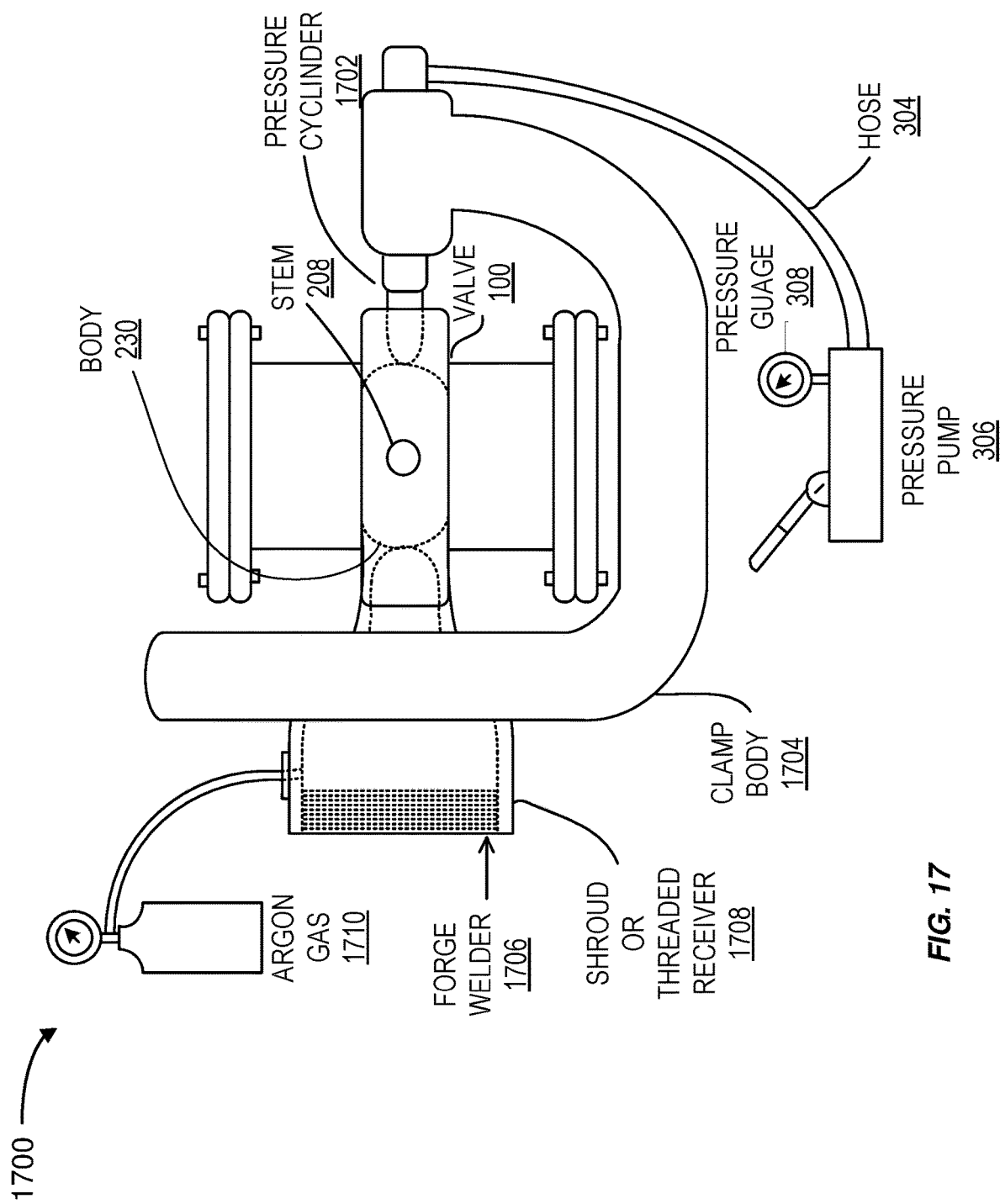
FIG. 17 is a block diagram of a clamp that is operable to secure the friction bonding actuator and motor to the valve while the boss is being bonded to the valve, force being provided by a pressure pump, according to an implementation.

FIG. 17 is a block diagram of a clamp 1700 that is operable to secure the friction bonding actuator and motor to a valve while a boss is being bonded to the valve, force being provided by a pressure pump, according to an implementation. The clamp 1700 uses hydraulic pressure to apply the clamping force that holds the clamp 1700 in place. The hydraulic pressure can be applied by several apparatus; the apparatus shown in FIG. 17 is through use of an injection pump 306. The injection pump 306 can be used later to inject sealant into the valve 100 for repair. A pressure gauge 308 mounted on the injection pump 306 allows the repair technician to monitor the pressure during the valve repair method. The injection pump 306 is operably coupled through a hose 304 to a pressure cylinder 1702 that is mounted in a clamp body 1704. The valve 100 includes a stem 208 and a body 230. The clamp body 1704 is attached to a forge welder 1706 through a shroud or threaded receiver 1708 and that is operably coupled to a cylinder of argon gas 1710. The forge welder 1706 includes a pneumatic motor and an actuator. The shroud or threaded receiver 1708 receives the actuator of the forge welder 1706 and shrouds the weld site with the argon gas 1710. Other gases could be used in place of argon gas 1710.

Figure 18:
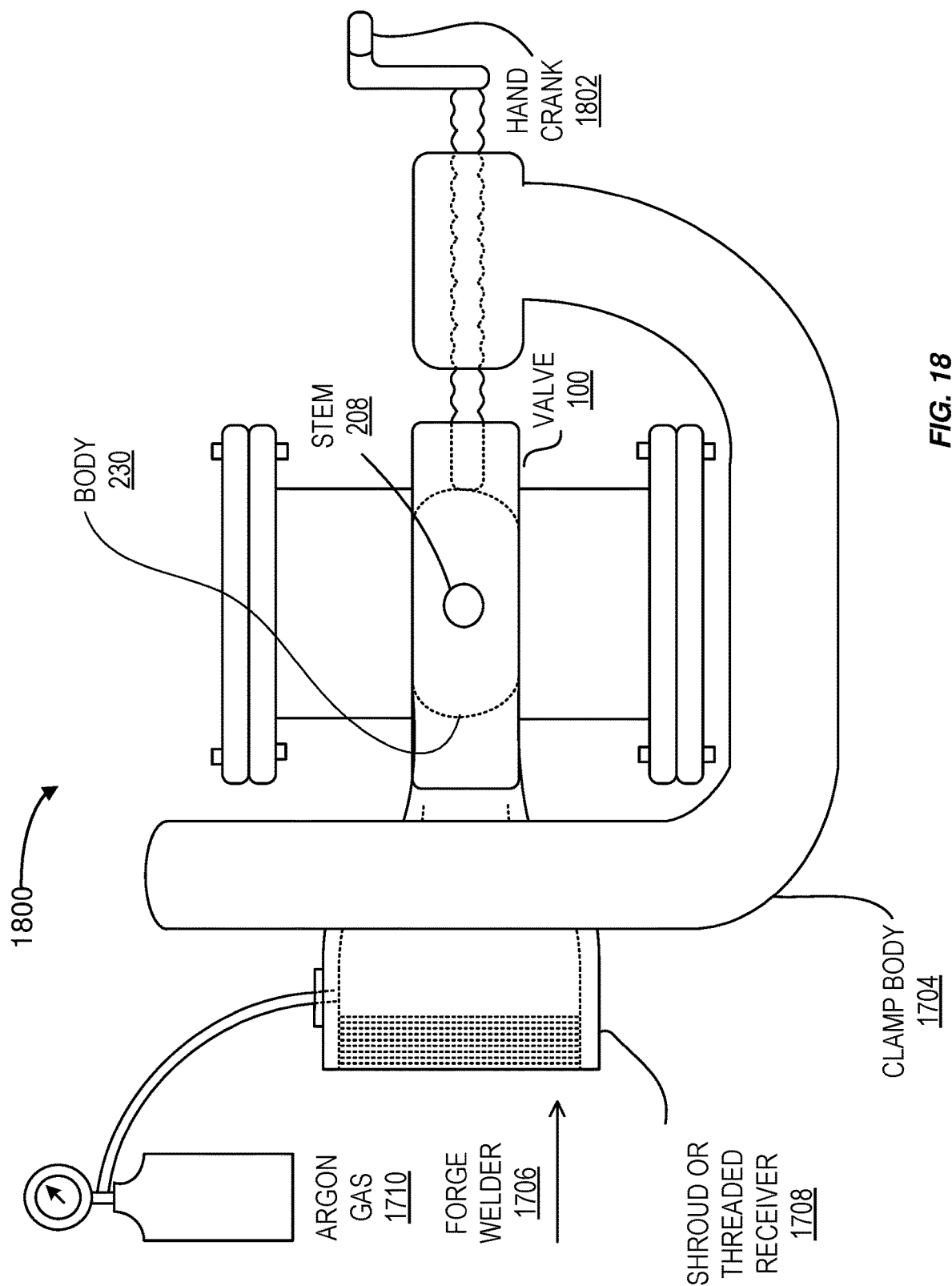
FIG. 18 is a block diagram of a clamp that is operable to secure the friction bonding actuator and motor to the valve while the boss is being bonded to the valve, force being provided by a hand crank, according to an implementation.

FIG. 18 is a block diagram of a clamp 1800 that is operable to secure the friction bonding actuator and motor to the valve while the boss is being bonded to the valve, force being provided by a hand crank, according to an implementation. Clamp 1800 uses a hand crank 1802 screw-type mechanism to apply a clamping force that holds the clamp body 1704 in place. A torque wrench (not shown in FIG. 18) can be built into the crank handle 1704 to apply a precise amount of force needed to secure the clamp 1704 to the vise. The valve 100 includes a stem 208 and a body 230. The clamp body 1704 is attached to a forge welder 1706 that includes the shroud or threaded receiver 1708 and that is operably coupled to a cylinder argon gas 1710. The shroud or threaded receiver 1708 receives the actuator of the forge welder 1706 and shrouds the weld site with the argon gas 1710. Other gases could be used in place of argon gas 1710.

Figure 19:
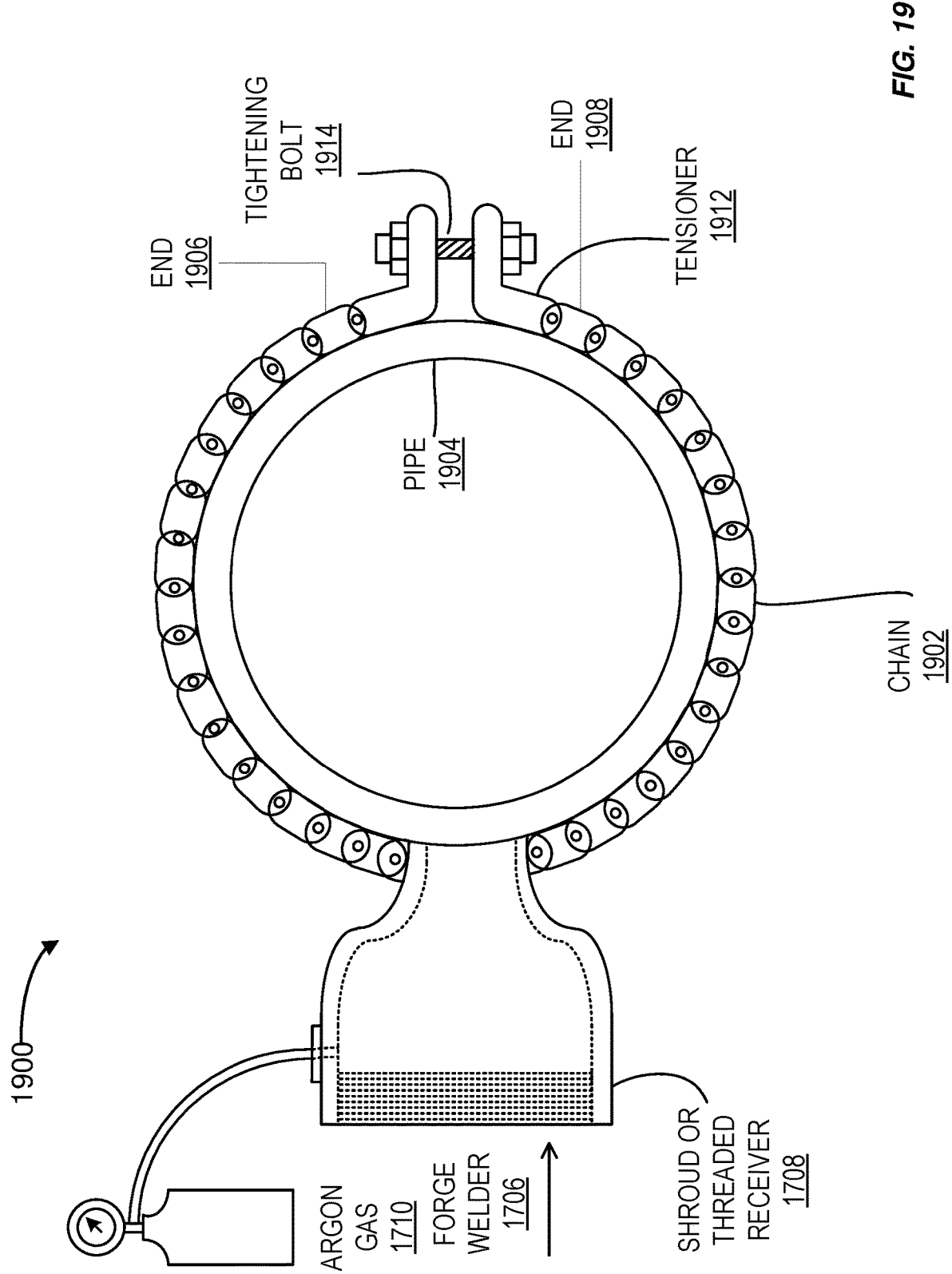
FIG. 19 is a cross section diagram of a chain pipe clamp, according to an implementation.

FIG. 19 is a cross section diagram of a chain pipe clamp 1900, according to an implementation. The chain clamp 1900 is made of a chain 1902 (similar to a bicycle chain) and wraps around a pipe 1904. The two ends 1906 and 1908 of the chain 1902 connect to the shroud or threaded receiver 1708. Between the two ends 1906 and 1908 of the chain 1902 is a tensioner 1912. One such tensioner 1912 uses a tightening bolt 1914 and two flanges. When the bolt 1914 is tightened, the flanges are pulled together, tightening the chain clamp 1900. The inside of the shroud or threaded receiver 1708 is threaded to accept the actuator. The shroud or threaded receiver 1708 also accepts the argon gas 1710 during the welding process to eliminate air and thus ensure welding process never becomes an ignition source and to improve the quality of the weld.

Figure 20:
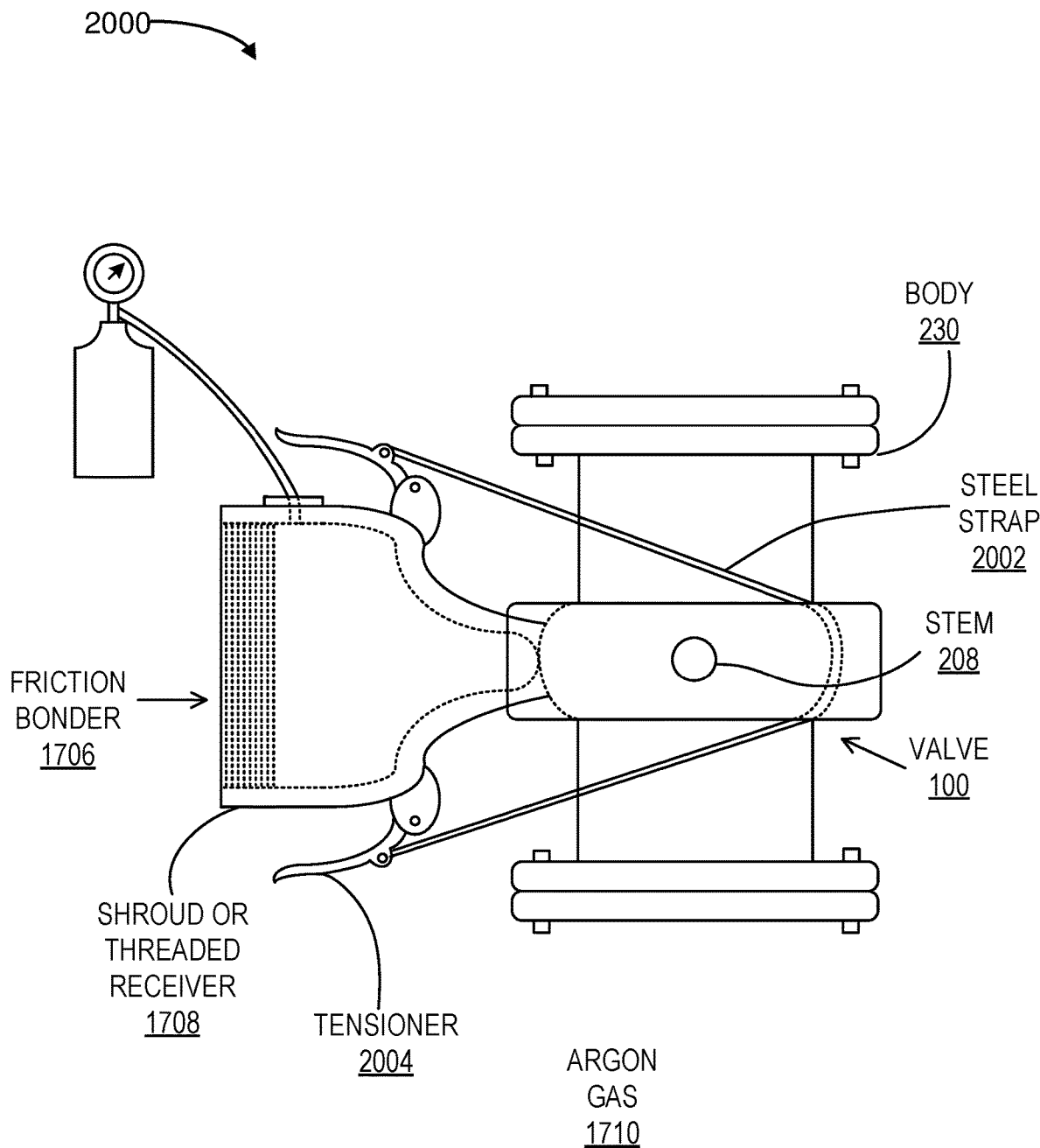
FIG. 20 is a block diagram of a top view of a strap clamp, according to an implementation.

FIG. 20 is a block diagram of a top view of a strap clamp 2000, according to an implementation. A steel strap 2002 is made of steel and after being wrapped around the valve 100, the strap 2002 is connected to the shroud or threaded receiver 1708. Tensioners 2004 allow the steel strap 2002 to be tightened around the valve 100, holding the shroud or threaded receiver 1708 against the valve 100. The lever type tensioners 2004 are hand activated and adjusted. Any type of tensioner 2004 can be operable for strap clamp 2000. The shroud or threaded receiver 1708 also accepts the argon gas 1710 during the welding process to prevent the welding process from becoming an ignition source. Steel strap 2002 could be made of cable, chain or any strong flexible material. Strap clamp 2000 could be used to secure a shroud or threaded receiver 1708 to a pipe or pipe component.

Figure 21:
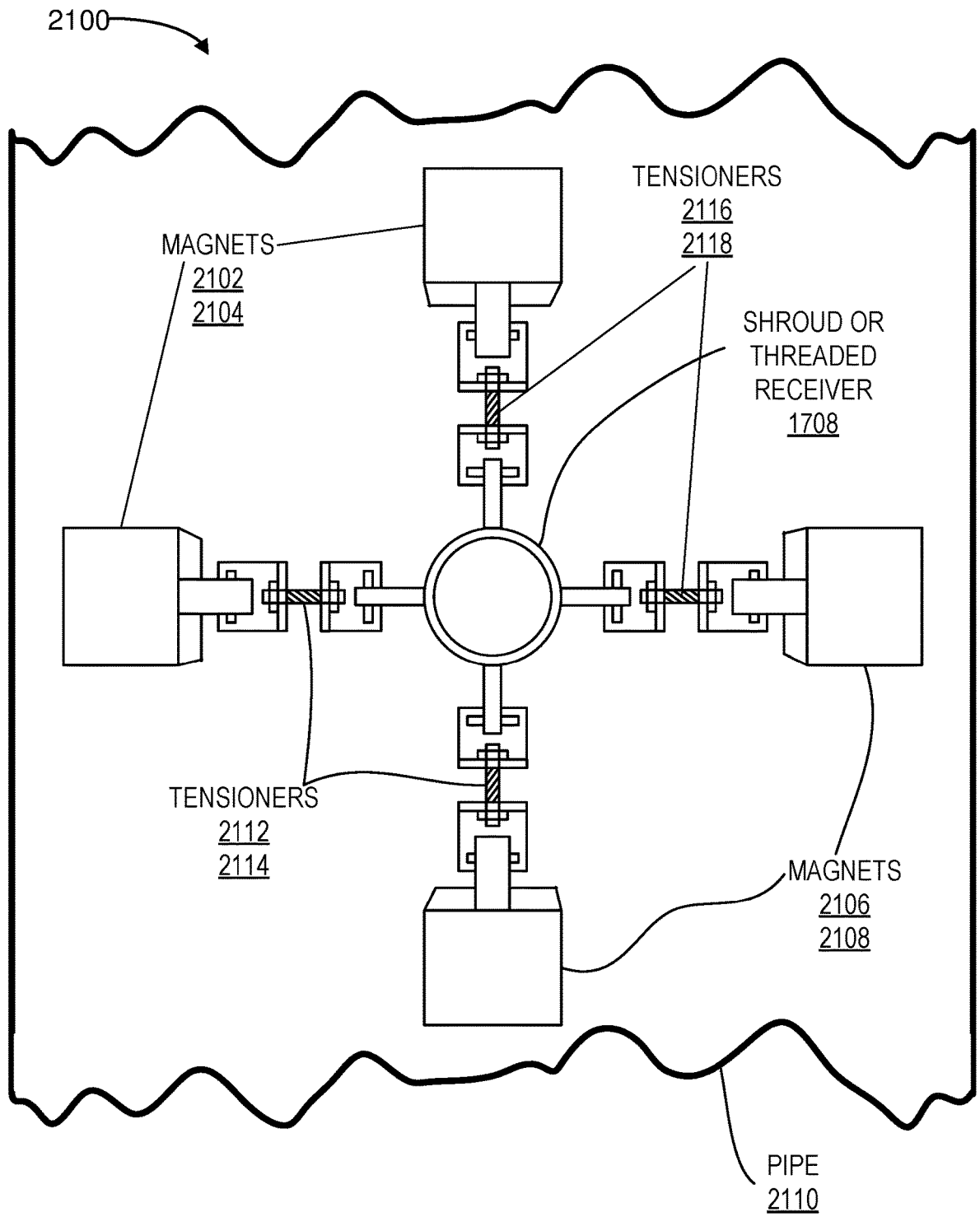
FIG. 21 is a block diagram of a side view of a magnet clamp being used on a large pipe, according to an implementation.

FIG. 21 is a block diagram of a side view of a magnet clamp 2100 operable on a large pipe, according to an implementation. Four permanent magnets 2102, 2104, 2106 and 2108 with disconnects hold a shroud or threaded receiver 1708 against a pipe 2110 during a friction bonding procedure. Tensioners 2112, 2114, 2116 and 2118 connecting each magnet 2102, 2104, 2106 and 2108 to the shroud or threaded receiver 1708 are employed to ensure adequate holding force against the pipe 2110. The actuator, with chuck and boss, are attached to the motor and the shroud or threaded receiver 1708 and held in place during the bonding process by the shroud or threaded receiver 1708.

Figure 22:
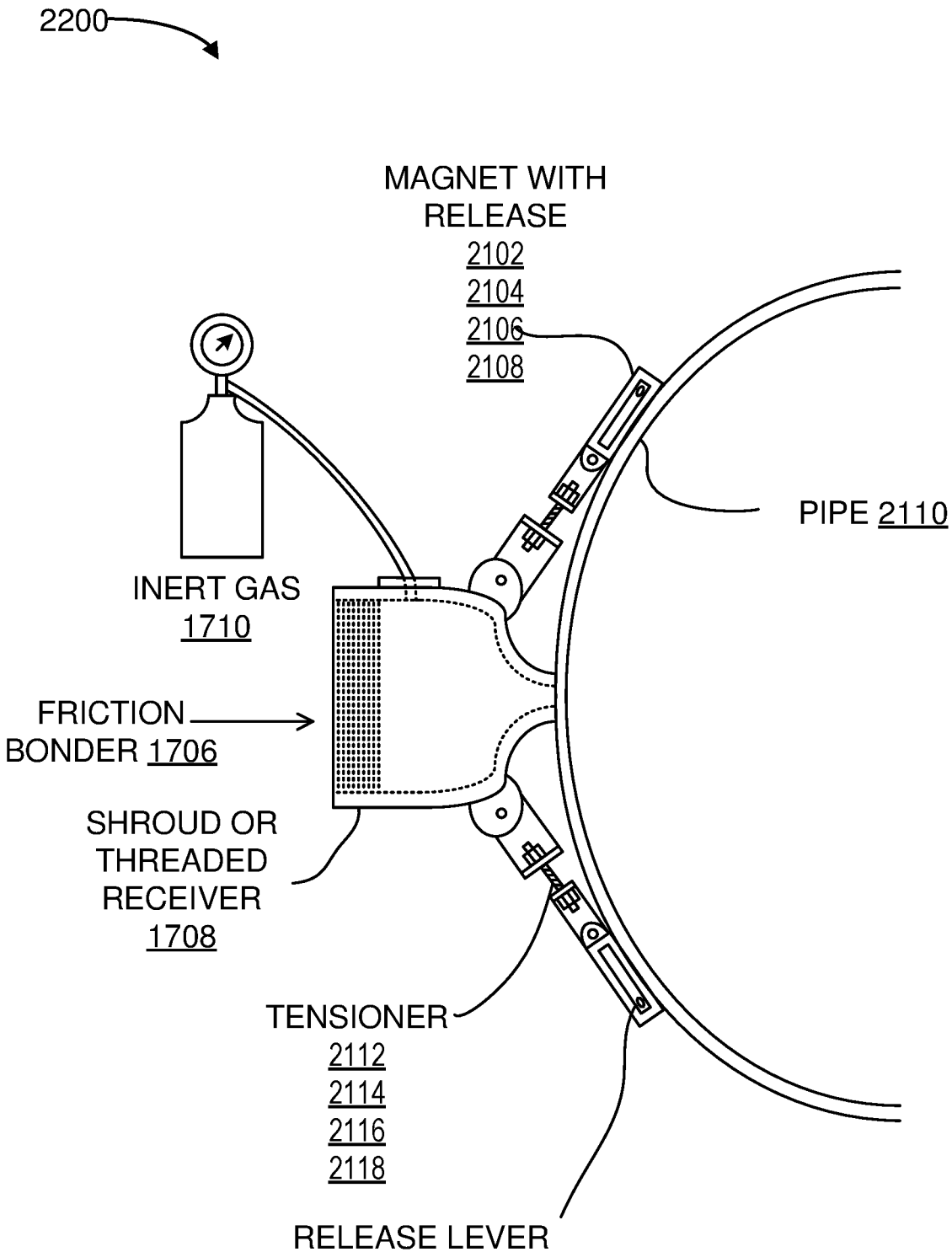
FIG. 22 is cross section block diagram of a top view of the magnet clamp shown in FIG. 21, according to an implementation.

FIG. 22 is cross section block diagram of a top view of the magnet clamp 2100, according to an implementation. The magnet clamp 2100 includes a tensioner (2112, 2114, 2116 or 2118) coupled to a magnet (2102, 2104, 2106 or 2108) with a release that is coupled to a pipe 2110. The tensioner (2112, 2114, 2116 or 2118) is rotatably coupled to a shroud or threaded receiver 1708 that receives a friction bonder 1706. Inert gas is injected into the shroud or threaded receiver 1708 during the bonding process. Each tensioner (2112, 2114, 2116 or 2118) is made of a bolt and nut with two flanges. When the bolt is tightened, the flanges are pulled together and tension the shroud against the pipe. Other tensioners could be used instead of the bolting tensioners shown.

Figure 23A:
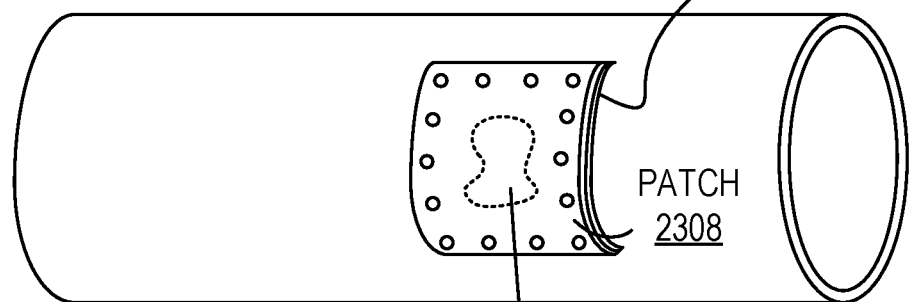
FIG. 23A is an isometric diagram and 23B is a cross section diagram of a repaired pipe using a metal patch, according to an implementation.
Figure 23B:
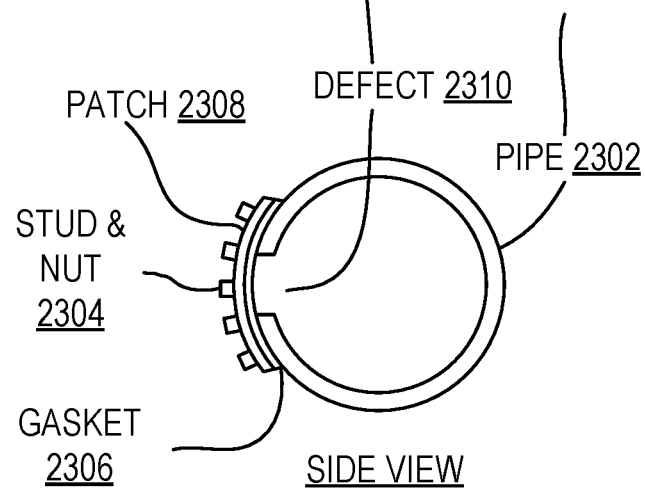

FIG. 23A is an isometric diagram and 23B is a cross section diagram of a repaired pipe 2300 using a metal patch, according to an implementation. A clamp, such as clamp 1900, 2000, 2100 or clamp 2200, is used to secure the friction welder 1706 to a surface of the pipe 2302 to bond a series of stud and nuts 2304 to the pipe 2302. A gasket 2306 is then placed over the stud and nuts 2304 followed by a patch 2308. In some implementations, the gasket 2306 is made of rubber, but in other implementations the gasket 2306 is made of any poly compound or soft material suitable for a gasket. In some implementations, the patch 2308 is made of steel, but in other implementations of the patch 2308 is made out of any rigid, strong material. The patch 2308 is then pulled tightly against the gasket 2306 and the surface of the pipe 2302 by tightening the stud and nuts 2304, which seals the defect 2310 area in the pipe 2302.

Figure 24A:
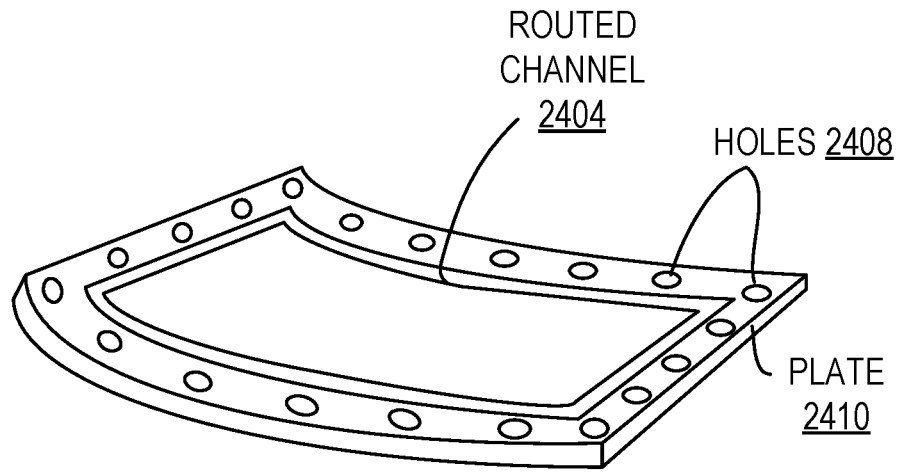
FIG. 24A is an isometric diagram and 24B is a cross section diagram of a repair plate that uses a channel gasket, according to an implementation.
Figure 24B:
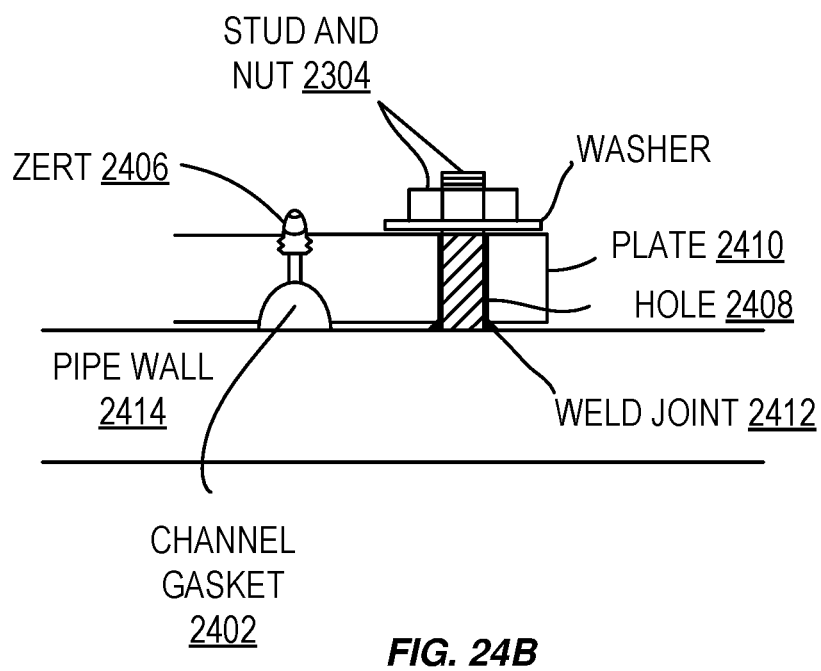

FIG. 24A is an isometric diagram and 24B is a cross section diagram of a repair plate 2400 that uses a channel gasket, according to an implementation. A channel gasket 2402 is a long round flexible gasket shaped somewhat like a smooth rope that lies in a routed channel 2404 routed around the perimeter of the pre-warped plate 2410. In some implementations, zerts 2406 are added to allow sealant to be injected into the routed channel 2404. A simple set screw or bolt could also be used in place of zerts 2406 to close the opening after the routed channel 2404 is injected with sealant. Though the channel gasket 2402 is shown to be semicircular in shape it is round before installation. The channel gasket 2402 could be rectangular, square or any other shape. A series of stud and nuts 2304 are attached to the pipe wall 2414 by weld joints 2412. Stud and nuts 2304 pass through holes 2408 in plate 2410 to attach plate 2410 to pipe wall 2414.

FIGS. 25A and 25B are cross section diagrams 2500 of a plate that is pre-warped to mismatch the curvature of a pipe, according to an implementation. Any pre-warped plate 2410 creates uneven pressure across the entire plate 2410. If the plate 2410 is low-center pre-warped as shown in FIG. 25A, higher pressure 2502 will be created at the center of the plate 2410. If the plate 2410 is high-center pre-warped as shown in FIG. 25B, higher pressure 2502 will be created at the edge of the plate 2410. By selectively pre-warping the plate a seal with higher integrity can be made at specific locations under the plate 2410.

Figure 26A:
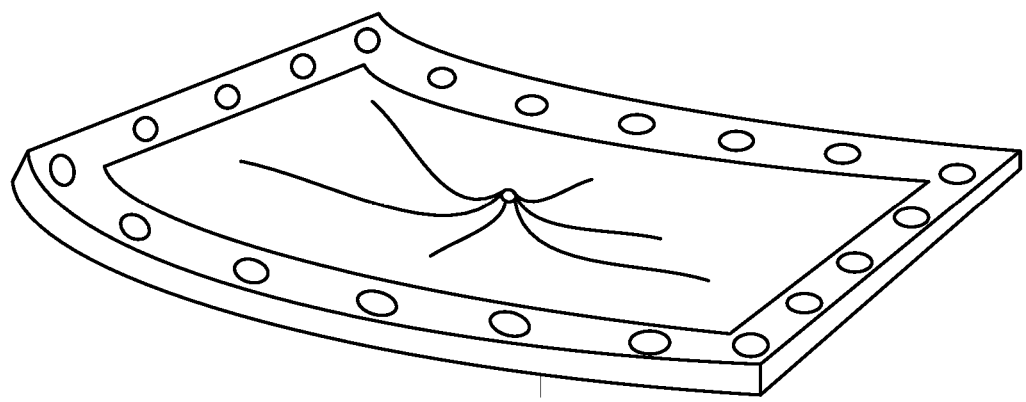
FIG. 26A is an isometric diagram and 26B is a block diagram of a plate that is pre-warped with a gradient to alter the location of the maximum pressure on the pipe to enhance sealing at the defect area, according to an implementation.
Figure 26B:
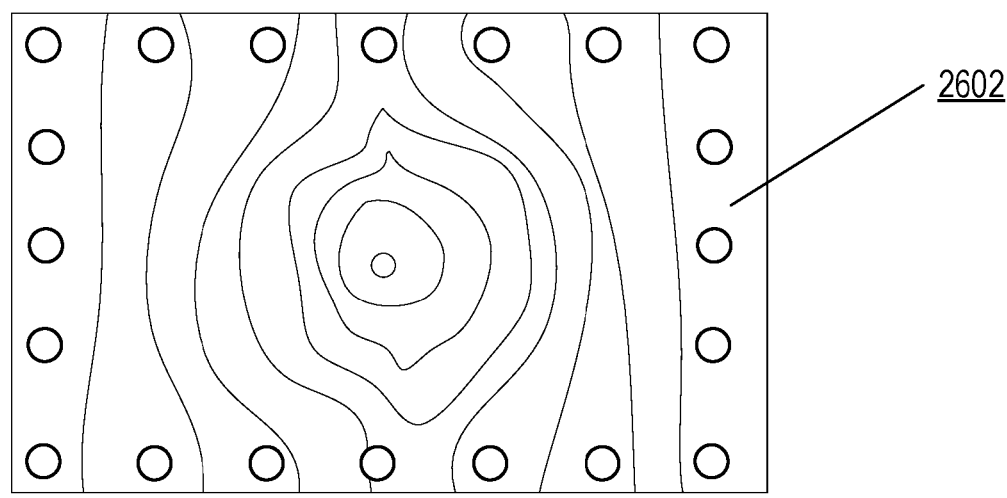

FIG. 26A is an isometric diagram and 26B is a block diagram of a plate 2600 that is pre-warped with a gradient to alter the location of the maximum pressure on the pipe to enhance sealing at the defect area 2310, according to an implementation. FIG. 26B shows topographical lines 2602 of a gradient pre-warped plate.

Figure 27A:
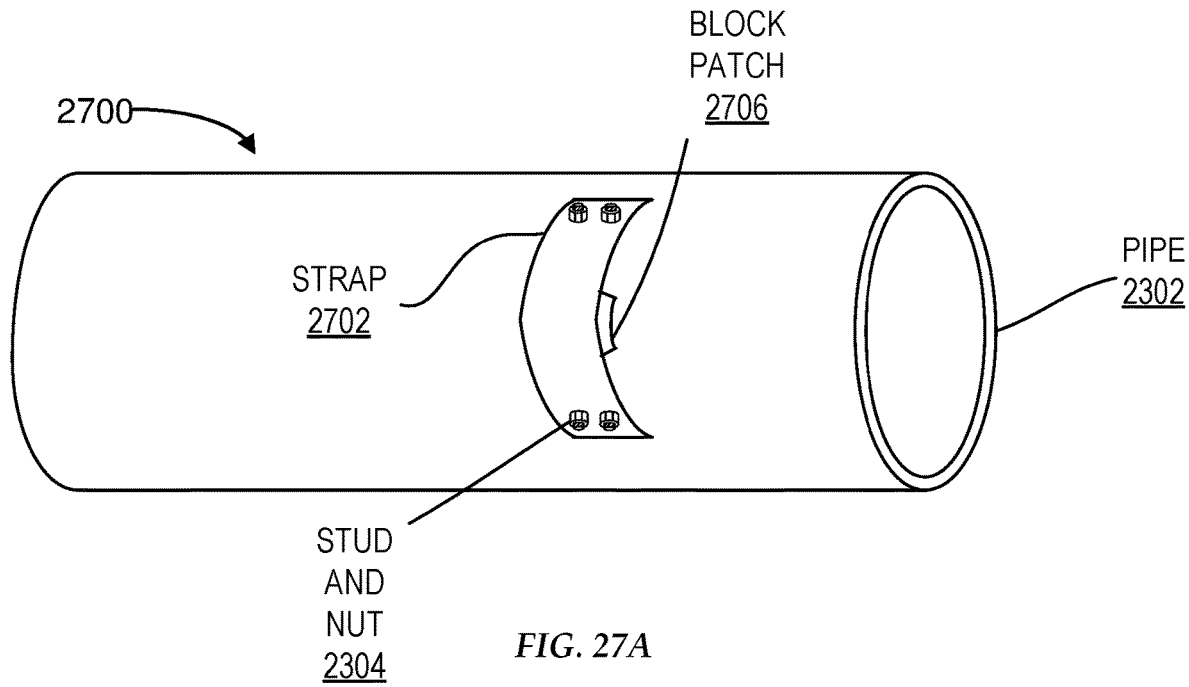
FIG. 27A is an isometric diagram and 27B is a cross section diagram of a block patch used to add more pressure at a defect area of a pipe to enhance sealing of the defect, according to an implementation.

FIG. 27A is an isometric diagram and 27B is a cross section diagram 2700 of a block patch used to add more pressure at a defect area of a pipe to enhance sealing of the defect, according to an implementation. A strap 2702 is made of a strong yet slightly flexible material such as sheet metal. A gasket 2704 is placed between the block patch 2706 and the pipe 2302. Block patch 2706 could be made of a semi-soft material like hard rubber to eliminate the need for gasket 2704. The strap 2702 is pulled taught by the studs and nuts 2304 to apply pressure to the block patch 2706. The advantage of this type of patch over the pre-warped plate in FIG. 25 and FIG. 26 is that this repair can be prepared and performed on site. The thickness of block patch 2706 could be of any thickness that enhances the seal.

Figure 27B:
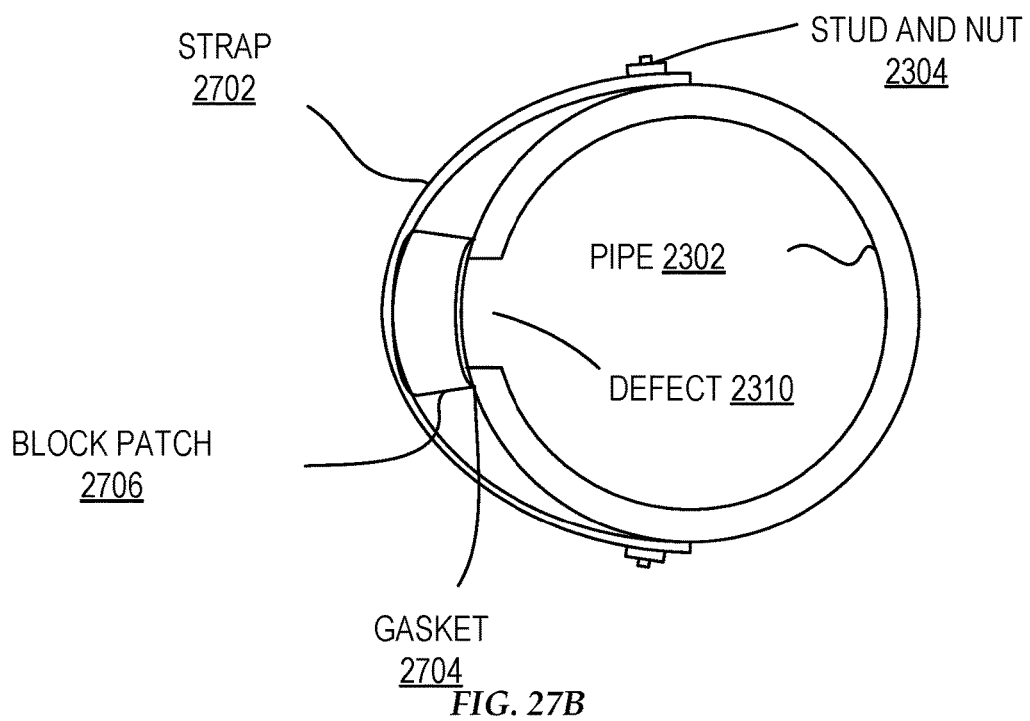
Figure 28A:
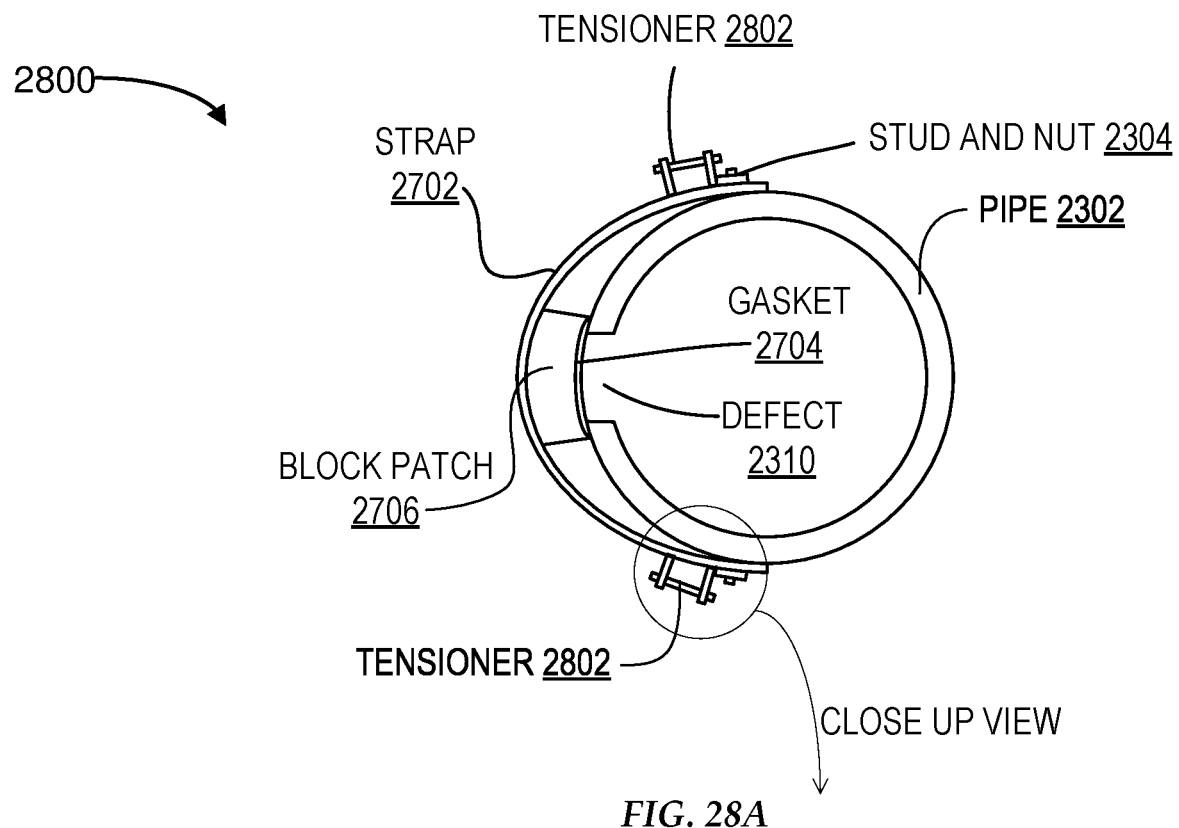
FIG. 28A is a cross section diagram and 28B is a cross section diagram of a block patch with tensioners, according to an implementation.
Figure 28B:
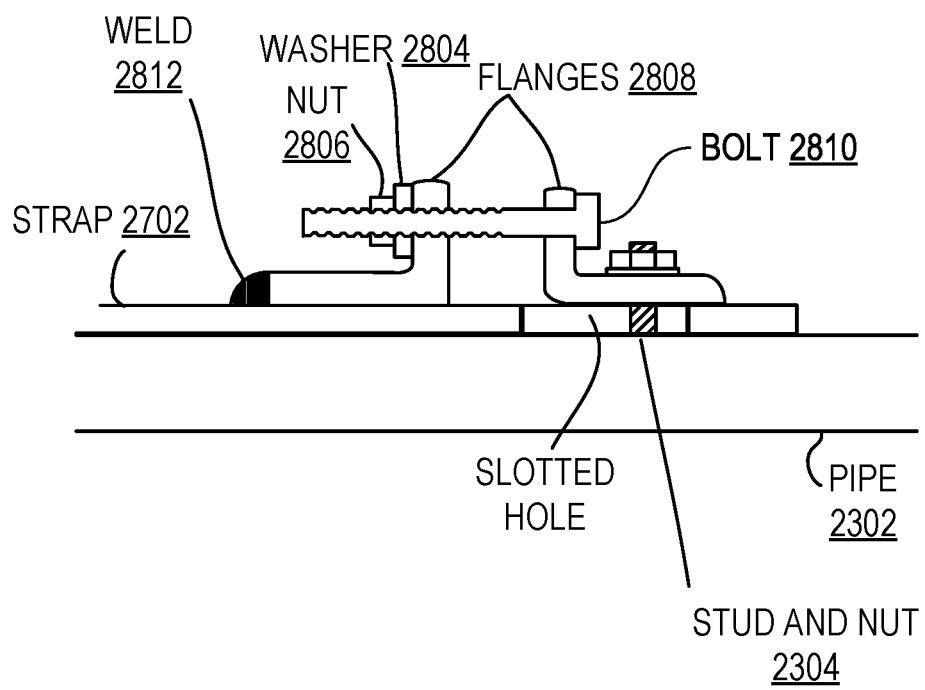

FIG. 28A is a cross section block diagram and 28B is a cross section block diagram of a block patch with tensioners 2800, according to an implementation. The patch is similar to the patch is FIGS. 27A and 27B, but with the addition of tensioners 2802 to apply pressure to the block patch 2706. A close up of a low-cost implementation of the tensioner 2802 is shown in the FIG. 28B, which includes a washer 2804 and a nut 2806 that passes through flanges 2808 and are secured to a bolt 2810. The flanges 2808 are secured to the pipe 2302 or the strap 2702 either through a stud and nut 2304 or a weld 2812. Other tensioners could be used to serve the same purpose.

Figure 29:
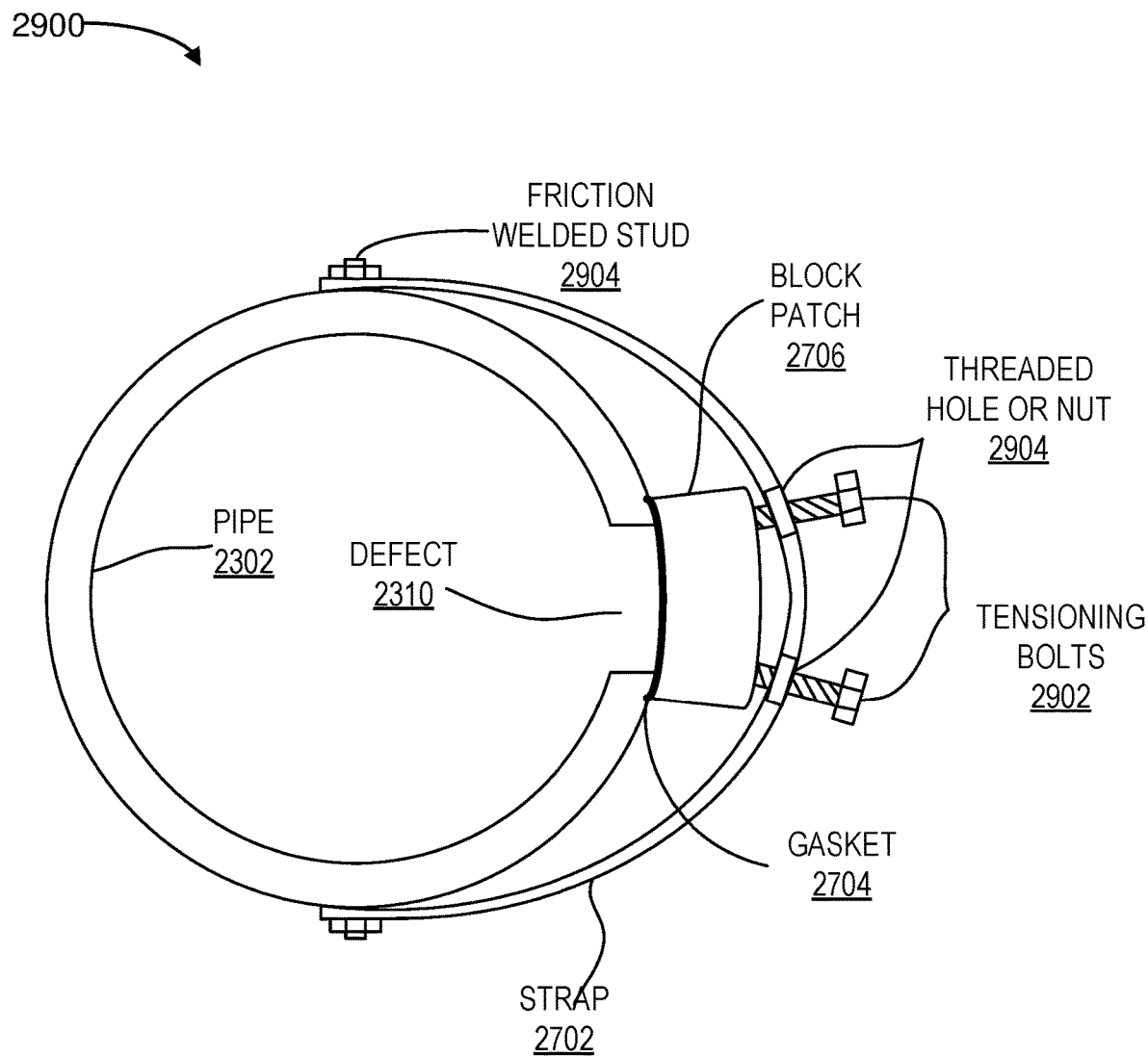
FIG. 29 is cross section diagram of a block patch with adjusters, according to an implementation.

FIG. 29 is cross section diagram of a block patch with adjusters 2900, according to an implementation. Instead of using tensioners to add pressure to the block patches as shown in FIG. 28A and FIG. 29A, adjusters or tensioning bolts 2902 through a threaded hole or nut 2904 can be screwed or tightened against the block patch 2706 to apply pressure. Studs 2904 are standard friction bonded studs and do not require slotted holes drilled in the strap 2702.

Figure 30:
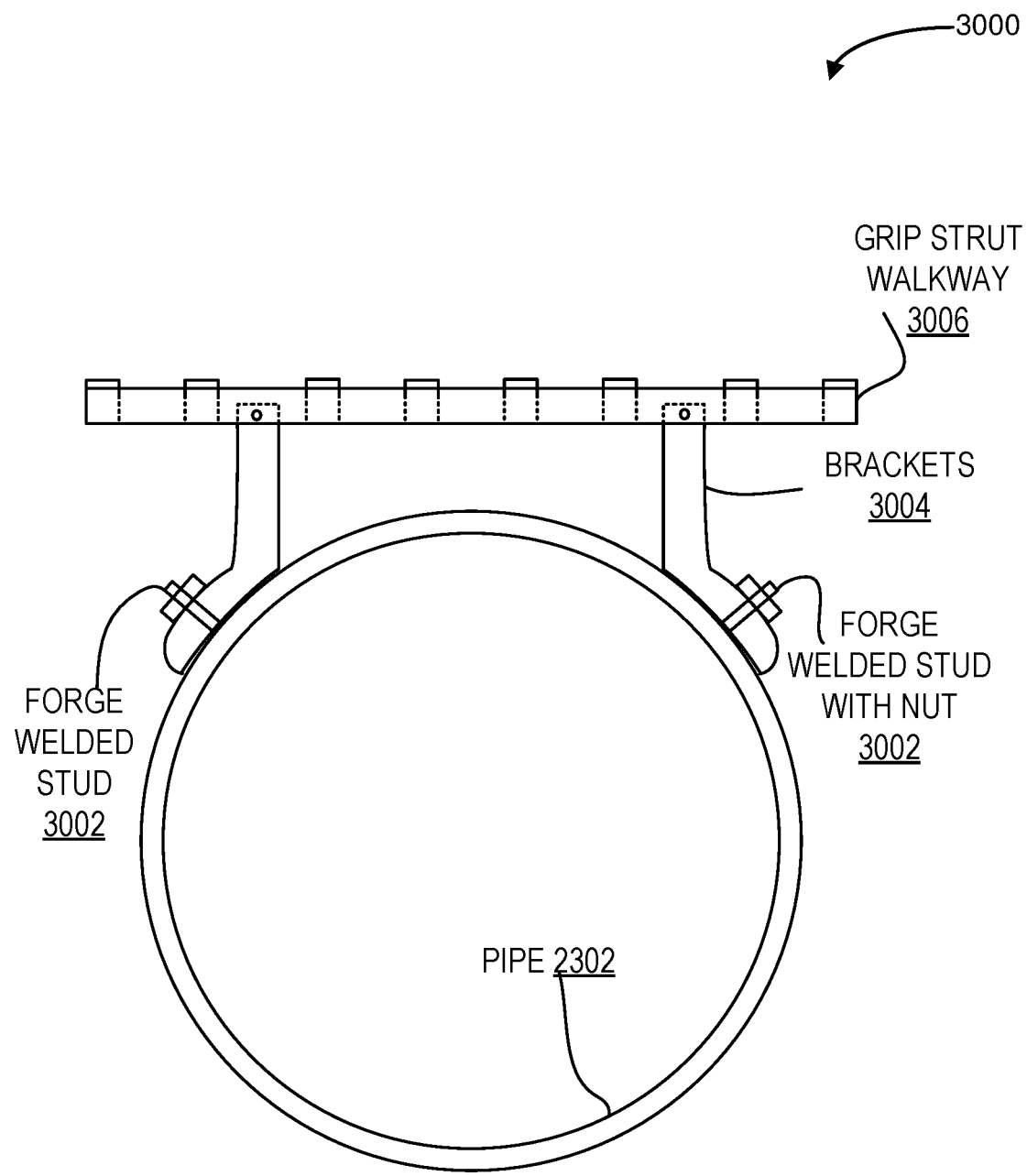
FIG. 30 is a cross section diagram of portable friction forge bonder (PFFB) with studs being used to secure a walkway to a pipe, according to an implementation.

FIG. 30 is a cross section diagram of portable friction forge bonded studs being used to secure a walkway to a pipe 3000, according to an implementation. Studs 3002 are first attached to the pipe 2302, then walkway brackets 3004 are installed. Once the brackets 3004 are installed the walkways 3006, such as Grip Strut, are bolted to the brackets 3004. The brackets 3004 could also be pre-welded to the Grip Strut walkways 3006. Ladders (not shown in FIG. 30) could be attached to vertical pipes in the same way even if volatile material is flowing in the pipe 2302.

Figure 31:
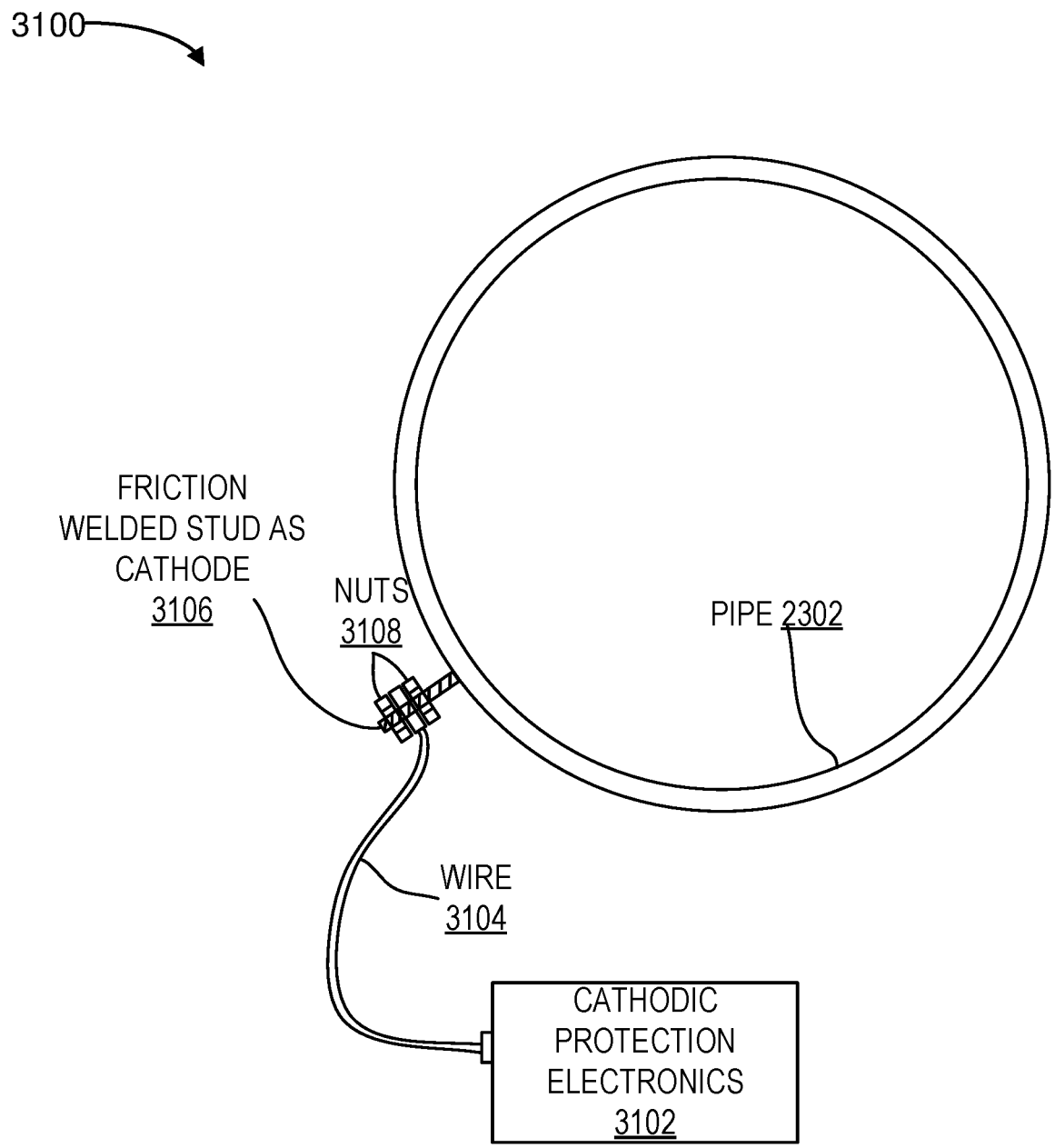
FIG. 31 is a cross section diagram of a portable friction forge bonder used to attach cathodes for cathodic protection systems on pipelines, according to an implementation.

FIG. 31 is a cross section diagram of a cathodic protected pipe 3100 where a portable friction forge bonder (PFFB) attaches cathodes for cathodic protection on pipelines, according to an implementation. A cathodic protected pipe includes cathodic protection electronics 3102 coupled via a wire 3104, a friction welded stud 3106 and nuts 3108 that acts as a cathode. A portable friction forge bonded stud is a better electrical contact than drill and tap and is much stronger and less likely to break off from accidental impact. A friction welded cathode is also less likely to corrode over time.

Figure 32:
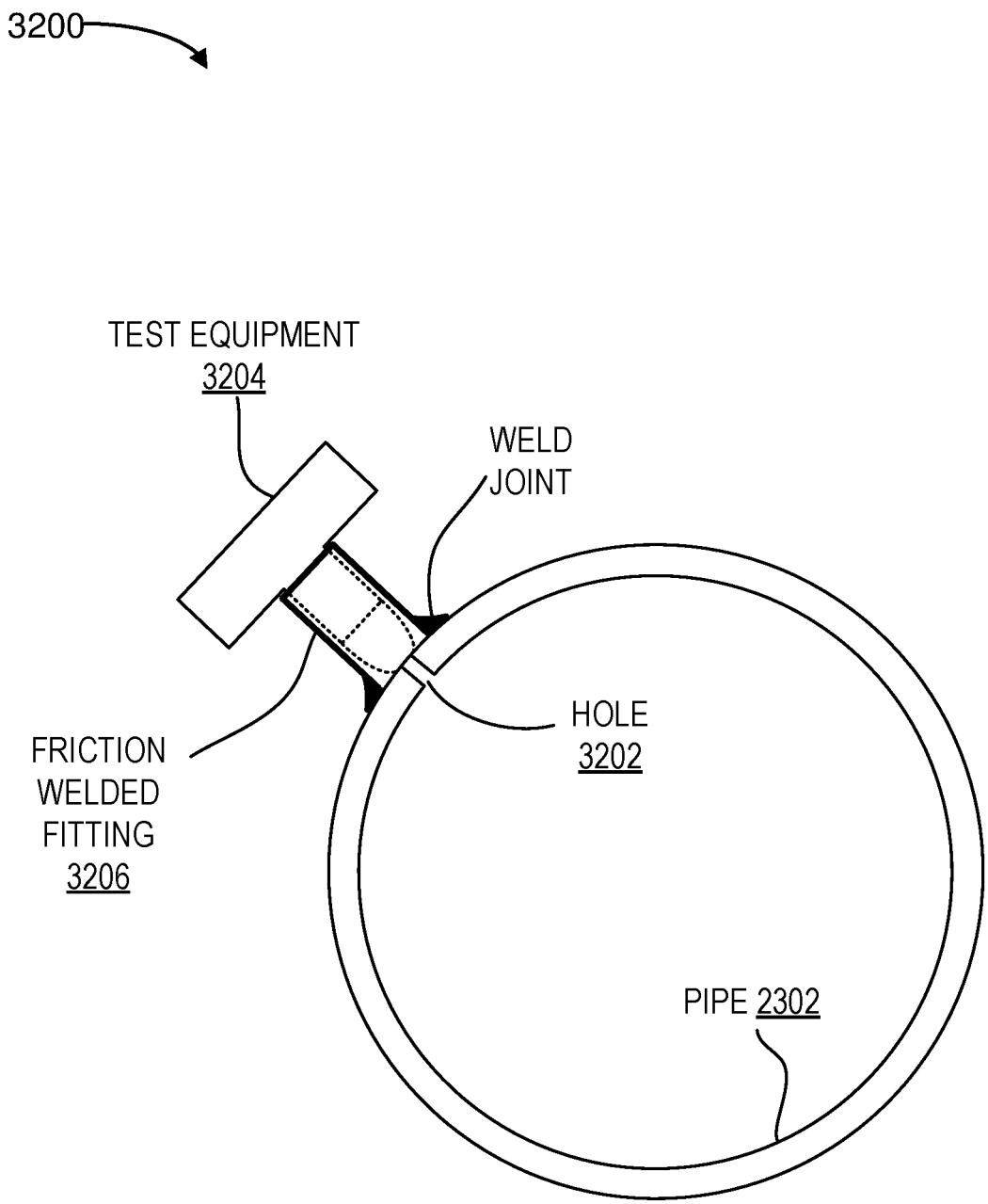
FIG. 32 is a cross section diagram of a large 2" fitting attached for testing of chemicals in a pipe, testing of the environment outside the pipe or both, according to an implementation.

FIG. 32 is a cross section diagram of a large 2" fitting attached for testing or sampling chemicals or conditions in a pipe 3200, testing of the environment outside the pipe or both, according to an implementation. A hole 3202 is drilled in the pipe 2302 using the repair system shown in FIG. 3. This allows chemicals in the pipe 2302 to be sampled or measured. Test equipment 3204 can be mounted to a friction welded fitting 3206 or the test equipment 3204 can be cable connected (not shown) or connected to a bracket (also not shown).

Figure 33:
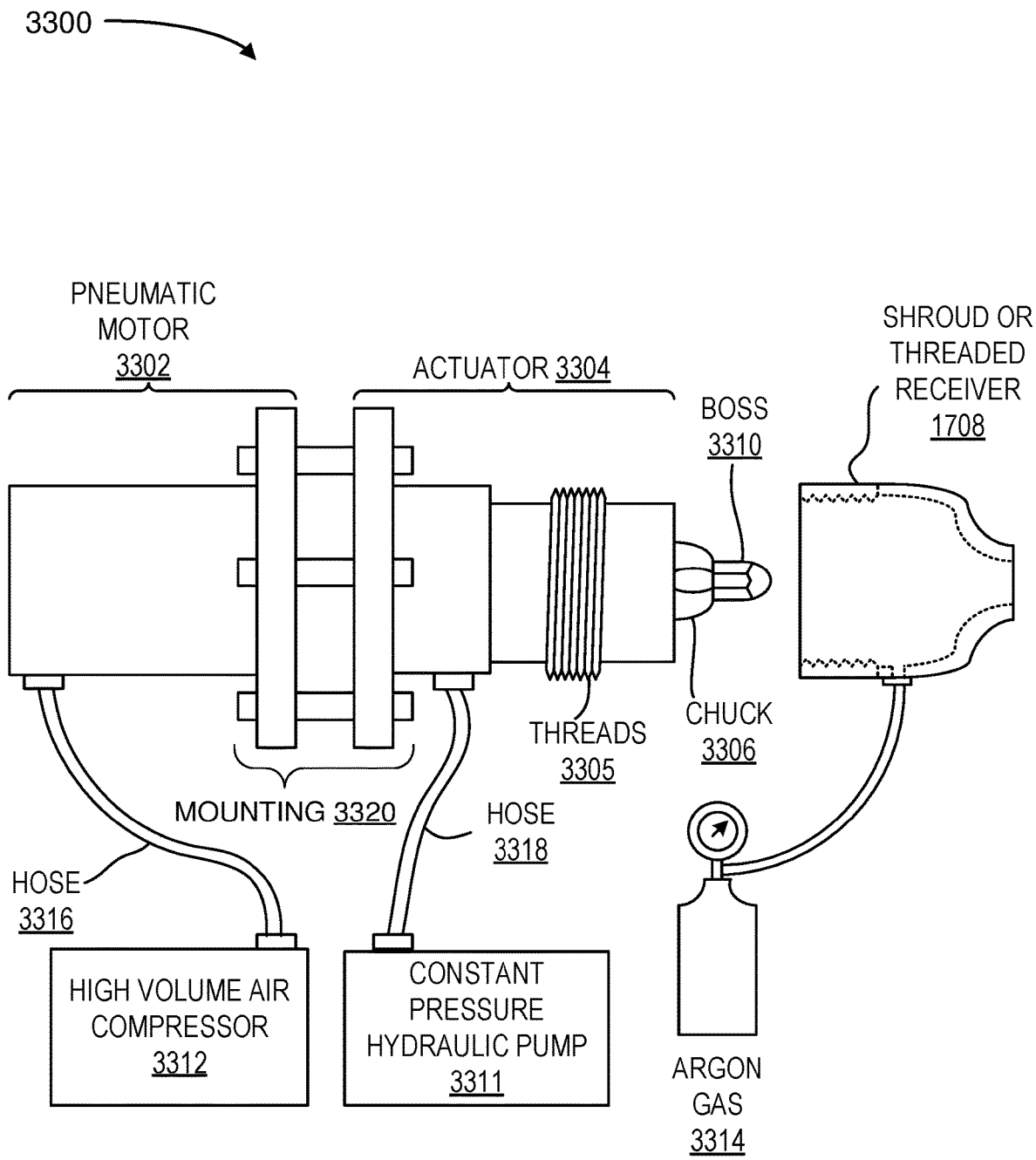
FIG. 33 is a block diagram of a portable friction forge bonder, according to an implementation.

FIG. 33 is a block diagram of a portable friction forge bonder (PFFB) 3300, according to an implementation. The portable friction forge bonder (PFFB) 3300 includes a pneumatic motor 3302, an actuator 3304 and a chuck 3306. A shroud or threaded receiver 1708 allows the PFFB to be connected to the device being enhanced or repaired. The chuck 3306 holds and couples the rotational driving force from the motor 3302 and the axial load force from the actuator 3304, to a boss 3310. The actuator 3304 that has threads 3305 applies a predetermined amount of load to the chuck 3306 and the boss 3310 through pressure from a constant pressure hydraulic pump 3311. The motor 3302 derives its power from a high volume air compressor 3312. The shroud or threaded receiver 1708 bathes the boss 3310 in an inert gas such as argon gas 3314 to eliminate air and thus any possibility of ignition from the welding area and to improve the quality of the weld. The constant pressure hydraulic pump 3311 is operably coupled to the actuator 3304 through a hose 3318. The high volume air compressor 3312 is operably coupled to the pneumatic motor 3302 through a hose 3316. The high volume air compressor 3312 can be connected to the constant pressure hydraulic pump 3311 to provide power for the constant pressure hydraulic pump 3311. A hand pump (not shown) could also be used to power constant pressure hydraulic pump 3311.

Figure 34:
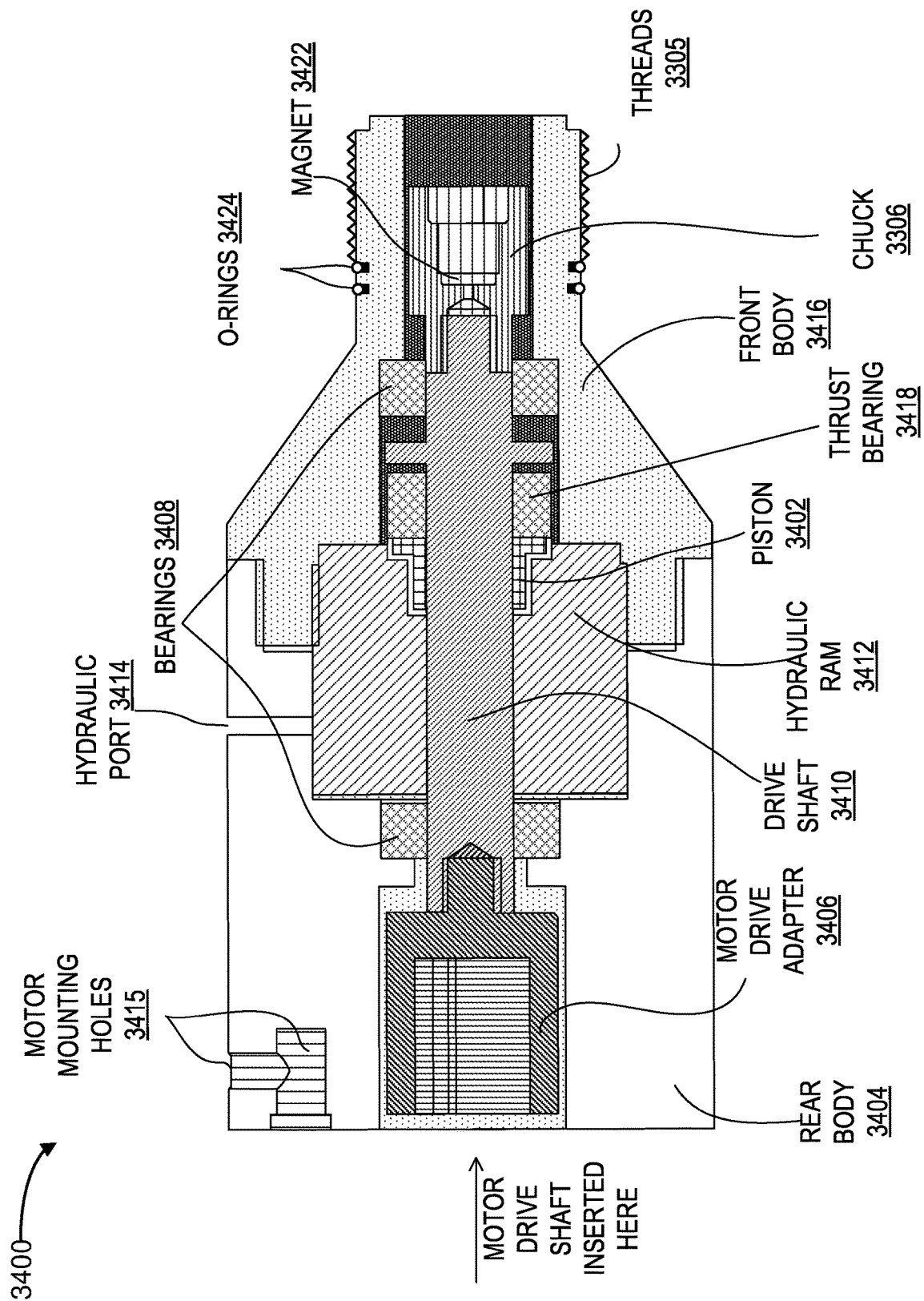
FIG. 34 is a cross sectional drawing of a preferred embodiment of the actuator, according to an implementation.

FIG. 34 is a cross sectional drawing of an actuator 3400, according to an implementation. Constant pressure hydraulic pump 3311 applies hydraulic pressure through hose 3318, through hydraulic port 3414, to the hydraulic ram 3412 which applies pressure to the thrust bearing 3418 which then applies pressure to the drive shaft 3410, which in turn applies pressure to the chuck 3306 in FIG. 33 and the boss 3310 (boss 3310 not shown in FIG. 34) in FIG. 33. Magnet 3422 holds boss 3310 in place during initial setup of the welding process. The thrust bearing 3418 allows drive shaft 3410 to rotate under pressure from hydraulic ram 3412 while allowing axial force to be applied to the chuck 3306. The threads 3305 hold the actuator 3304 in FIG. 33 to the shroud or threaded receiver 1708, so that the pressure on the boss 3310 in FIG. 33 is transferred to the valve 100 during friction welding. As the boss 3310 in FIG. 33 is driven into the surface of valve 100 during the welding process, the constant pressure hydraulic pump 3311 in FIG. 33, and the piston 3402 with hydraulic ram 3412 absorbs the spatial difference. The mounting 3320 in FIG. 33 is an attachment apparatus between the pneumatic motor 3302 in FIG. 33 and actuator 3304 in FIG. 33. A drive shaft 3410 is inserted into a rear body 3404 of the actuator 3400 that includes a motor drive adapter 3406 and bearings 3408. The motor drive adapter 3406 is operably connected to a drive shaft 3410 which is operably connected to a hydraulic ram 3412. The rear body 3404 includes a hydraulic port 3414 and motor mounting holes 3415 (a portion of mounting 3320 in FIG. 33). A front body 3416 is operably connected to the rear body 3404, and contains bearings 3408, a thrust bearing 3418, a motor drive adapter 3406 and a magnet 3422. The front body 3416 also includes O-ring 3424 that seals to a shroud or threaded receiver 1708 such as a hydraulic clamp 1700 and the front body 3416 includes threads 3426 to connect to the shroud to a threaded receiver 1708. Chuck 3306 in FIG. 33 is shown to protrude from actuator 3304 in FIG. 33 and chuck 3306 in FIG. 34 is shown to be contained within actuator 3400. These are two different implementations that perform the same function.

Figure 35:
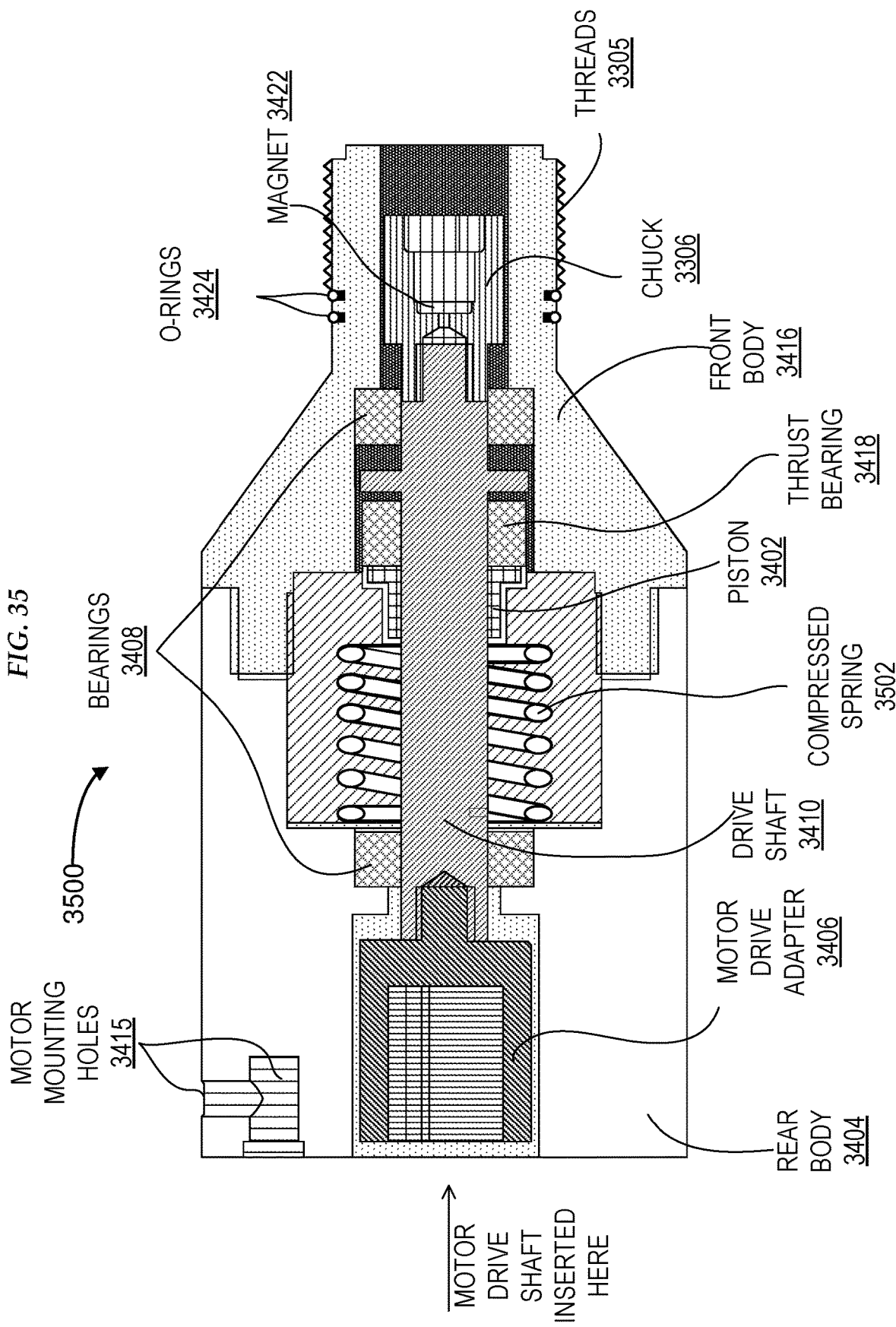
FIG. 35 is the cross sectional drawing of another embodiment of the actuator, according to an implementation

FIG. 35 is the cross sectional drawing of an actuator 3500, according to an implementation. Actuator converts spring force into force on the piston 3402 which in turn applies a force to the chuck 3306 in FIG. 33 and the boss 3310 in FIG. 33. The threads 3305 hold the actuator 3500 to the clamping device, so that the force on the boss 3310 in FIG. 33 is transferred to the valve 100 during friction welding. The compressed spring 3502 maintains constant pressure on the piston 3402. As the boss 3310 in FIG. 33 is driven into the surface of valve 100 during the welding process, the compressed spring 3502 and piston 3402 absorb the spatial difference. The mounting holes 3415 (a portion of mounting 3320 in FIG. 33) provide an attachment apparatus for the pneumatic motor. A driveshaft is inserted into a rear body 3404 of the actuator 3500 that includes a motor drive adapter 3406 and bearings 3408. The motor drive adapter 3406 is operably connected to a drive shaft 3410 and passes through a compressed spring 3502, piston 3402 and thrust bearing 3418. The rear body 3404 includes motor mounting holes 3415. A front body 3416 is operably connected to the rear body 3404, and contains bearings 3408, a thrust bearing 3418, a chuck 3306 and a magnet 3422. Magnet 3422 holds boss 3310 in place during initial setup for a weld process. The front body 3416 also includes O-ring 3424 that seals to a shroud or threaded receiver 1708 such as a chain clamp 1900 and the front body 3416 includes threads 3426 to connect to the shroud to a threaded receiver 1708. Different strength springs can be used to vary the axial force applied by the actuator 3500. Also, coaxial springs or smaller springs placed inside of larger springs can be used to select the axial force applied by actuator 500 in smaller increments.

Figure 36:
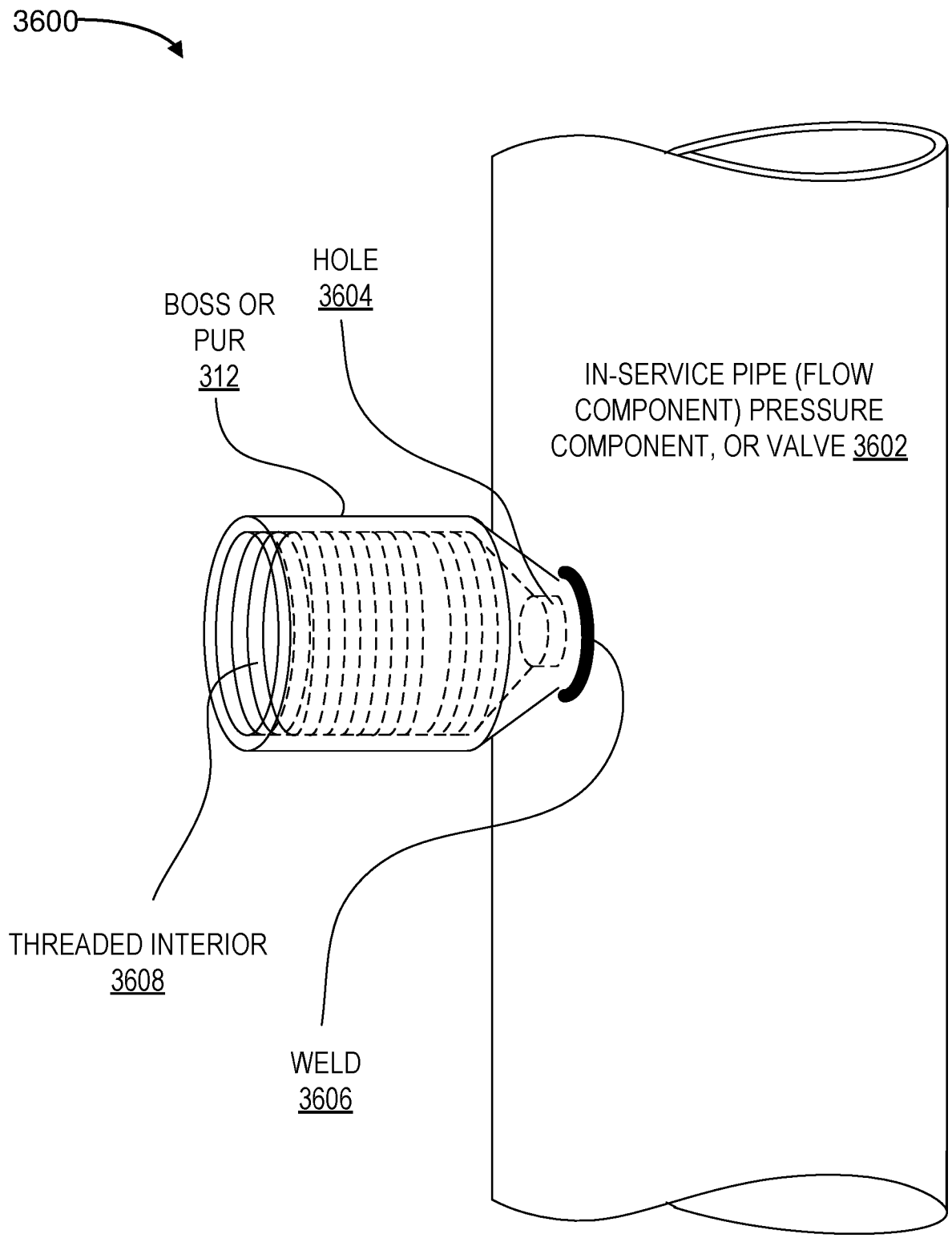
FIG. 36 is an isometric diagram of a boss or Permanent Universal Receiver (PUR) attached through friction welding to an in-service pipe, pressure component or a valve, according to an implementation.

FIG. 36 is an isometric diagram of a boss 312 or Permanent Universal Receiver (PUR) attached through friction welding, also known as solid-state joining or friction bonding, to an in-service pipe (flow component), pressure component or a valve, according to an implementation. Friction welding is also known as solid-state joining or friction bonding. Friction welding has superior qualities to other types of welding, joining or bonding such as; lower temperature, spark-free, welding of dissimilar metals and materials, welding under water and within liquids, welding in hazardous environments, welding without needing to clean the work surface, higher tensile and sheer strength and higher torque capacity. The pressure component could contain a positive, negative or ambient pressure. An in-service pipe, pressure component, a valve or other container 3602 may be in or out of service when the PUR 312 is being attached however, there is great value in attaching PUR 312 while pipe (flow component), pressure component, or valve 3602 is in-service. The PUR 312 is attached to the in-service pipe 3602 by friction welding the PUR 312 to the in-service pipe 3602 wall, creating a weld 3606. To gain access to the inside of pipe, pressure component or valve 3602 or to the contents within it, a hole 3604 may be drilled. The in-service pressure component 3602 may also be a valve flange or the valve bonnet. The PUR 312 contains at least one set of threads 3608 for receiving a multitude of devices, equipment or sensors. Any other attachment apparatus could be used such as threads, cam locks, unions, flanges, twist locks, clamps or external threads. An internal set of threads are shown in FIG. 36. A second set of outer threads could be added and used to receive additional devices or to accept a protective cover for the PUR 312. With a single PUR 312, an unlimited number of devices can be designed for attachment to the in-service pipe, pressure component or valve 3602. In repairing valves, the boss or PUR 312 receives an injection system 302 as shown in FIG. 3. This allows the valve 3602 to be repaired and still allow additional devices or equipment to be attached. For example, a tag indicating repair date or status, regulatory body compliance, maintenance tracking information or bar codes can be attached. Sensors for temperature, vibration, acoustics, chemical analysis, radio frequency or strain, for example, could be attached to the PUR 312. Also, sensors that collect data inside, on the surface of or outside pipe, pressure component or valve 3602 could be attached to PUR 312. Any type of sensor could be attached to the PUR 312. The PUR 312 can be attached as a hot tap to pipes to sense, for example, flow rate, temperature, viscosity, pressure, chemical composition, gaseous state, contamination or color. Any hot tapping device could be attached to the PUR 312 including a bleeder or an injection port. By using a single PUR 312 to receive any type of device, far more flexibility is achieved allowing for a far greater variety of uses and since fewer PUR designs can meet many needs, the cost could potentially be lower. In addition, custom or industry standard equipment, devices or sensors can be installed in the PUR 312.

Figure 37A:
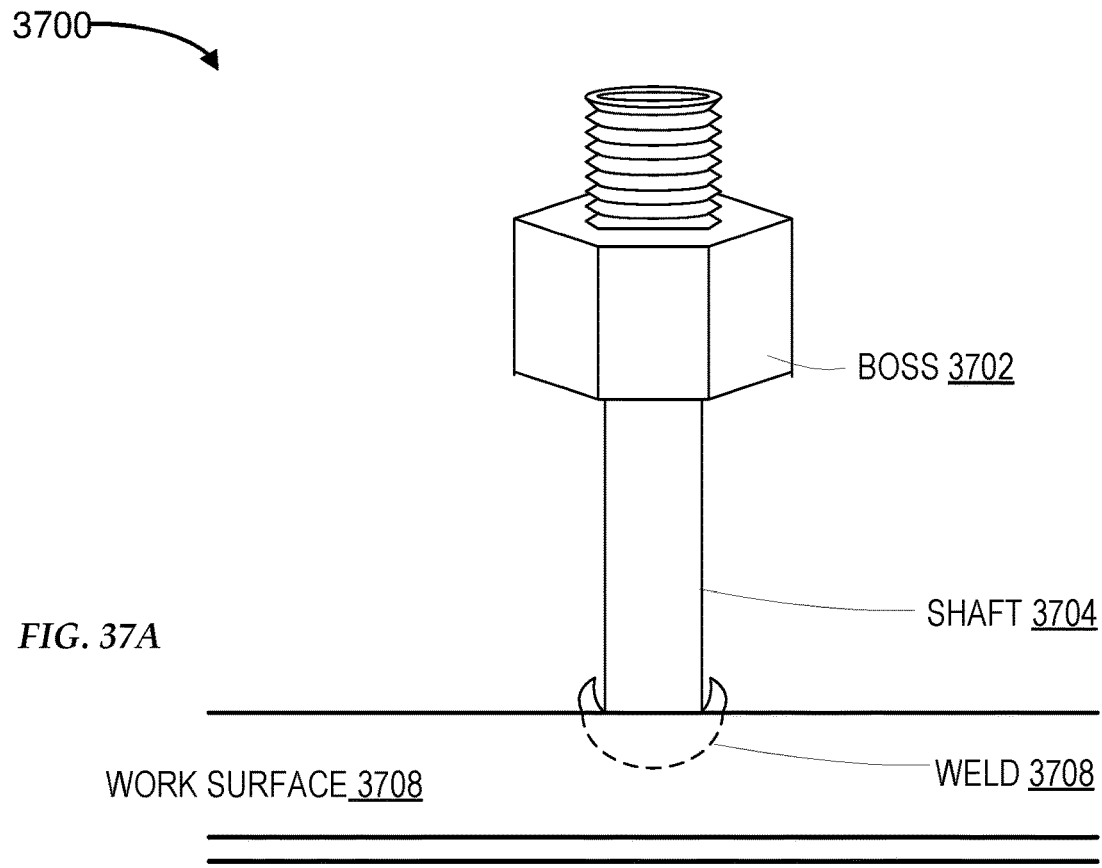
FIGS. 37A and 37B are an isometric drawing of a PUR or boss that is bonded to a work surface through friction welding and subjected to a lateral force at the top of the PUR or boss, according to an implementation.
Figure 37B:
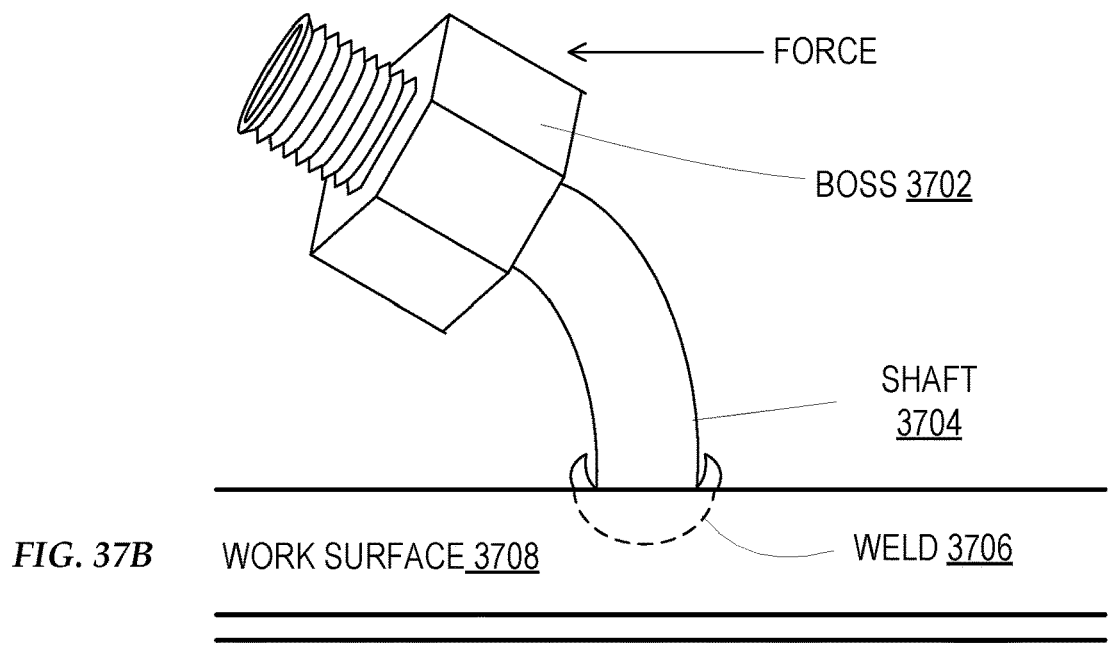

FIGS. 37A and 37B are isometric drawings of a PUR or boss that is bonded to a work surface through friction welding and subjected to a lateral force at the top of the PUR or boss, according to an implementation. The PUR 3702 in FIGS. 37A and 37B has a shaft 3704 that is weaker and more flexible than the weld 3706 or the work surface 3708, allowing a bending of the shaft 3704 to occur when a lateral force is applied as shown in the bottom drawing. The shaft 3704 prevents the weld 3706 or the work surface 3708 from being damaged, protecting the technician and the environment from hazardous chemical release. Standard stainless steel is used to manufacture the PUR 3702, however, any metal can be used that provides the above mentioned advantages. Generally, a softer metal used to manufacture the PUR 3702, will provide more stress relief. An additional advantage of using a softer metal to manufacture the PUR 3702 is that a softer metal generates less heat in the welding process and reduces the temperature at the backside of the work surface 3708. This reduction in temperature provides more safety and less alteration of the chemicals in contact with the backside of the work surface 3708.

Figure 38:
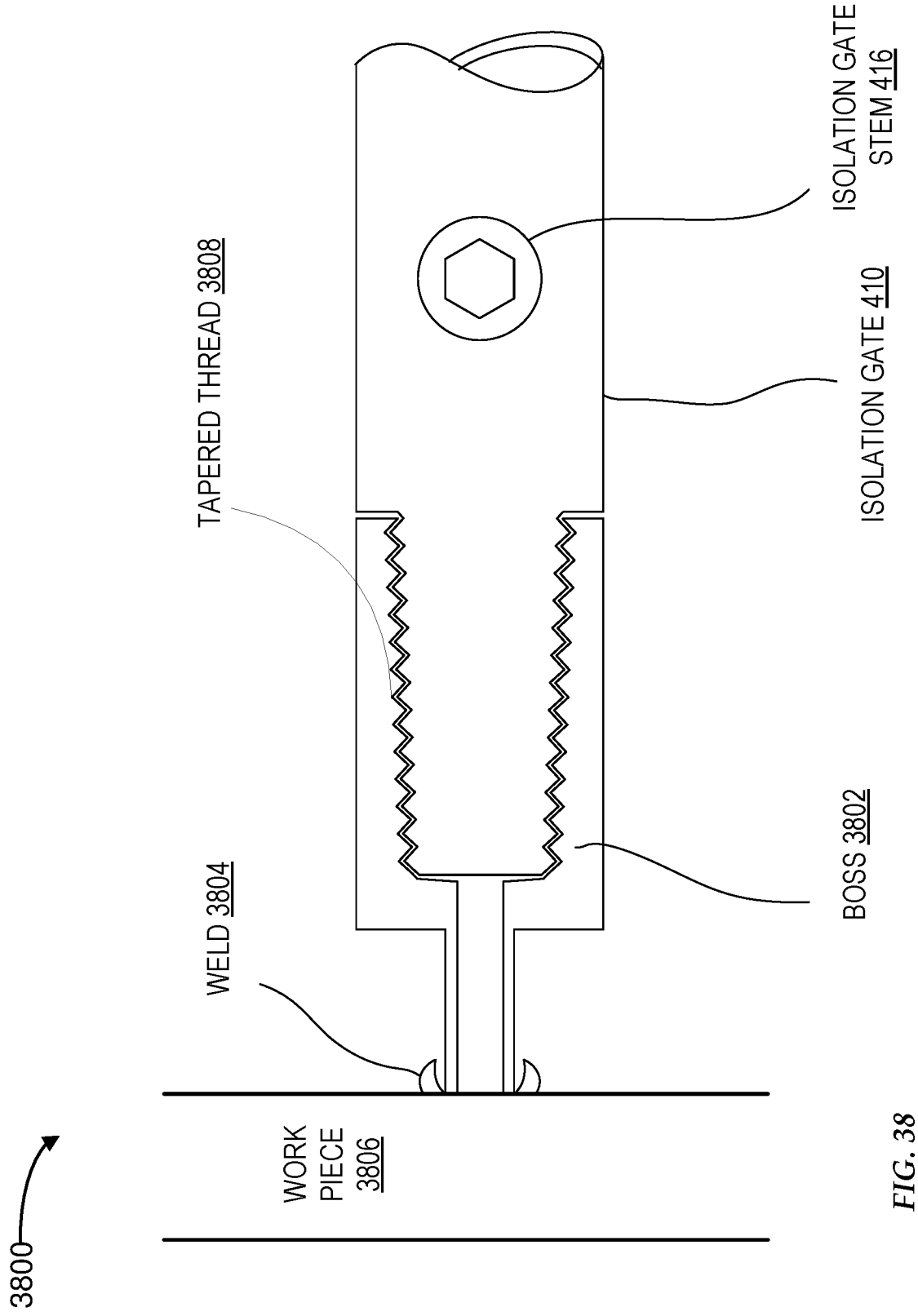
FIG. 38 is PUR or boss that has been attached to a work surface and is threaded with a tapered thread such as a National Pipe Thread (NPT), according to an implementation.

FIG. 38 is an isometric cross section drawing of a PUR or boss that has been attached to a work surface by friction welding or bonding, or solid-phase or solid-state welding and is threaded with a tapered thread such as a National Pipe Thread (NPT) 3800, according to an implementation. The PUR or boss 3802 is attached to a work surface by friction welding or bonding, or solid-phase or solid-state welding to create a weld 3804 between the PUR or boss 3802 and a work piece 3806. The PUR or boss 3802 receives an isolation gate 410 that has a tapered thread 3808 providing a better seal and better resistance to vibration, temperature cycling and leakage than non-tapered threads.

Figure 39:
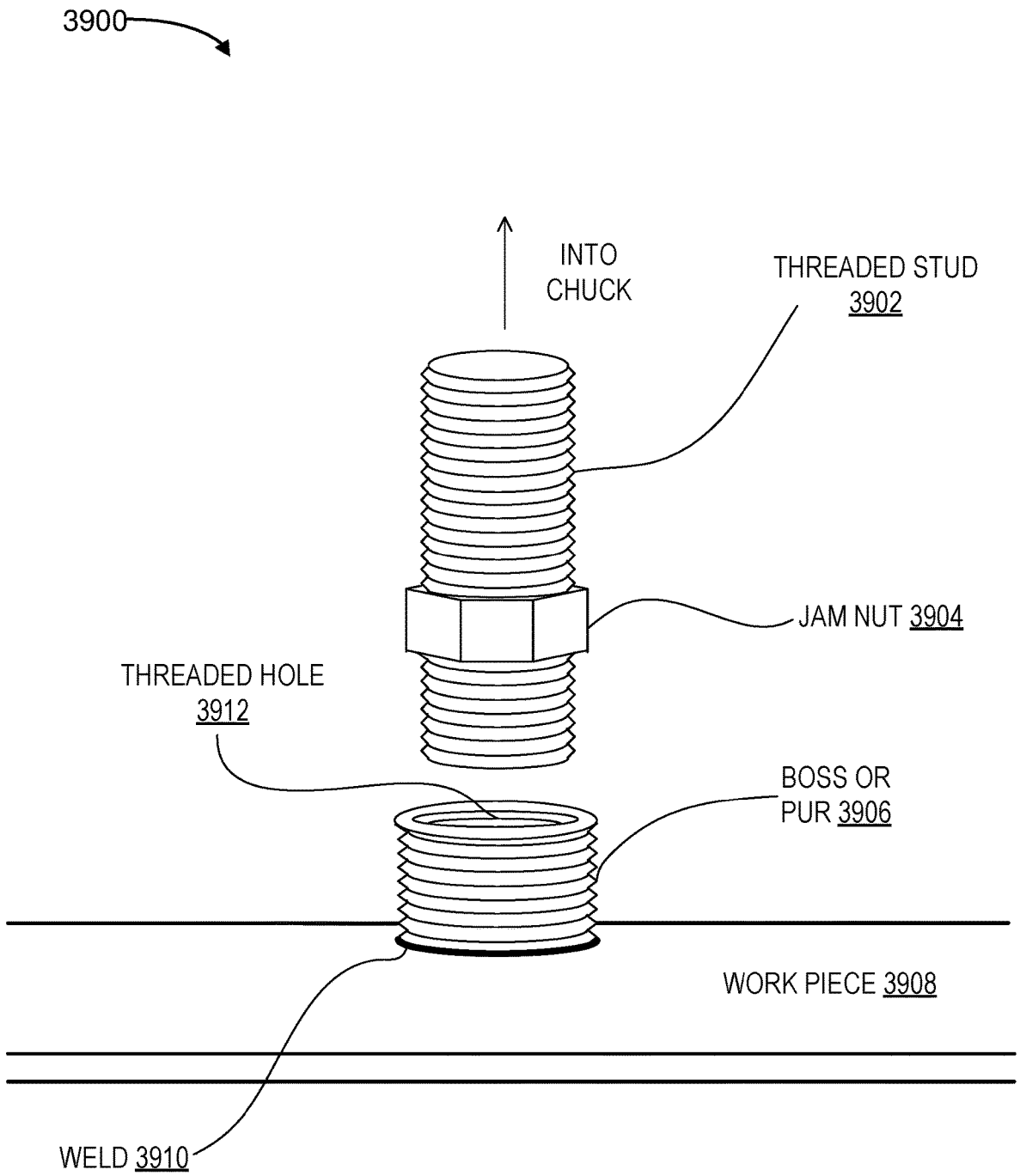
FIG. 39 is a very low profile boss or PUR that is solid-state welded to a work piece, the PUR for receiving a threaded stud and jam nut which is screwed into a chuck, according to an implementation.

FIG. 39 is an isometric drawing of a very low profile boss or PUR that is solid-state welded to a work piece, the PUR for receiving a threaded stud and jam nut which is screwed into a chuck, according to an implementation. A threaded stud 3902 and jam nut 3904 are used to operably couple the PUR 3906 to the chuck (not shown in FIG. 39) during the solid-state welding process. As the chuck is rotated by the motor and actuator (not shown in FIG. 39), the threaded stud 3902 transfers this rotational energy to the PUR 3906. Once the PUR 3906 is bonded to the work piece 3908 by a friction weld 3910, the jam nut 3904 and threaded stud 3902 are loosened from a threaded hole 3912 in the PUR 3906 and the threaded stud 3902 and jam nut 3904 are removed from both the chuck and the PUR 3906. A second jam nut (not shown) could be used to lock the stud into the chuck. Any number of bonding techniques can be used to attach the PUR 3906 to the work piece 3908. The work piece 3908 can be a pressure component, a pipe or a valve. The PUR 3906 allows installation in environments where mechanical interference is an issue.

Figure 40:
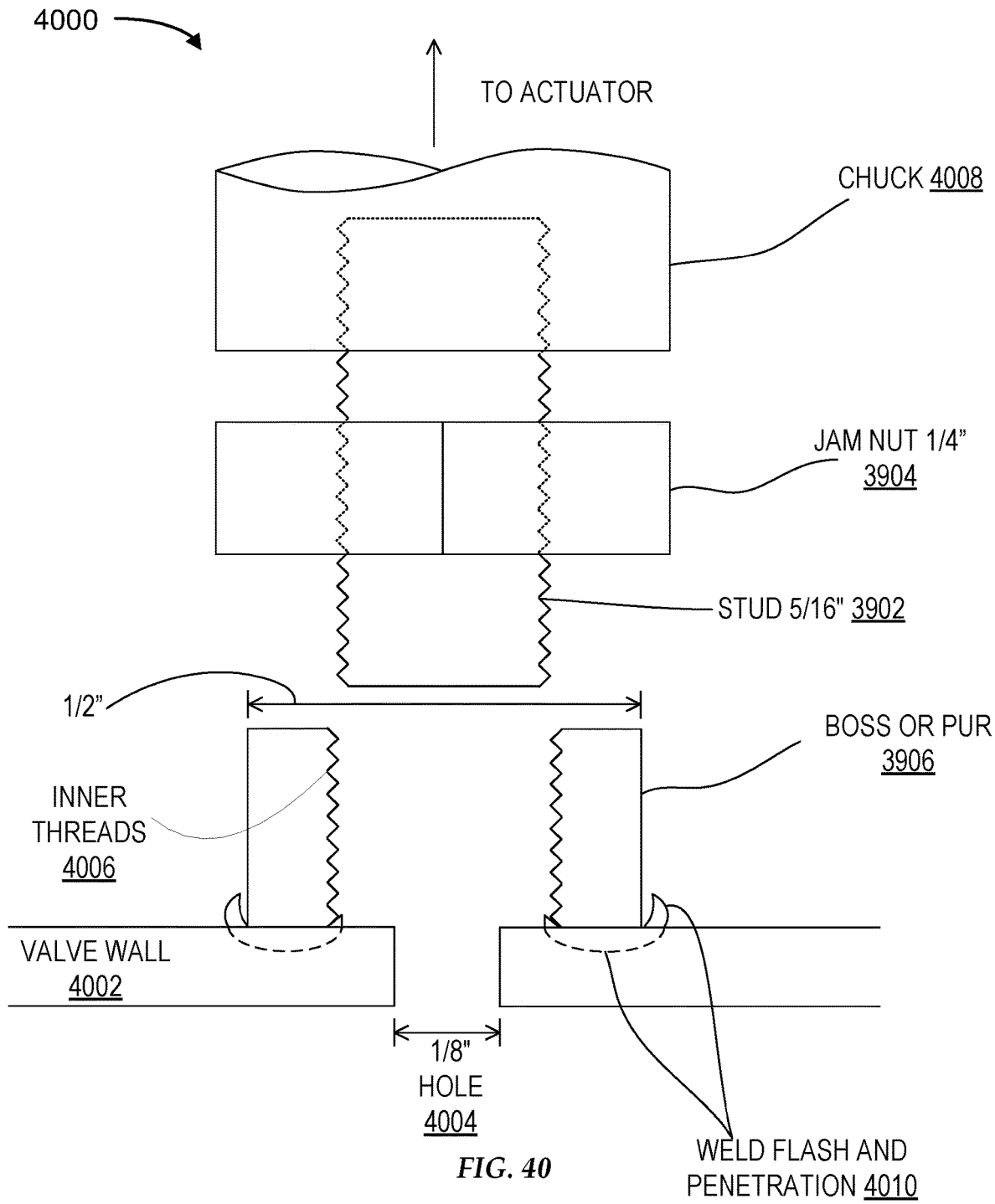
FIG. 40 is a cross section side view of the very low profile boss in FIG. 39, according to an implementation having internal threads on the very low profile boss.

FIG. 40 is a cross sectional side view of the very low profile boss in FIG. 39, according to an implementation having internal threads on the very low profile boss. The very low profile boss or PUR 3906 is shown friction welded to a valve wall 4002 with a hole 4004 drilled through the valve wall 4002. The hole 4004 in the valve wall 4002 is drilled with a narrower diameter than inner threads 4006 of the PUR 3906 to ensure that during the drilling process, the inner threads 4006 of the PUR 3906 are not damaged. To prepare for the friction welding process, the stud 3902 is screwed into the PUR 3906 and the jam nut 3904 is tightened against the PUR 3906 to prevent the stud 3902 from extending beyond the lower edge of the PUR 3906 which prevents the stud 3902 from interfering with the valve wall 4002 during the friction welding process. If the stud 3902 is not long enough to bottom out in the chuck 4008 or if the chuck 4008 does not have a stop for the stud 3902, then a second jam nut (not shown) can be added and tightened against the bottom of the chuck 4008. Any kind of thread (course thread or a fine thread) could be used for the stud 3902 and the PUR 3906. The chuck 4008 does not have to be threaded, but could be any type of chuck 4008 that could hold the stud 3902 during friction welding. The stud 3902 does not have to be threaded at its top if the chuck 4008 is capable of holding the stud 3902 without threads. Also shown in FIG. 40 is the weld flash and penetration zone 4010 from the friction weld 3910 in FIG. 39.

Figure 41:
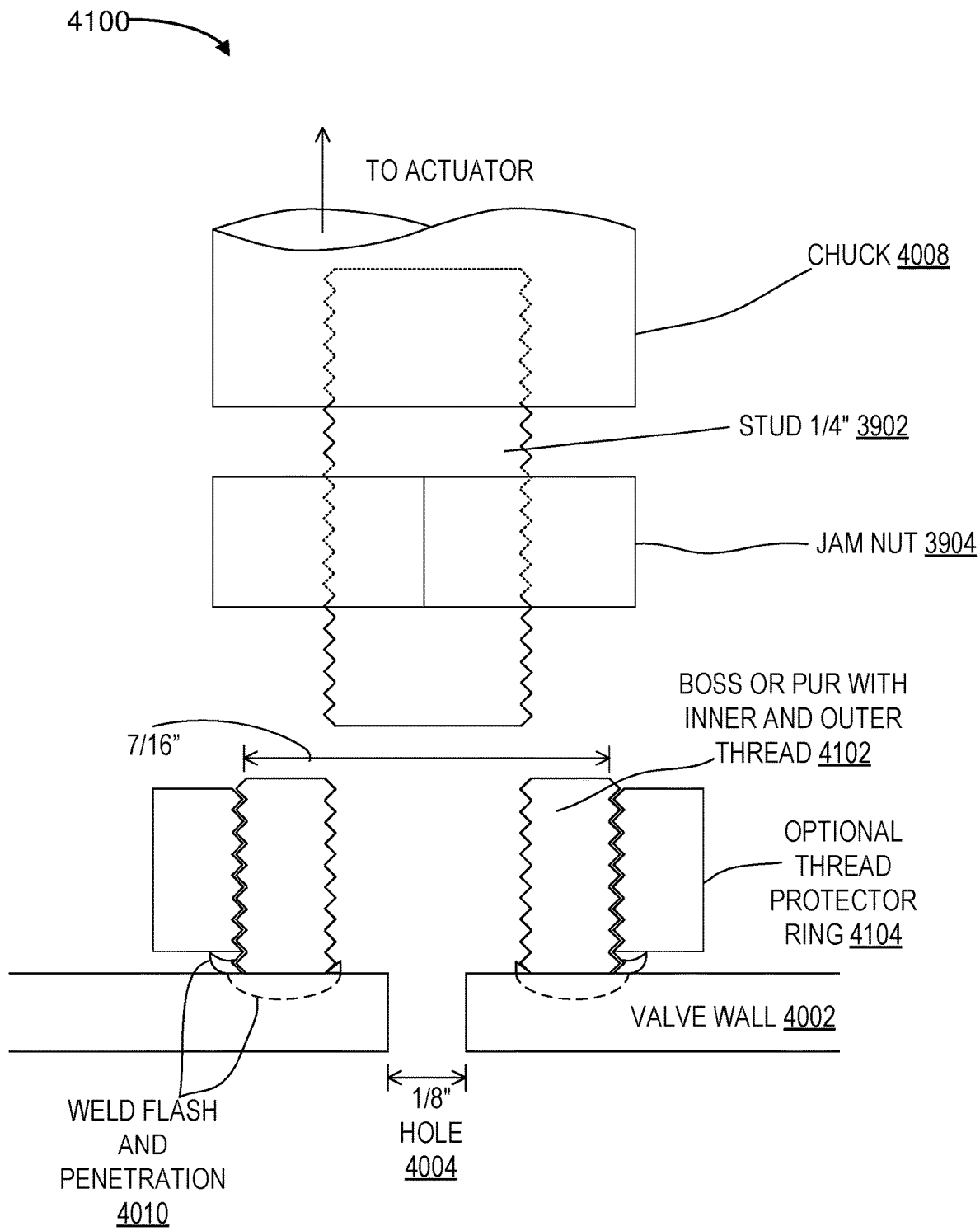
FIG. 41 is a cross section side view of the very low profile boss in FIG. 39, according to an implementation having external threads on the very low profile boss.

FIG. 41 is a cross sectional side view of the very low profile boss in FIG. 39, according to an implementation having external threads on the very low profile boss. The very low profile boss or PUR 4102 having external threads for receiving an optional thread protector ring or any apparatus is shown friction welded to a valve wall 4002 with a hole 4004 drilled through the valve wall 4002. The external threads of the very low profile boss or PUR 4102 can be used to receive a secondary sealing cap (similar to that in FIG. 63, but with the threads on the inside of the cap and outside of the PUR), sensors, test equipment, valves, gates, handles, walkway or ladder supports, tags, bar codes, lighting, drill supports, tools and/or antennas. The hole 4004 in the valve wall 4002 is drilled with a narrower diameter than inner threads 4006 of the PUR 4102 to ensure that during the drilling process, the inner threads 4006 of the PUR 4102 are not damaged. To prepare for the friction welding process, the stud 3902 is screwed into the PUR 4102 and the jam nut 3904 is tightened against the PUR 4102 to prevent the stud 3902 from extending beyond the lower edge of the PUR 4102 which prevents the stud 3902 from interfering with the valve wall 4002 during the friction welding process. If the stud 3902 is not long enough to bottom out in the chuck 4008 or if the chuck 4008 does not have a stop for the stud 3902, then a second jam nut (not shown) can be added and tightened against the bottom of the chuck 4008. Any kind of thread (course thread or a fine thread) could be used for the stud 3902 and the PUR 4102. The chuck 4008 does not have to be threaded, but could be any type of chuck 4008 that could hold the stud 3902 during friction welding. The stud 3902 does not have to be threaded at its top if the chuck 4008 is capable of holding the stud 3902 without threads. Also shown in FIG. 40 is the weld flash and penetration zone 4010 from the friction weld 3910 in FIG. 39.

Figure 42:
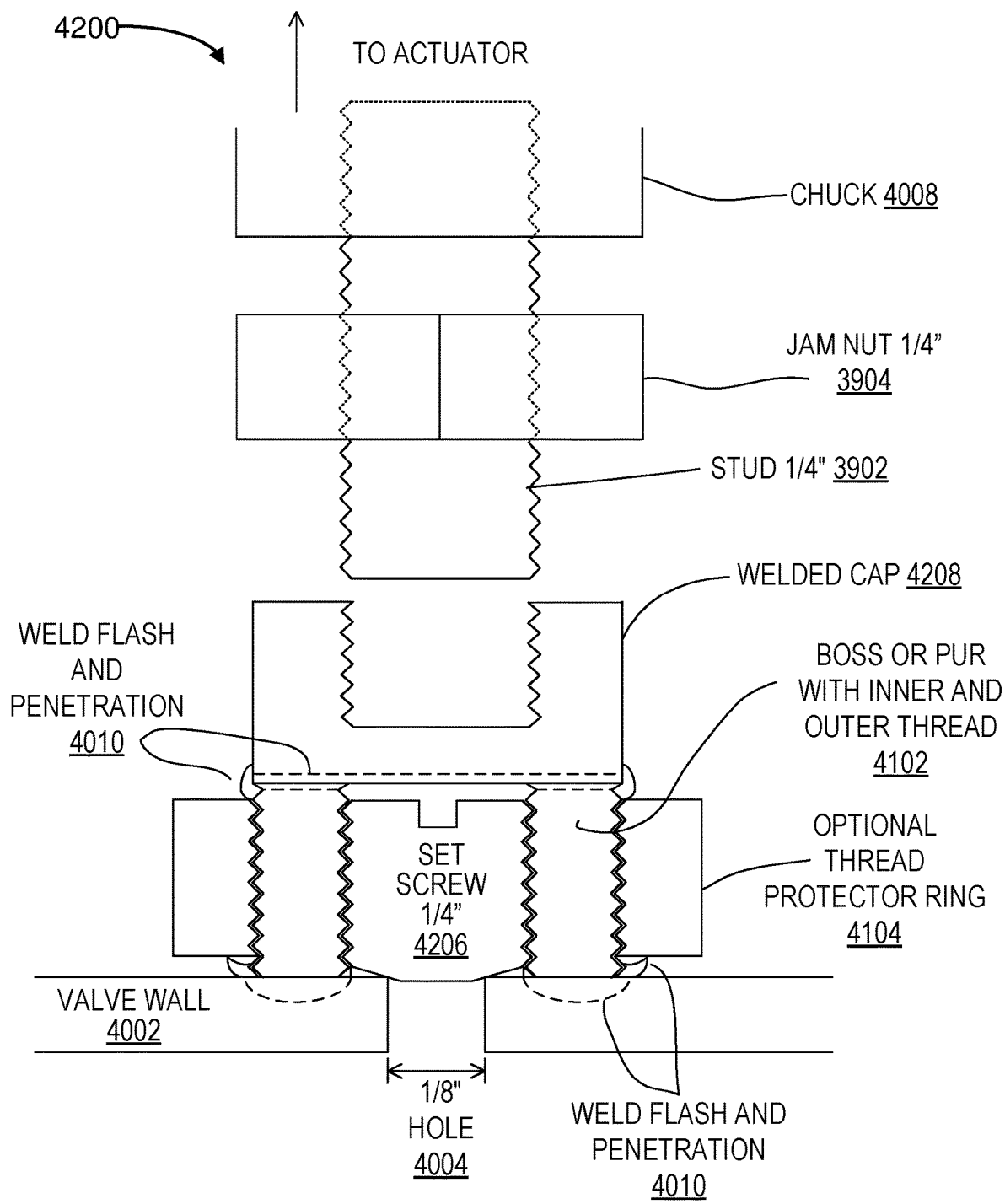
FIG. 42 is a cross section side view of the very low profile boss in FIG. 39, according to an implementation.

FIG. 42 is a cross sectional side view of the very low profile boss in FIG. 39, according to an implementation. The very low profile boss or PUR 4102 is shown friction welded to the valve wall 4002 with the hole 4004 drilled through the valve wall 4002. The hole 4004 in the valve wall 4002 is drilled with a narrower diameter than the inner threads 4006 of the PUR 4102 to ensure that during the drilling process, the inner threads 4006 of the PUR 4102 are not damaged. The hole 4004 is usually drilled after PUR 3906 is bonded to valve wall 4002. To prepare for the friction welding process, the stud 3902 is screwed into the PUR 4102 and the jam nut 3904 is tightened against the PUR 4102 to prevent the stud 3902 from extending beyond the lower edge of the PUR 4102. This prevents the stud 3902 from interfering with the valve wall 4002 during the friction welding process. If the stud 3902 is not long enough to bottom out in the chuck 4008 or if the chuck 4008 does not have a stop for the stud 3902, then a second jam nut (not shown) can be added and tightened against the bottom of the chuck 4008. Any kind of thread (course thread or a fine thread) could be used for the stud 3902 and the PUR 4102. The chuck 4008 does not have to be threaded, but could be any type of chuck 4008 capable of holding the stud 3902 during friction welding. The stud 3902 does not need to be threaded at the top if the chuck 4008 is capable of holding the stud 3902. Also shown in FIG. 42 is the weld flash and penetration 4010 from the friction weld. The PUR 4102 is shown with outer threads that can be used for any number of attachments such as a protective cap, a mount for a threaded receiver or a tag or bar code indicating the repair date or status and particulars of the repair. An optional thread protector ring 4104 is shown and is used to protect the threads from damage. A set screw 4206 is inserted into the PUR 4102 after the hole 4004 is drilled through the valve wall 4002 to prevent chemical from leaking out of the valve after the valve repair or valve sealing is complete. Though a threaded seal may be far more reliable than other types of seals, it is not considered a permanent seal and can eventually leak. To eliminate this leak source, a welded cap 4208 is shown in FIG. 42. After the set screw 4206 is inserted into the PUR 4102, the welded cap 4208 is attached to the PUR 4102 by friction welding, creating a seal that is considered to be permanent. To friction weld the welded cap 4208 to the PUR 4102, the stud 3902 and jam nut 3904 are inserted into the welded cap 4208 to prepare for the friction welding process as before. If access to the hole 4004 is desired at a future time, a hand tool, machine tool or hand-held machine tool can be used to cut the welded cap 4208 away from the PUR 4102. The drilling of the hole 4004 in the valve wall 4002 and the insertion and removal of the set screw 4206 can be accomplished while contained in an injection system to prevent leakage of chemicals into the atmosphere. The welded cap 4208 can be welded to the PUR 4102 using any other welding or bonding technology other than friction welding.

Figure 43:
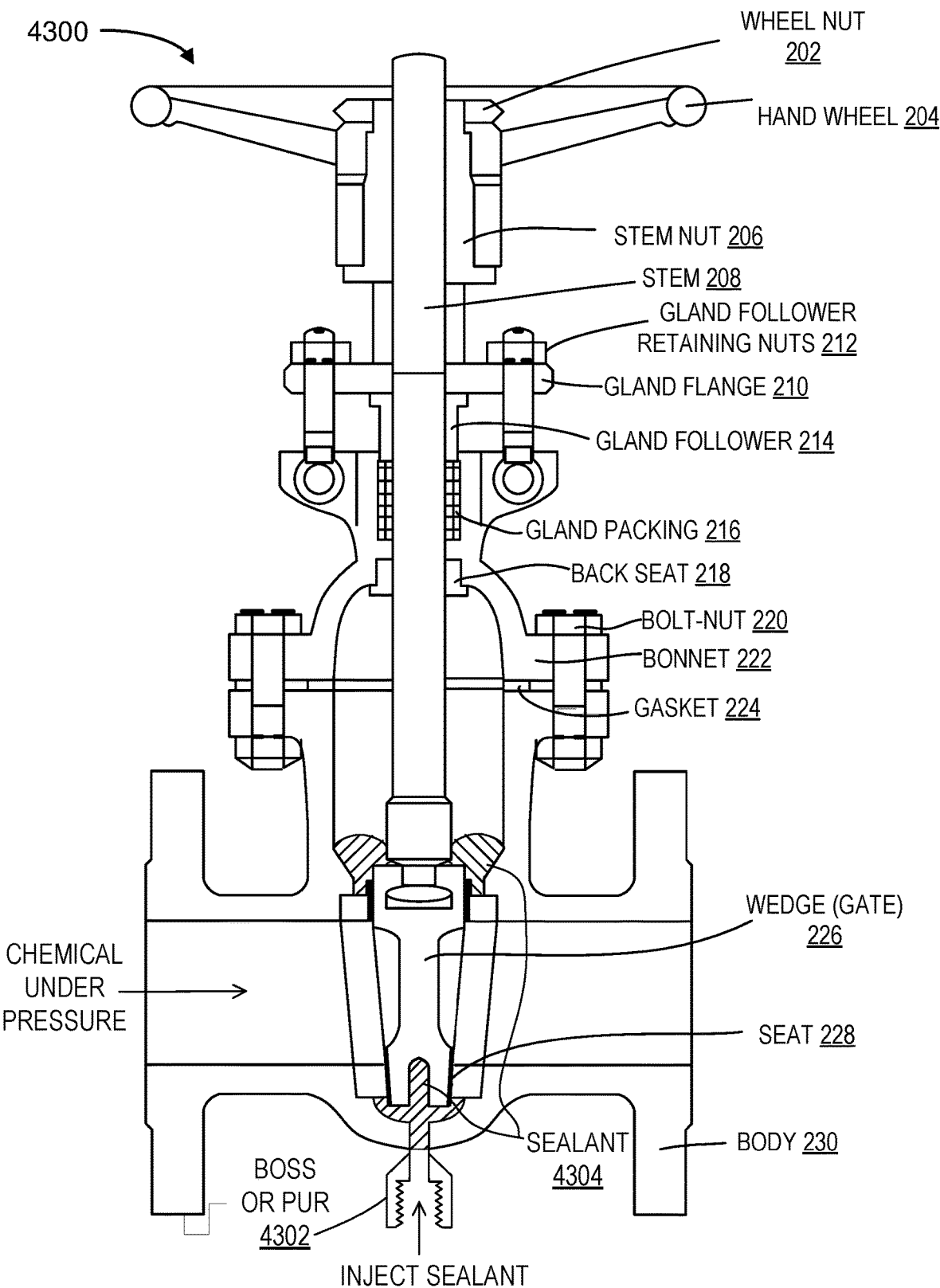
FIG. 43 is cross section side-view of a leak sealed gate valve, according to an implementation.

FIG. 43 is cross sectional side-view of a leak sealed gate valve 4300, according to an implementation. A boss or PUR 4302 is friction welded or bonded to the body 230 of the valve 4300 as shown. Through use of injection system 302, a hole is drilled through the body 230 wall and into the cavity next to valve seat 228. The cavity is circumferential to the wedge gate 226 such that when sealant 4304 is injected into the boss or PUR 4302, the sealant 4304 fills the circumferential cavity as shown. If too much sealant 4304 is injected into the boss or PUR 4302, the hollow area surrounding the lower valve stem will be filled, preventing the gate valve rising and thus the gate valve from opening. This type of seal only works while the valve is in the closed position. Since gate valves are designed to be either fully opened or fully closed, this does not pose a problem. If the gate valve is sealed while it is closed as shown in FIG. 43 and the gate valve is then opened, some or all of the sealant may wash downstream in the valve along with the chemical. If the sealant is washed from the valve seat 228, then it will have to be re-sealed once the gate valve is closed again.

Figure 44:
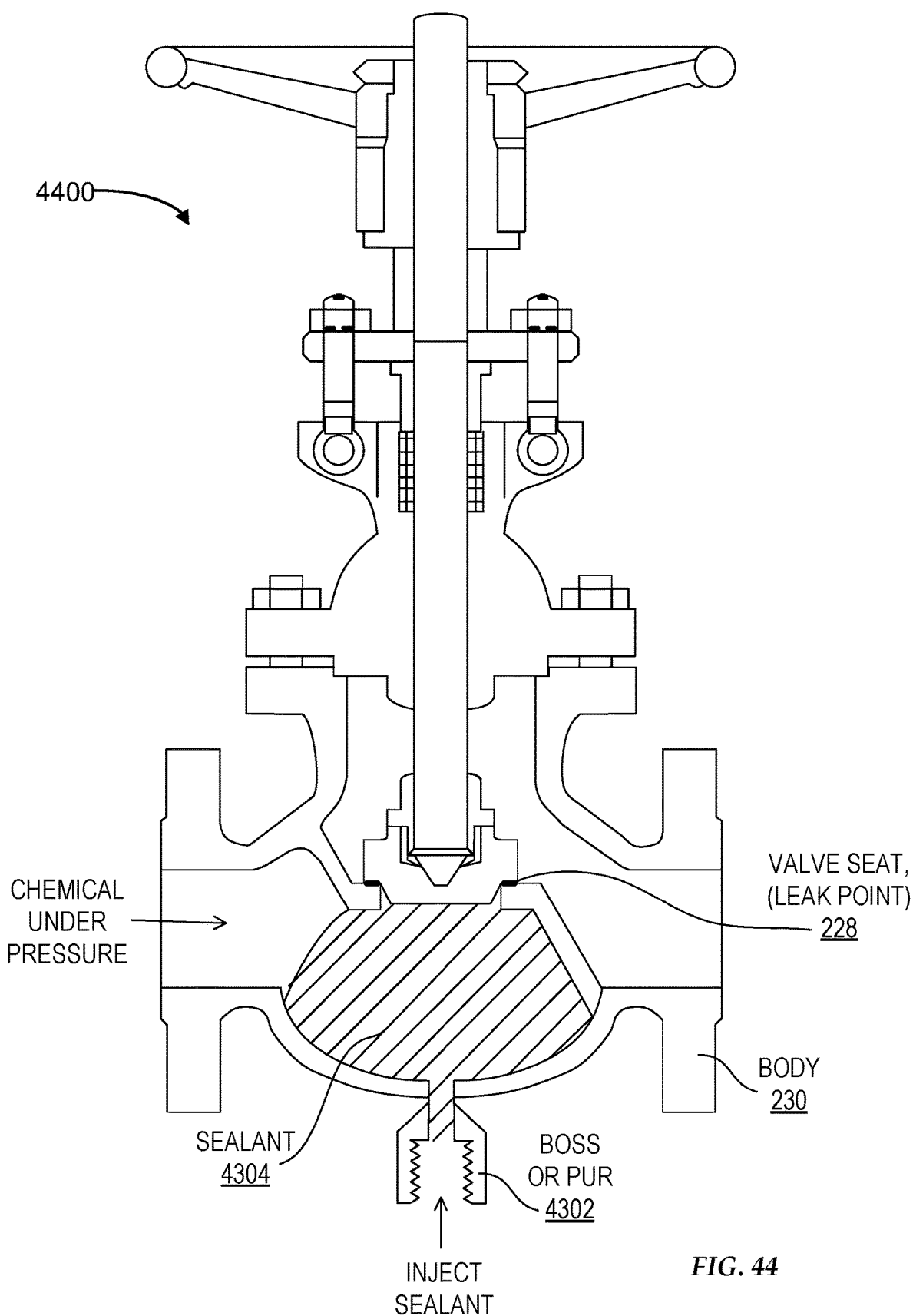
FIG. 44 is a cross section side-view of a leak sealed globe valve, according to an implementation.

FIG. 44 is a cross sectional side-view of a leak sealed globe valve 4400, according to an implementation. A boss or PUR 4302 is friction welded or bonded to the body 230 of the valve 4400 as shown. Through use of injection system 302, a hole is drilled through the body 230 wall and into the cavity below the valve seat 228. This cavity encompasses to the entire seal such that when sealant 4304 is injected into the boss or PUR 4302, the sealant 4304 fills the cavity as shown. The chemical under pressure holds the sealant 4304 in the defect area of the valve seat 228 that is leaking. This type of seal only works while the valve 4400 is in the closed position. If the globe valve is sealed while it is closed as shown in FIG. 44 and the globe valve is then opened, some or all of the sealant 4304 may wash downstream through the valve along with the chemical. This may be unacceptable in situations where downstream equipment could be damaged or chemical contamination from sealant 4304 is unacceptable. If the sealant 4304 is washed from the valve seat 228, then it will have to be re-sealed once the globe valve is closed again.

Figure 45:
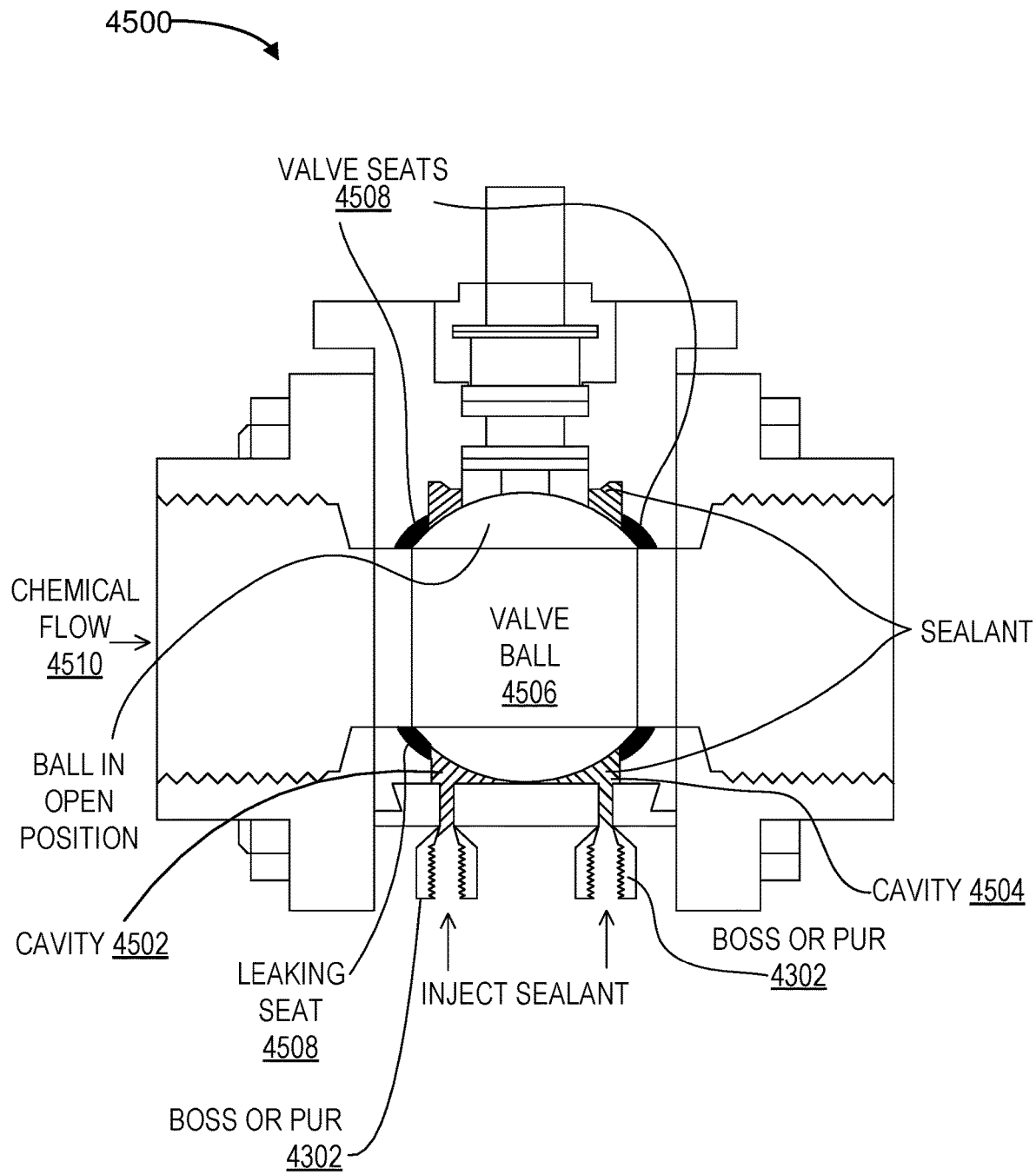
FIG. 45 is a cross section side-view of a leak sealed ball valve, according to an implementation.

FIG. 45 is a cross sectional side-view of a leak sealed ball valve 4500, according to an implementation. One or two boss(es) or PUR(s) 4302 are friction welded or bonded to the body of the valve as shown. Through use of injection system 302, a hole is drilled through each boss or PUR 4302, through the valve body wall and into the two cavities 4502 and 4504 on either side of the valve ball 4506 next to the valve seats 4508 as shown. The two cavities 4502 and 4504 are circumferential to the valve ball 4506 such that when sealant 4304 is injected into the boss or PUR 4302, the sealant 4304 fills the circumferential cavities 4502 and 4504 as shown. Only one boss or PUR 4302 is required if the particular valve being repaired has a passageway between the left and right cavities 4502 and 4504. This passageway is dependent on the ball valve manufacturer's design. If too much sealant 4304 is injected into the boss or PUR 4302, friction from the sealant 4304 could make it difficult to operate the valve. Unlike the gate and globe valves, this type of seal works well while the valve is in any position. If the valve is operated after it has been repaired, sealant will unlikely enter the chemical flow 4510.

Figure 46:
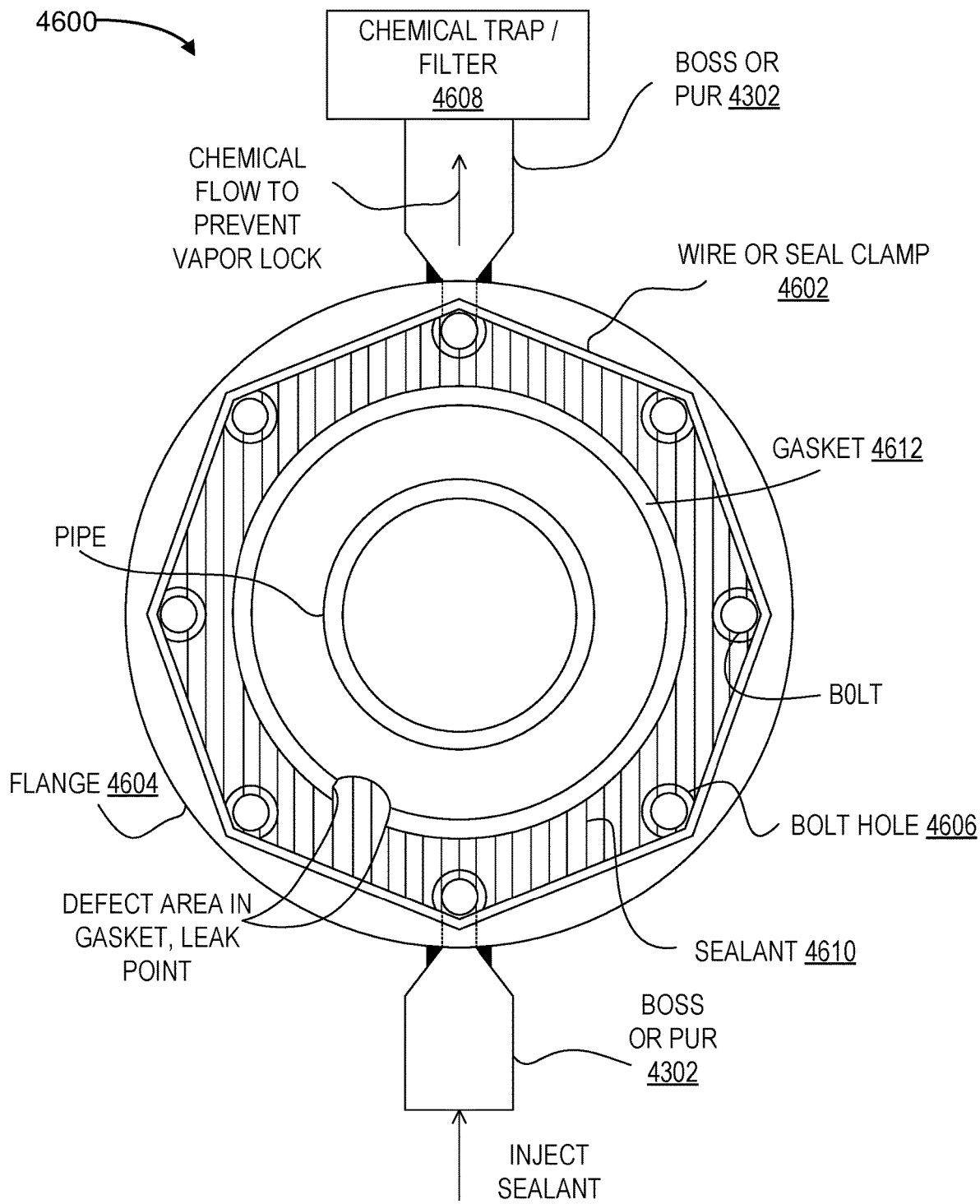
FIG. 46 is a cross section diagram of a pipe flange leak seal, according to an implementation.

FIG. 46 is a cross sectional diagram of a pipe flange leak seal 4600, according to an implementation. In this implementation, two bosses or PURs 4302 aid the injection process, one for injection and the other for venting chemicals to prevent vapor lock. Vapor lock could prevent sealant from flowing through the sealant cavity. In preparation for the pipe flange repair, a wire or seal clamp 4602 is inserted into the groove or gap between the two pipe flanges 4604 as shown. The wire or seal clamp 4602 could be made of wire that is very narrow compared to the flange gap and multiple windings of the wire could be used to close off this gap. The wire or seal clamp 4602 could also be made of wire that is wider than the flange gap and a hammer or other hand tool could be used to peen the wire into the gap to close off the gap. The wire or seal clamp 4602 could be made of a specially designed wire clamp that is inserted into the flange gap instead of a wire. Once the wire or seal clamp 4602 is installed, two bosses or PURs 4302 are friction welded each to the outer most edge of the flange 4604 in line with a bolt hole 4606 on opposite sides of the flange 4604. Using injection system 302, holes are drilled through the flange wall and into the bolt holes 4606 that are aligned with each of the two PURs 4302 and each isolation gate 410 (not shown) is then closed. One of the drill guides 404 can be removed from its isolation gate 410 while leaving this isolation gate 410 attached to the boss or PUR 4302. A chemical trap or filter 4608 is attached to this isolation gate 410 to collect escaping chemicals during the upcoming injection process. Injection pump 306 is used to inject sealant 4610 into the injection system 302 that is still attached to the boss or PUR 4302. At this time, both isolation gates are open. As sealant 4610 is pushed through the injection system 302 and into the cavity created between the wire or clamp 4602 and the gasket 4612, the unwanted chemical that is in this cavity due to the leak is forced out of the cavity into the chemical trap or filter 4608. This makes room for the sealant 4610 and allows the sealant 4610 to fill the entire cavity. Once the cavity is filled with sealant 4610, both isolation gates are closed and the drill guide 404 is removed. If the amount of chemical released into the environment during the injection phase is not of concern, then the chemical trap or filter 4608 is not necessary.

Figure 47:
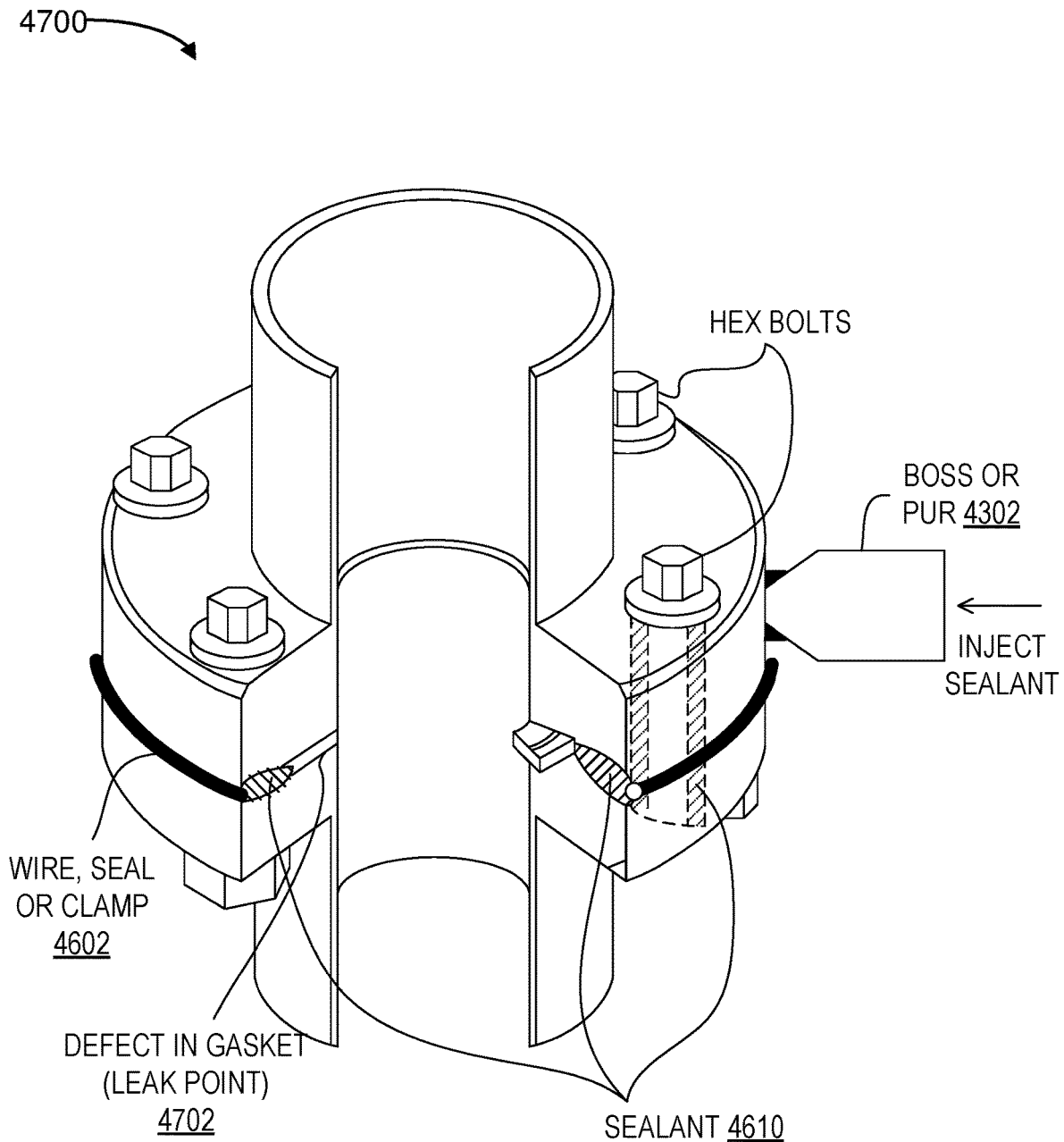
FIG. 47 is an isometric cross section diagram of the pipe flange leak seal of FIG. 46, according to an implementation.

FIG. 47 is an isometric cross sectional diagram of the pipe flange leak seal of FIG. 46, according to an implementation. This implementation is identical to the implementation of FIG. 46, however, in this implementation, only a single boss or PUR 4302 is installed to inject sealant 4610 into cavity between the wire or clamp 4602 and the gasket 4612. In this implementation, the gasket 4612 has a defect area 4702 that will allow chemical that is trapped in the cavity to be pushed back into the pipe as sealant 4610 is injected, in which case, then a second boss or PUR 4302 is not necessary. This works well if there is a single leak point that can be identified and the boss or PUR 4302 is bonded close to this single leak point.

Figure 48:
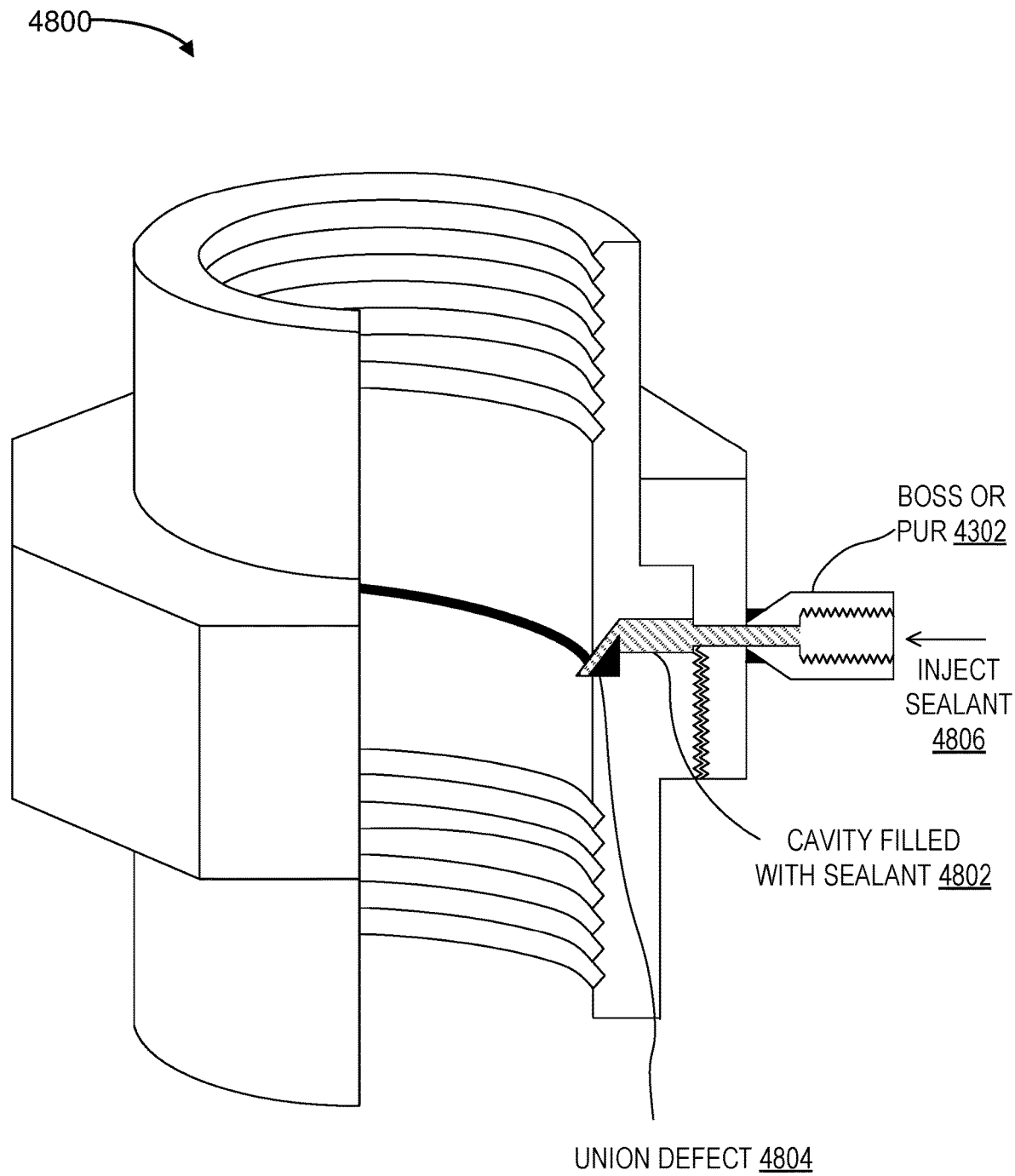
FIG. 48 is an isometric cross section view of a pipe union leak seal, according to an implementation.

FIG. 48 is an isometric cross sectional view of a pipe union leak seal 4800, according to an implementation. A pipe union contains a small gap or cavity 4802 against the union defect 4804 that is circumferential to the union and pipe. A boss or PUR 4302 is friction welded to the union in line with the cavity 4802 within the union. Using injection system 302, a hole is drilled through the wall of the union into the cavity 4802. Sealant is then injected into the cavity 4802 and any chemical that is in the cavity due to the union defect 4804 will be pushed back into the pipe through the union defect 4804. If vapor lock occurs during sealant injection 4806, a second boss or PUR 4302 (not shown in FIG. 48) can be attached to the union in line with the cavity 4802 and used to relieve pressure and allow the chemical to escape. To prevent the chemical from escaping into the environment, a chemical filter or trap (not shown in FIG. 48) can be attached to the boss or PUR 4302 to capture the escaping chemical.

Figure 49:
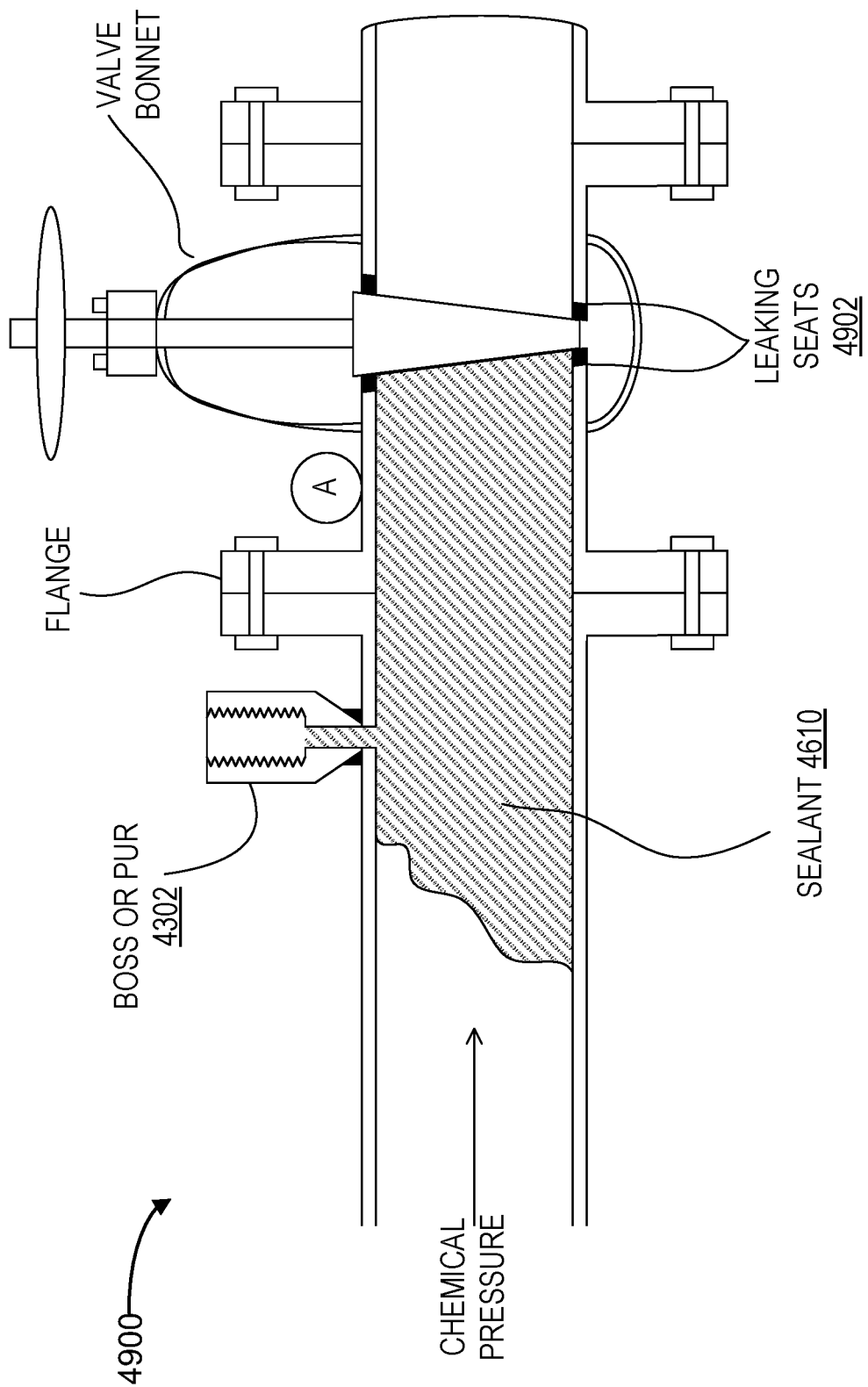
FIG. 49 is a cross section diagram of a line-kill with valve, according to an implementation.

FIG. 49 is a cross sectional diagram of a line-kill with valve 4900, according to an implementation. When the valve seats 4902 are leaking, another way to stop the leakage of chemicals through the valve is to kill the line or pipe that is leading into the valve. One way to do this is by friction welding a boss or PUR 4302 upstream from the valve, closing the valve and then attaching the injection system 302 to the boss or PUR 4302. A hole is drilled through the pipe wall using the injection system 302 to contain any leakage during the drilling and subsequent sealing process. Sealant 4610 is then injected into the pipe through injection system 302. The pressure from the chemical flow in the pipe will force the sealant 4610 into the defect area of the valve seat 4902. This seal is best suited to situations where the valve were not to be opened again, because chemical will not flow downstream and not damage sensitive equipment or contaminate the chemicals in process.

Various sealants 4610 can be used for different purposes. Some sealants 4610 are clay-like, others are liquid or rope-like and some are polymers that harden over time, some are resistant to certain chemicals or water and some are made of Teflon. Some sealants 4610 are hardened with high temperature or ultraviolet light and others are softened or liquefied at high temperature. Sealants 4610 can be made of a wide variety of materials such as Teflon, polymers or metals. One sealant 4610 that would work well in FIG. 49 is a sealant 4610 that hardens with time.

Figure 50:
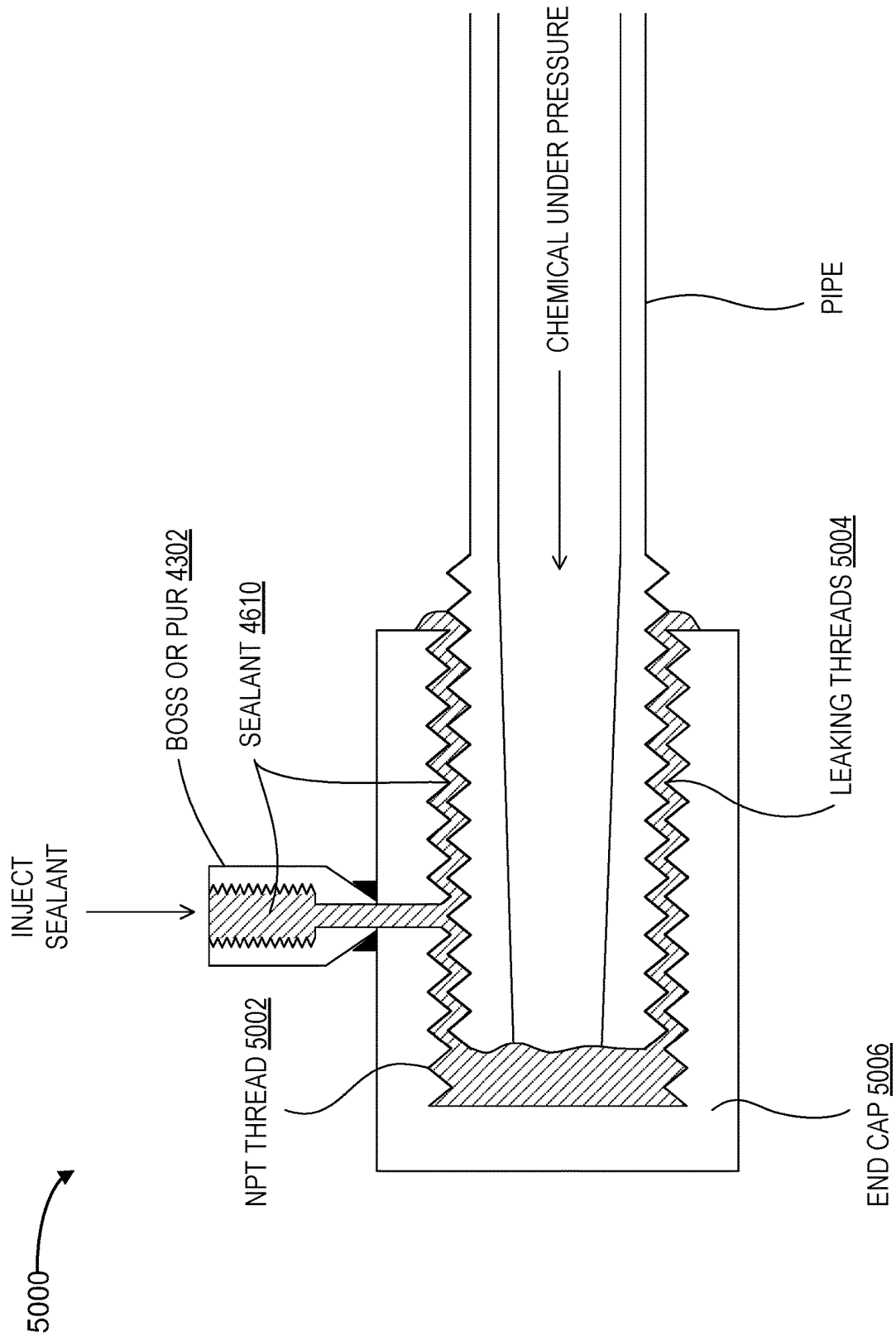
FIG. 50 is a cross section diagram of a threaded pipe leak seal with threaded pipe end-cap, according to an implementation.

FIG. 50 is a cross section diagram of a threaded pipe leak seal with threaded pipe end-cap 5000, according to an implementation. In this implementation, the boss or PUR 4302 is friction welded to an end cap 5006 to the area located over NPT threads 5002. The injection system 302 is then attached to the boss or PLR 4302. A hole is drilled through the end cap 5006 into the threaded region using the injection system 302 to contain any leakage during the drilling and subsequent sealing process. Sealant 4610 is then injected into the leaking threads 5004 through use of injection system 302. An isolation gate 410 is then closed and drill guide 404 is removed.

Figure 51:
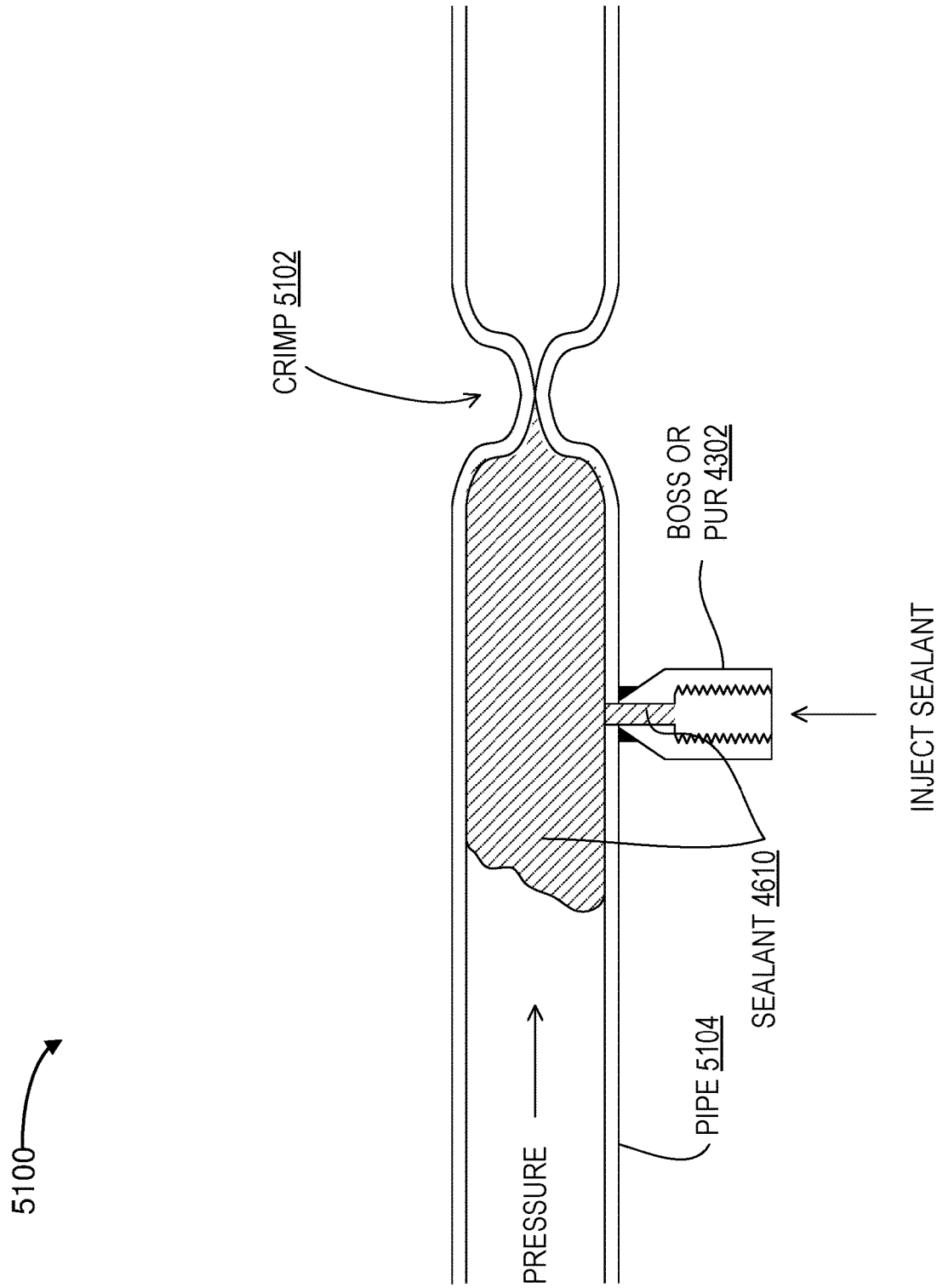
FIG. 51 is a cross section diagram of a pipe line kill using a crimp and sealant, according to an implementation.

FIG. 51 is a cross section diagram of a pipe line kill using a crimp and sealant 5100, according to an implementation. If a segment of a pipe 5104 is to be removed from operation while it is in operation, a crimp 5102 is made to kill the majority of chemical flow, according to an implementation. Then a boss or PUR 4302 is friction welded to the pipe 5104 upstream from the crimp 5102 and injection system 302 is attached to the boss or PUR 4302. A hole is drilled through the pipe 5104 using the injection system 302 to contain any leakage during the drilling and subsequent sealing process. Sealant 4610 is then injected into the pipe 5104 through injection system 302. Pressure from the chemical flow forces sealant into any leaks in the crimp 5102 stopping flow of chemical in the pipe 5104. A sealant 4610 that hardens with time may be beneficial in a crimp and sealant 5100. Though a specific ordering is suggested hereabove for making the crimp 5102, friction welding the boss or PUR 4302 to the pipe 5104 and drilling a hole through the pipe 5104, other orders could be used to successfully perform a pipe line kill.

Figure 52:
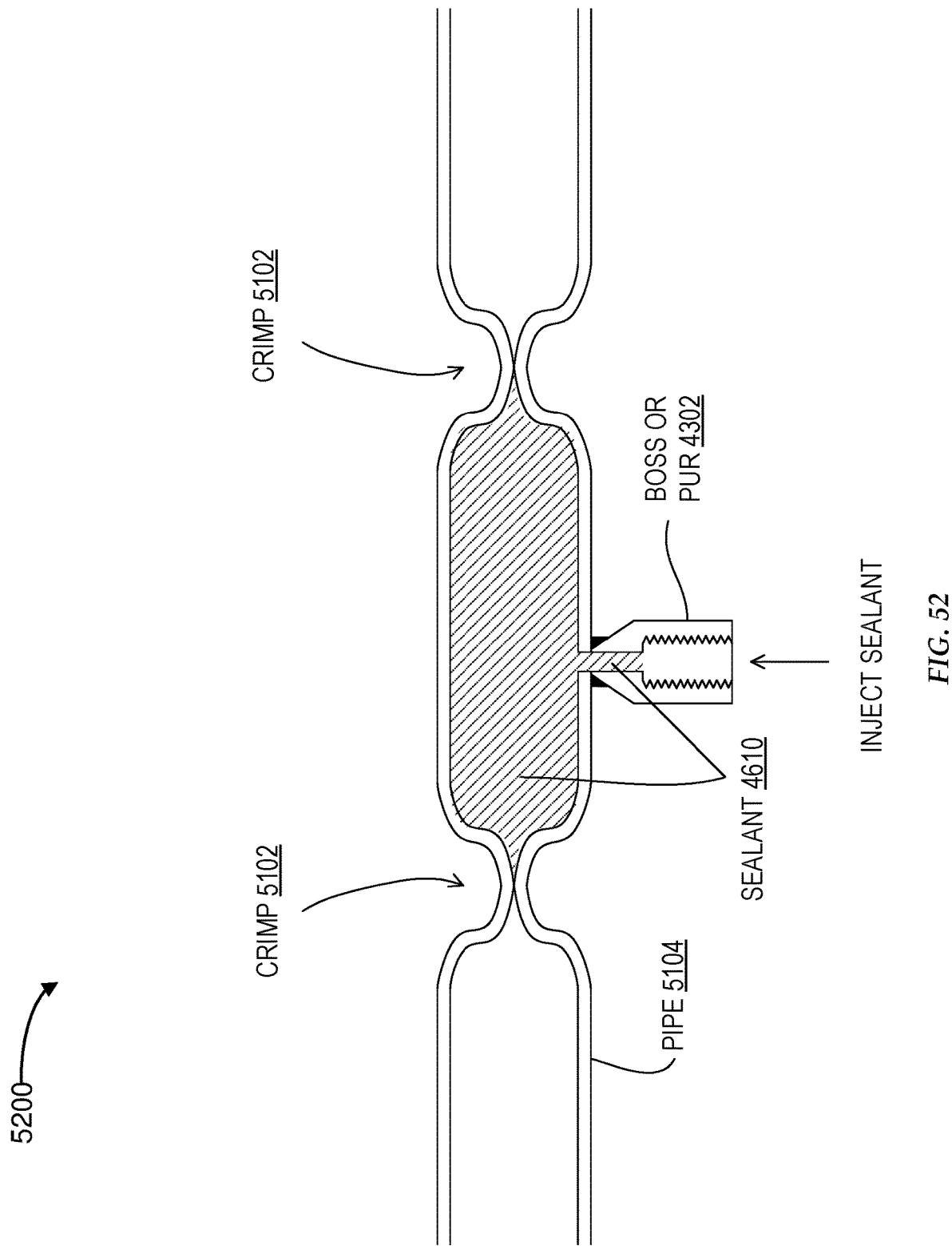
FIG. 52 is a cross section diagram of a pipe line kill using two crimps and sealant according to an implementation.

FIG. 52 is a cross section diagram of a pipe line kill using two crimps and sealant 5200, according to an implementation. When a segment of pipe 5104 is to be removed from operation while the pipe 5104 is in operation, two crimps 5102 are made to stop (i.e. kill) the chemical flow through the pipe 5104. Then a boss or PUR 4302 is friction welded between the crimps 5102 and injection system 302 is attached to the boss or PUR 4302. A hole is drilled through the pipe wall 5104 using the injection system 302 to contain any leakage during the drilling and subsequent seating process. Sealant 4610 is then injected between the crimps 5102 and into the pipe 5104 through injection system 302. Pressure from the sealant seals any leaks in the crimp 5102 stopping all flow of chemical in the pipe 5104. One advantage of this pipe line kill implementation is that leak sealing is independent of chemical pressure and a wider range of sealants would provide an adequate seal.

Figure 53:
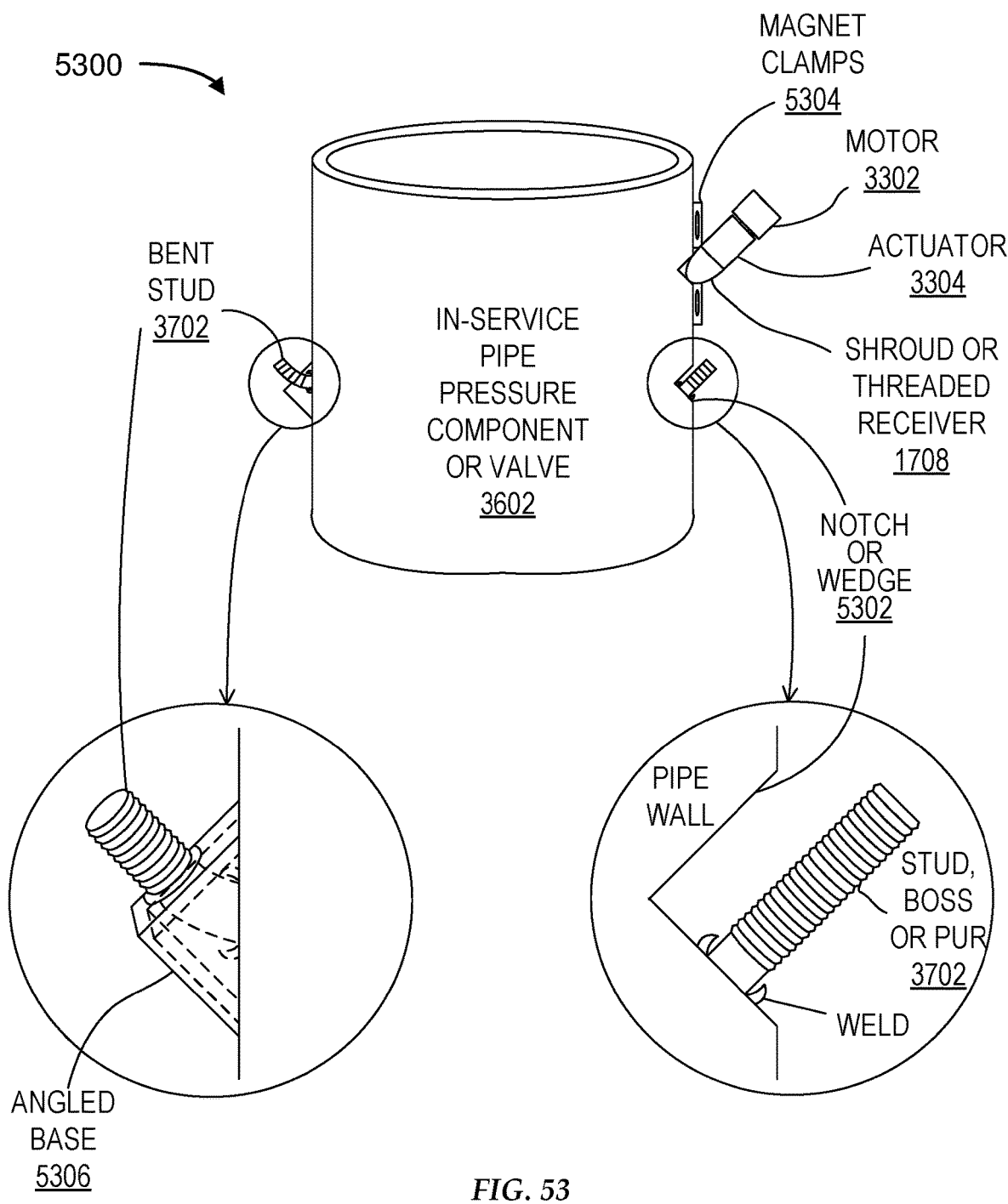
FIG. 53 is an isometric diagram of a non-perpendicular friction welded stud, boss or PUR, according to an implementation.

FIG. 53 is an isometric diagram of a non-perpendicular friction welded stud, boss or PUR, according to an implementation. Friction welding requires that the stud 3002, boss or PUR 3702 to be perpendicular to the surface during the welding process. To attach a stud 3002, boss or PUR 3702 non-perpendicular to the in-service pipe, pressure component or valve 3602, a notch or wedge 5302 can be cut at an angle that will position the stud 3002, boss or PUR 3702 at a desirable angle to the pipe, pressure component or valve 3602. This ensures that the stud 3002, boss or PUR 3702 is perpendicular to the weld surface while maintaining a desired angle with the pipe, pressure component or valve 3602. A modified magnet clamp 5304 is used to hold the actuator 3304, motor 3302 and chuck 3306 at the desirable angle during the friction welding process. The notch or wedge 5302 in the work surface must provide enough clearance to accommodate the chuck 3306, actuator 3304 and motor 3302. Another way to attach a boss or PUR 3702 that is not perpendicular to the pipe, pressure component or valve 5104 is to first, friction weld the stud 3702 perpendicular to the pipe, pressure component or valve 5104, bend the stud 3002 or boss 3702 to the desired angle using a hammer or hand tool and then attach an angled base 5306 over the stud 3002 as shown. Both of these non-perpendicular studs, bosses or PURs 3702 can be used to attach devices at any desirable angle.

Figure 54:
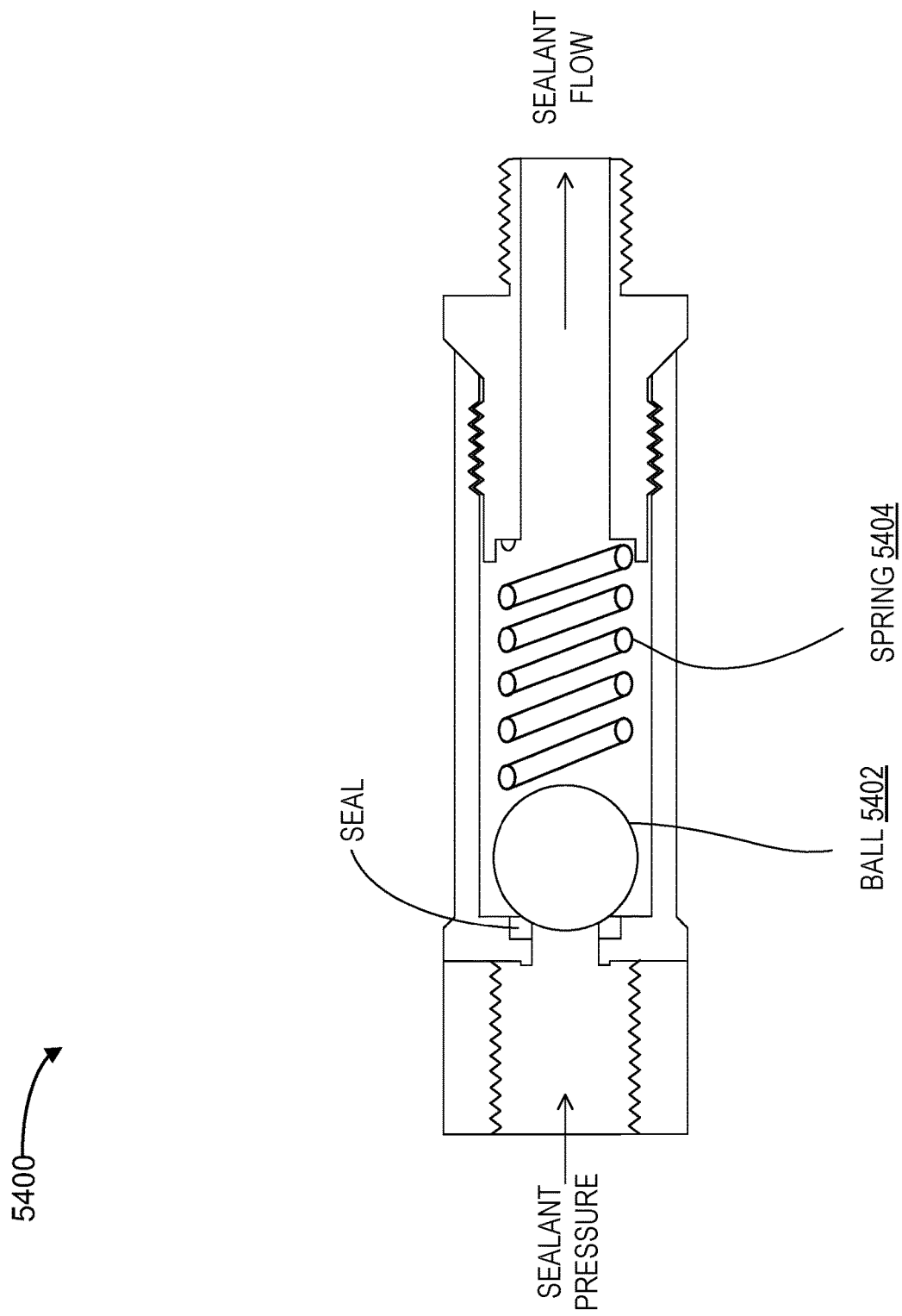
FIG. 54 is a cross section diagram of a ball and spring check valve isolation gate, according to an implementation.

FIG. 54 is a cross section diagram of a ball and spring check valve isolation gate 5400, according to an implementation. After a boss or PUR 4302 is friction welded to a work surface and a hole is drilled through the boss or PUR 4302 and the work surface, a ball and spring check valve isolation gate 5400 is attached to the boss or PUR 4302. A work surface may be a pipe, a pressure component or valve 3602. The ball 5402 and spring 5404 of the ball and spring check valve isolation gate 5400 allows sealant to flow in one direction through the hole in the boss or PUR 4302 and work surface, yet prevents sealant from flowing in the other direction. The ball and spring check valve isolation gate 5400 requires the drilling to be performed before the ban and spring check valve isolation gate 5400 is attached to the boss or PUR 4302.

Figure 55A:
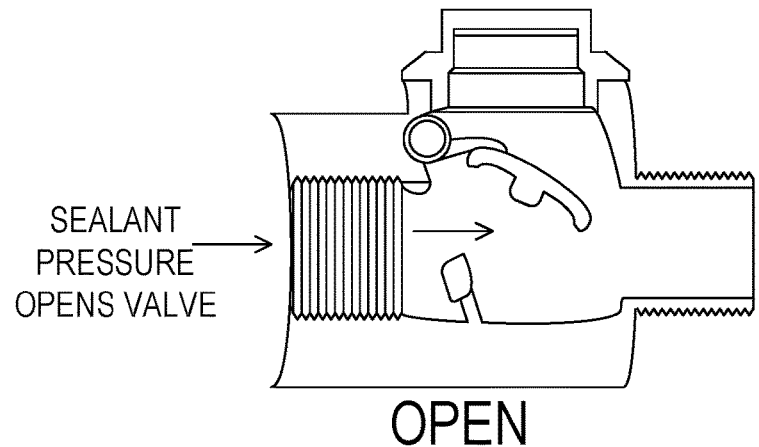
FIG. 55A and FIG. 55B are cross section diagrams of a flapper check valve isolation gate, according to an implementation.
Figure 55B:
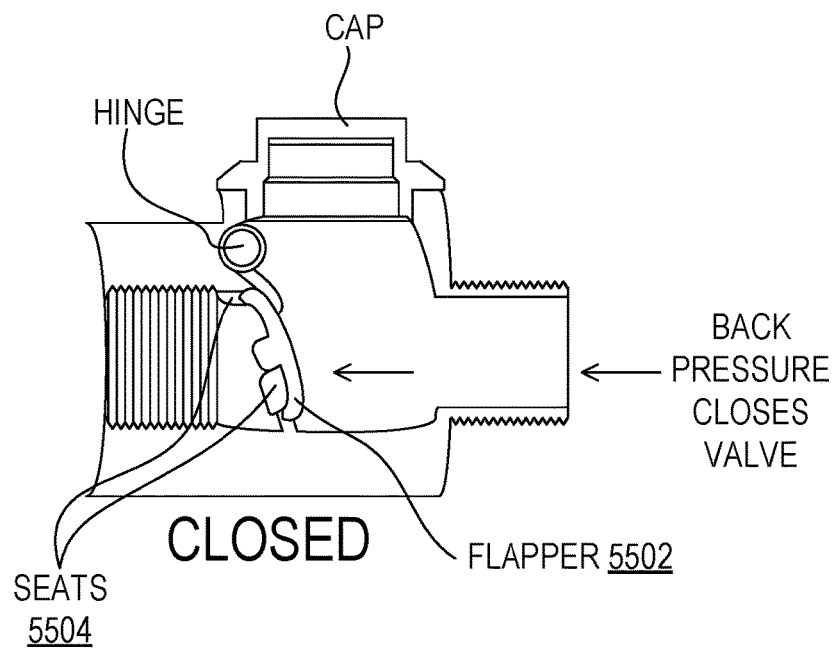

FIGS. 55A and 55B are cross section diagrams of a flapper check valve isolation gate 5500, according to an implementation. After a boss or PUR 4302 is friction welded to a work surface, the flapper check valve isolation gate 5500 is attached to the boss or PUR 4302. A hole is then drilled through the PUR 4302 and the wall of the work surface by passing the drill bit through the flapper check valve isolation gate 5500. As the drill bit passed through the flapper check valve isolation gate 5500, the flapper 5502 is pushed up and out of the way. The flapper check valve isolation gate 5500 allows sealant to flow in one direction through the hole in the boss or PUR 4302 and work surface, yet prevents sealant from flowing in the other direction. Gate seats 5504 form a seal between the flapper and gate body of flapper check valve isolation gate 5500. Flapper check valve isolation gate 5500 does not require the drilling to be performed before the flapper check valve isolation gate 5500 is attached to the PUR.

Figure 56:
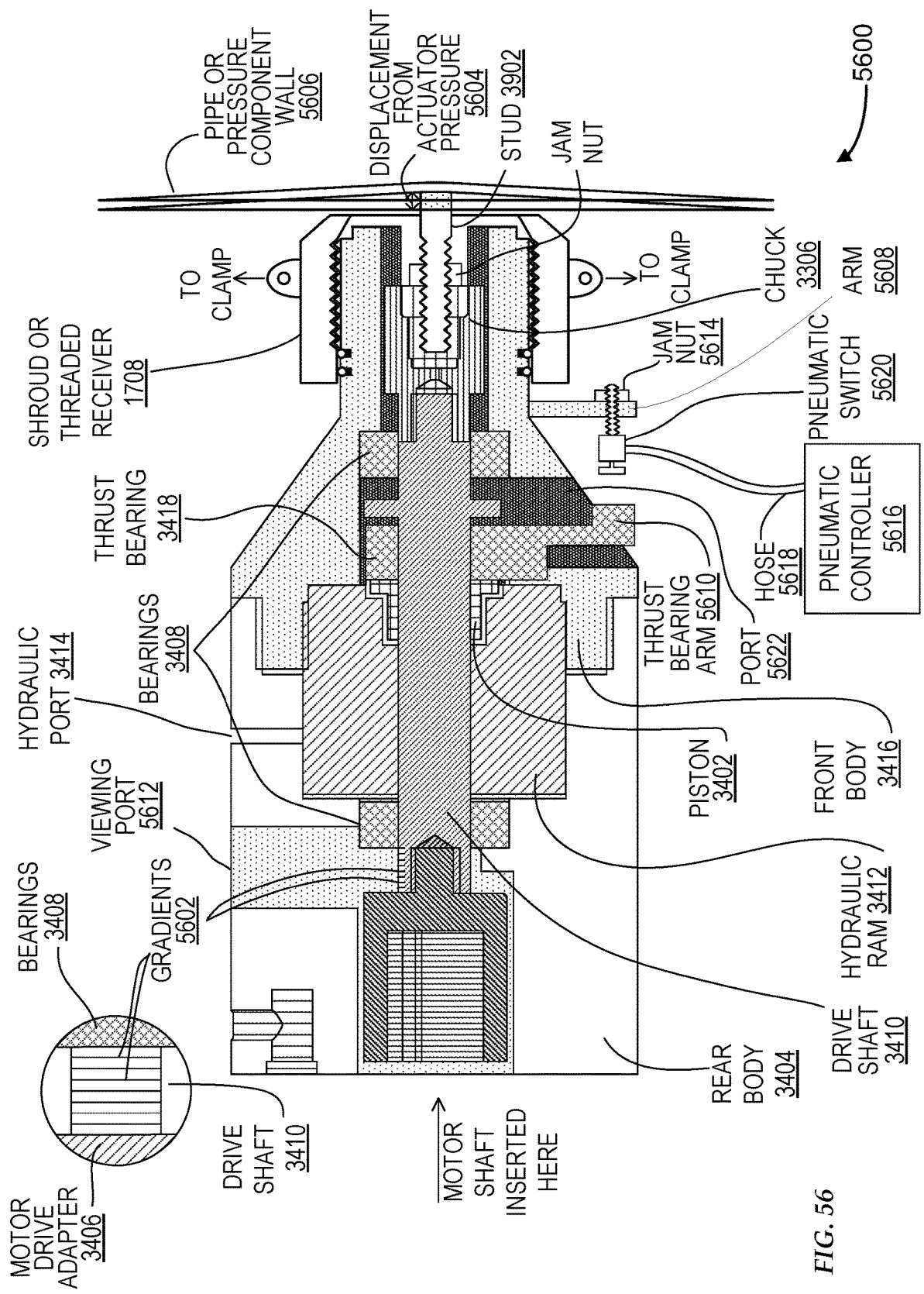
FIG. 56 is a cross section diagram of an apparatus for measuring, sensing and/or controlling stud or PUR displacement during the friction welding process, according to an implementation.

FIG. 56 is a cross section diagram of an apparatus 5600 for measuring, sensing and/or controlling stud or PUR displacement during the friction welding process, according to an implementation. As a boss or PUR 4302 is friction welded to a pipe or pressure component 5606, a portion of the boss or PUR 4302 is consumed by the weld. The consumption causes a displacement 5604 or reduction in length of the boss or PUR 4302 Also, as the actuator applies pressure to the pipe or pressure component 5606 through the boss or PUR 4302, the pipe or pressure component 5606 flexes causing excess displacement 5604. If the pipe or pressure component 5606 has thinned due to corrosion or wear such that it is at risk of punch through during the welding process, then it is desirable to indicate this to the operator or to prevent a large pressure from being applied or a weld from taking place. There is a need to measure or sense displacement 5604 of the boss or PUR 4302 in a friction welder. The apparatus in FIG. 56 includes two apparatus of measuring or sensing the displacement 5604 with one apparatus capable of controlling the friction welding process based on this displacement 5604. At the top left corner of FIG. 56 is a viewing port 5612 in rear body 3404. The viewing port 5612 exposes the drive shaft 3410. The drive shaft 3410 includes precision circumferential gradients 5602 that can be seen through the viewing port 5612. The precision circumferential gradients 5602 on drive shaft 3410 can be etched, cut, painted, inked or marked and must be accurately installed so that they appear relatively stationary as drive shaft 3410 rotates during a friction welding process. The precision circumferential gradients 5602 allow the displacement 5604 to be measured visually through the viewing port 5612. A crosshair (not shown) could be added in line with the viewing port 5612 to allow more accurate reading of the precision circumferential gradients 5602. In one application, the displacement caused by the actuator pressure on the pipe or pressure component 5606 is measured to determine the thickness and/or strength of the pipe or pressure component 5606. The pipe or pressure component 5606 thickness and strength are almost always known and a predetermined displacement will indicate the condition of the pipe or pressure component 5606. If corrosion has thinned the pipe or pressure component 5606 a larger amount of displacement 5604 than the predetermined amount of displacement 5604 will occur when pressure is applied by the actuator. In another application, the displacement 5604 is measured before and after the friction weld is complete to determine the amount of displacement 5604 that has occurred during a friction weld. This measurement can be used as feedback to the operator, allowing the operator to adjust the welding process to improve it. For example, if excess displacement 5604 occurs during a weld, the operator can reduce the axial pressure on the boss or PUR 4302, reduce the weld time or reduce the welder's rotational speed.

The apparatus in FIG. 56 includes another apparatus of measuring the displacement 5604 and controlling the friction welding process based on the measured displacement 5604. The apparatus in FIG. 56, also includes a pneumatic switch 5620 mounted to the body of the actuator through an arm 5608. Above and in line with the pneumatic switch 5620 is a thrust bearing arm 5610 extending off of the thrust bearing 3418 through a port 5622 cut in front body 3416. A jam nut 5614 locks the pneumatic switch 5620 in position at a predetermined distance from the thrust bearing arm 5610. Operably coupled to the pneumatic switch 5620 is a pneumatic controller 5616 that controls the welding process. As the thrust bearing 3418 is driven downwards, the thrust bearing arm 5610 presses the pneumatic switch 5620 which in turn shuts down the friction welding process. The friction welding process may also be shut down by disengaging the motor that drives the friction welder. In this way, a pneumatic switch 5620 can be used to measure displacement 5604 and control the friction welding process based on the measured displacement 5604. The pneumatic switch 5620 may generate a continually variable control signal and the pneumatic controller 5616 may be capable of receiving this continuously variable control signal through the hose 5618 from the pneumatic switch 5620, in yet another application, the pneumatic switch 5620 is used to shut down the welding process once the weld has reached a predetermined displacement or it could be used to slow the welding process by altering any number of weld parameters such as rotational speed or axial pressure as the pneumatic switch is activated.

Figure 57:
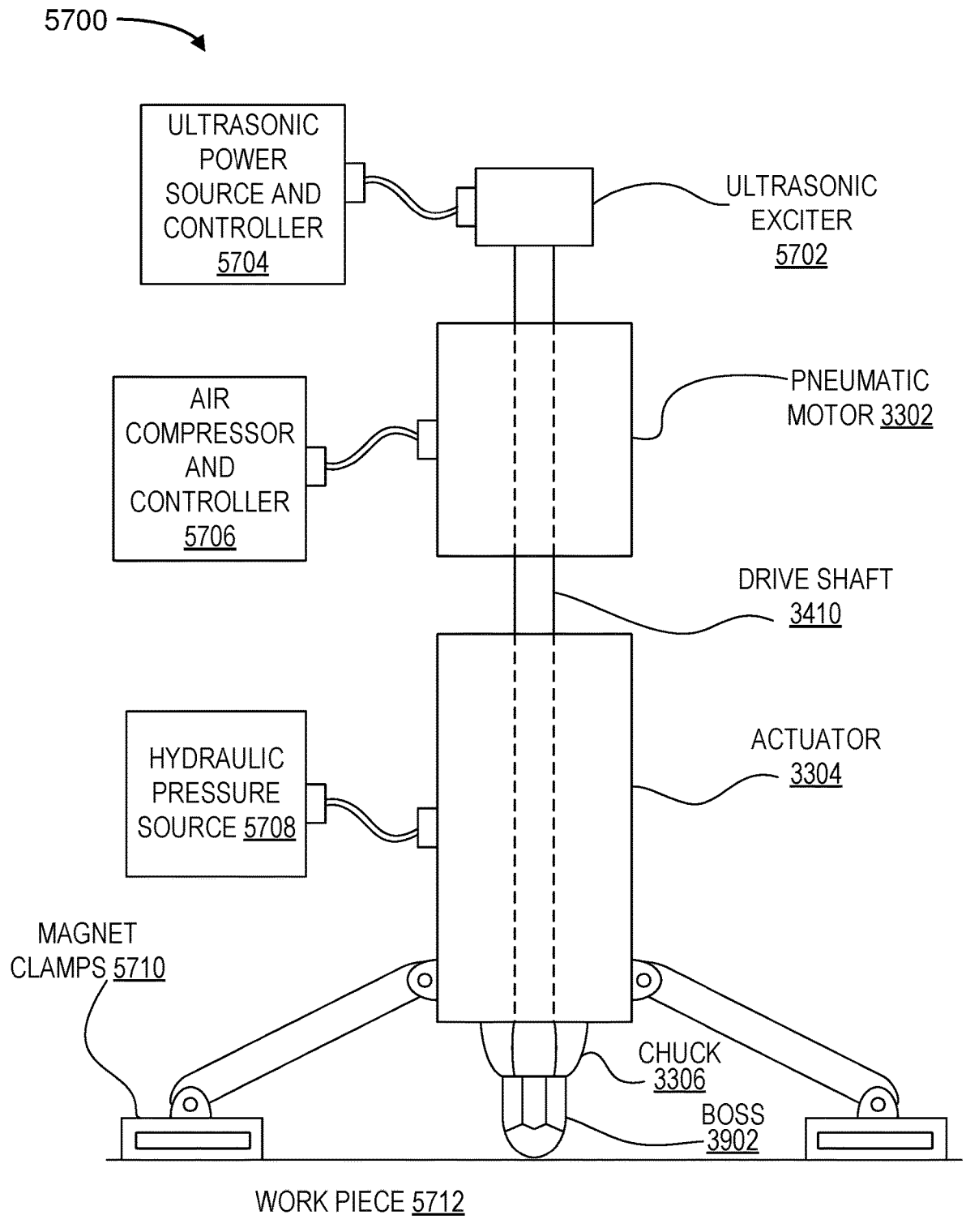
FIG. 57 is side-view diagram of an ultrasonic enhanced friction welder, according to an implementation.

FIG. 57 is side-view diagram of an ultrasonic enhanced friction welder 5700, according to an implementation. An ultrasonic exciter 5702, an ultrasonic power source and controller 5704 are added to the portable friction forge bonder (PFFB) 3300. The ultrasonic exciter 5702 is operably coupled to drive shaft 3410. By adding ultrasonic energy to the welding process, an enhanced weld can be achieved. The ultrasonic energy is transferred from the ultrasonic exciter 5702 down drive shaft 3410, through the pneumatic motor 3302, actuator 3304 and chuck 3306, down through the boss or PUR 4302 and into the work piece. This ultrasonic energy provides a stirring of the weld as it forms, creating a weld with a more homogenous metallurgical structure. In addition, the energy imparted by the ultrasonic exciter is additive with the rotational energy produced by the motor and transferred through the actuator 3304. This reduces the energy output requirement of the pneumatic motor 3302 and actuator 3304. An ultrasonic exciter 5702 is only one of many devices that can be attached to the friction welder to add mechanical vibrational energy to the welding process. Any type of vibrational energy could be used in place of the ultrasonic energy for improving the weld joint. The drive shaft 3410 could be solid or comprised of more than one piece connected together. If the drive shaft 3410 is more than one piece connected together, the connections would have to be capable of transferring the vibrational energy to the boss 3902. The ultrasonic exciter 5702 can also be placed between pneumatic motor 3302 and actuator 3304.

Figures 58A, 58B:
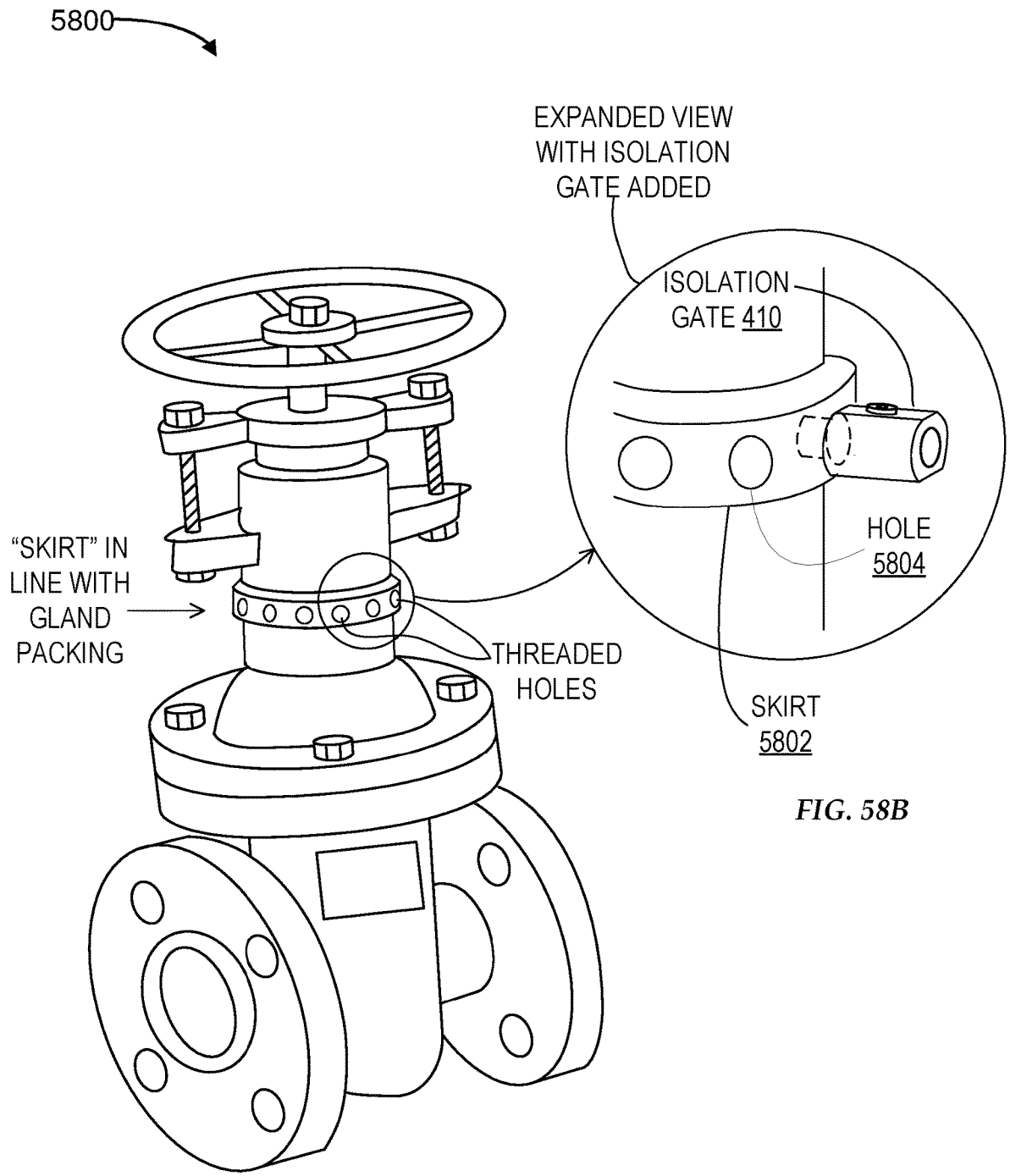
FIG. 58A is an injection port skirt for receiving an isolation gate to seal the valve, according to an implementation.
FIG. 58B is an isometric view of an injection port skirt for receiving an isolation gate to seal the valve, according to an implementation.

FIG. 58 is an isometric view of an injection port skirt for receiving an isolation gate to seal the valve 5800, according to an implementation. A skirt 5802 is added to a valve bonnet during, or after valve 5800 manufacturing. The skirt 5802 for receiving an isolation gate 410. Isolation gate 410 installed as part of an injection system 302 for sealing, the valve 5800. A single skirt hole 5804, multiple skirt holes or no skirt holes can be located around the skirt 5802. The skirt 5802 may or may not include threaded or non-threaded holes 5804 at a depth equal to the valve bonnet wall. Skirt hole 5804 threads match the threads on isolation gate 410. Hole 5804 threads sized to receive isolation gate 410. If valve 5800 needs to be sealed, a hole 5804 or holes are drilled into the skirt 5802 and then tapped if threaded holes do not already exist. Isolation gate 410 is then screwed into the threads along with the remainder of injection system 302. A hole is drilled through the valve bonnet wall using injection system 302 to contain chemical as described previously. Sealant is injected and an isolation gate 410 is closed all without releasing chemicals into the environment. The injection system 302 is removed while leaving the isolation gate 410 behind to contain leakage from the hole 5804. The skirt 5802 eliminates the need to friction weld a boss or PUR 4302 to the valve 5800, reducing the complexity, cost and hazards of sealing the valve 5800.

Figure 59:
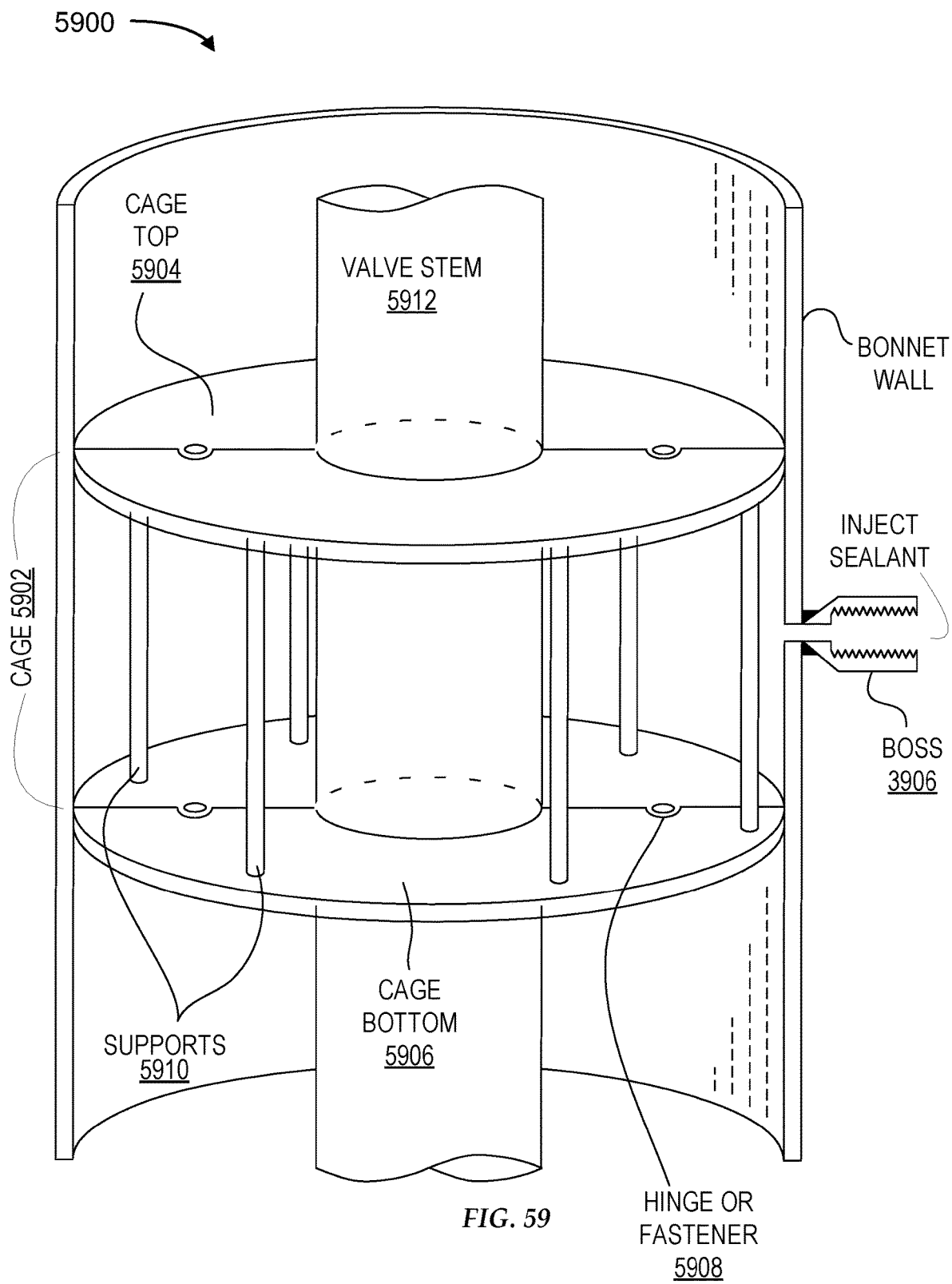
FIG. 59 is an isometric cross section view of a sealant cage for providing more space for injected sealant during a valve leak repair, according to an implementation.
Figure 60:
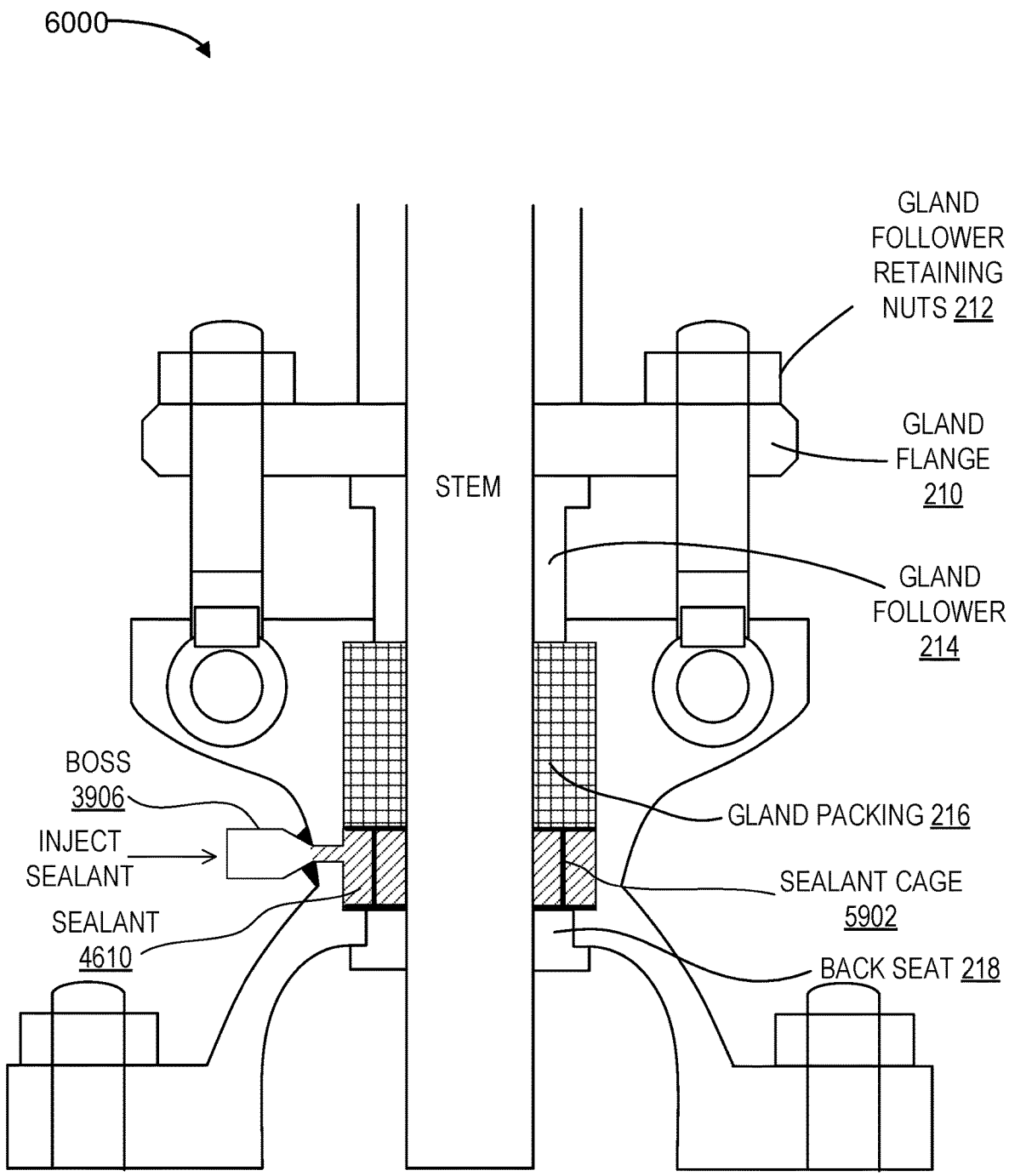
FIG. 60 is side view cross section block diagram of a valve that contains a sealant cage, according to an implementation.

FIG. 59 is an isometric view of a sealant cage 5900 for providing more space for injected sealant during a valve leak repair, according to an implementation. FIG. 60 is side view block diagram of a valve 6000 that contains a sealant cage 5902, according to an implementation. Frequently, when a valve leak is repaired, there is little room for the sealant 4610 to penetrate the circumference of gland packing 216. By installing the sealant cage 5902 in FIG. 59 into gland packing 216 as shown in FIG. 60, a space is reserved for sealant 4610 to be filled during a valve repair. The sealant cage 5902 can be added during manufacturing of the valve or during re-assembly of the valve after it has been taken apart for rebuilding. The sealant cage 5902 is made of two plates 5904 and 5906 and multiple supports 5910 that hold the two plates 5904 and 5906 apart. The plates 5904 and 5906 are doughnut shaped and may have hinges or fasteners 5908 to allow them to be split into two parts to make assembly around the valve stem 5912 easier. The sealant cage 5902 prevents material such as gland packing 216 from entering the space between the two plates 5904 and 5906. When repairing a leaking valve that contains a sealant cage 5902, a boss or PUR 4302 is installed just outside the valve wall from the space created by the sealant cage 5902. This alignment allows the injected sealant 4610 to easily enter the space within the sealant cage 5902 when the sealant 4610 is injected. The sealant cage 5902 can be made of any material or any number of materials such as metal, plastic, fiberglass, carbon fiber or any sturdy material.

Figure 61:
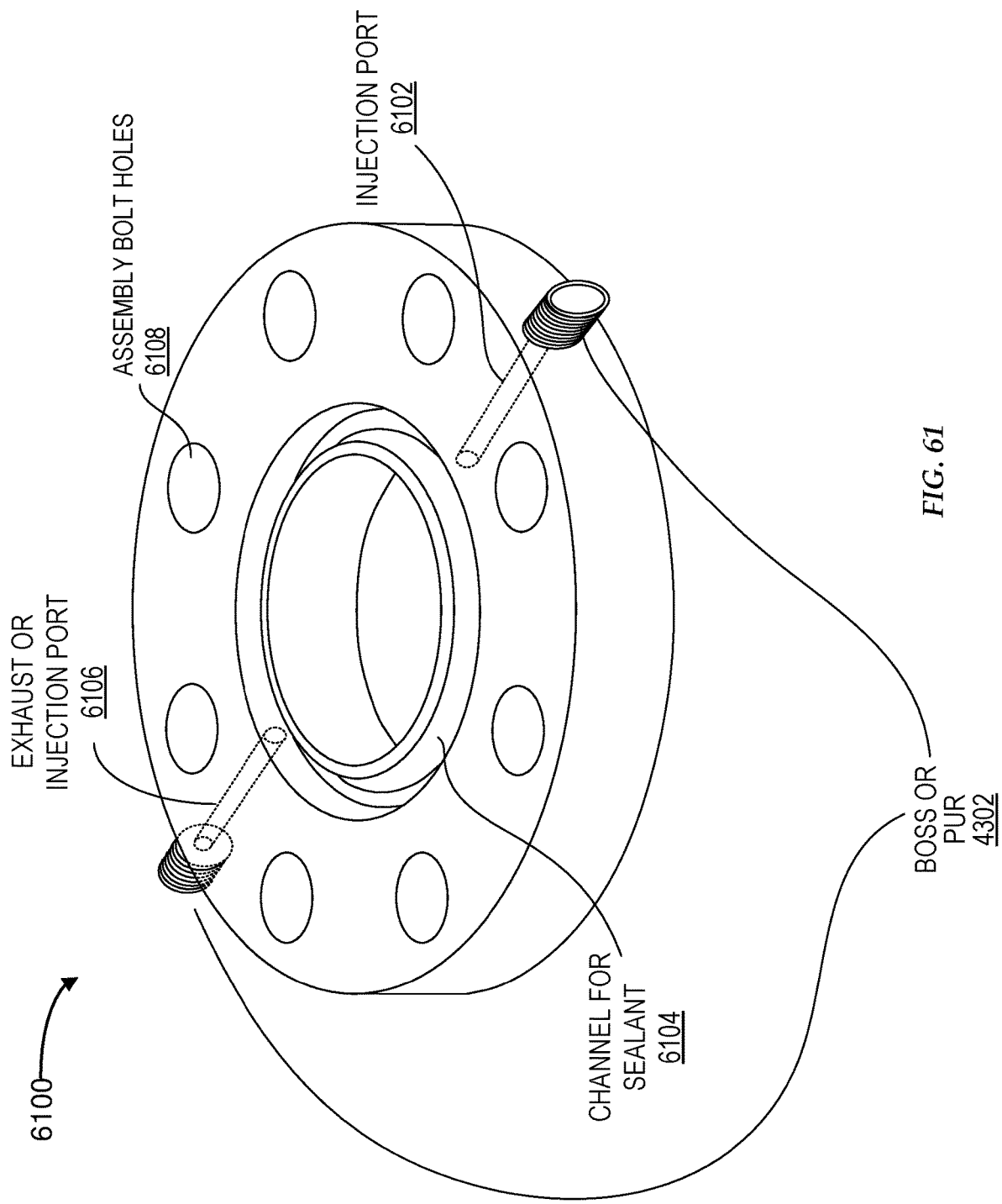
FIG. 61 is a cross section view of one-half of a pipe flange or valve flange with injection ports, according to an implementation.

FIG. 61 is a cross section view of one-half of a pipe or valve flange 6100, according to an implementation with injection ports. The flange 6100 has an injection port 6102, a channel 6104 for sealant 4610 and/or a gasket (not shown), a boss or PUR 4302, assembly bolt holes 6108 and exhaust or injection port 6106. To complete the flange 6100, the second-half of the flange (not shown) is operably coupled to the first half with bolts assembled through the assembly bolt holes 6108. The second-half of the flange (not labeled) is similar to the first-half of the flange 6100, but without the injection port 6102 and 6106 or bosses 4302. When the two halves of the flange 6100 are assembled, a gasket can be placed in the channel for sealant or it can be left empty. After the bolts are tightened, an injection system 302 is attached to the boss or PUR 4302 aligned with injection port 6102 and isolation gate 410 is attached to the other boss or PUR 4302. After injection system 302 is attached, sealant 4610 is injected into the channel 6104 for sealant 4610 in and around the gasket if one was installed. The boss or PUR 4302, with an isolation gate 410 attached, will act as a bleeder to allow chemical that has leaked into the channel 6104 for sealant 4610 to escape to avoid vapor lock. Isolation gate 401 is used to open or close chemical flow through the bleeder. Without this bleeder in some leaking flanges, there would be no room for the sealant 4610 in the channel 6104. A chemical trap or filter 4608 can be attached to isolation gate 401 as shown in FIG. 46 to displace chemicals from the channel 6104 for sealant 4610 during the injection process. The channel 6104 for sealant 4610 can be re-injected many times after the flange 6100 is installed before or during operation to repair leaks if necessary. Isolation gates 410 or set screws can be operably coupled to the bosses or PURs 4302 to keep them sealed after the injection process is complete. The bosses or PURs 4302 can be attached in the factory or in the field before or after assembly of the two flange halves.

FIG. 62A is a cross section view of an injectable flange gasket 6200, according to an implementation. FIG. 62B is an isometric view of an injectable flange gasket 6200, according to an implementation. An injectable flange gasket 6202 is used as a proactive solution to repair pipe flange leaks and is used in place of other flange gaskets and has an outer diameter that is approximately equal to the outer diameter of the two flange halves 6204. Injectable flange gasket 6202 is comprised of two gaskets, typically spiral wound gaskets 6206, a groove or channel 6208, a flange pipe 6210, bolt holes 6212, a boss or PUR 4302 that is operably coupled to the injectable flange gasket 6202 and a hole 6214 between the boss or PUR 4302 and the groove or channel 6208. The hole 6214 is aligned so that sealant 4610 can flow between the boss or boss 4302 and the groove or channel 6208. Once the injectable flange gasket 6202 is installed and bolted between the two flange halves 6204, injection system 302 can be operably coupled to the boss or PUR 4302. Injection system 302 can be used to inject sealant 4610 into the groove or channel 6208 upon assembly of the injectable flange gasket 6200 or after the injectable flange gasket 6200 begins to leak. The body of injectable flange gasket 6202 can be made from metal, a compound, a polymer or any material that would provide a good base for a gasket and that is capable of accepting a mounted boss or 4302.

FIG. 63 is an isometric view of a threaded cup containment device 6300 for adding a backup seal for the isolation gate 410, according to an implementation. After a valve is repaired and an isolation gate 410 is left in place, in time the gate or the threads between the isolation gate 410 and the boss 312 may start to leak. To contain this leak, a cup with thread 6302 can be mounted over the isolation gate 410 to provide a second layer or backup seal for the isolation gate 410. Before the isolation gate 410 is operably coupled to the boss 312, a cap 6304 is installed and held in place by the isolation gate 410. The threaded cup 6302 is installed over the isolation gate 410 and screwed into the cap 6304 with interior threads. This cup 6302 and cap 6304 assembly combination is used to collect any chemical leakage from the isolation gate 410. If the interface between the boss 312, cap 6304 and isolation gate 410 does not create a good seal, then washers with center holes about the diameter of the isolation gate 410 threads can be installed on each side of the cap 6304. The cup 6302 and cap 6304 can be made out of metal, carbon fiber, polymers, compounds or any material that is capable of providing a good seal with durability.

Figure 64A:
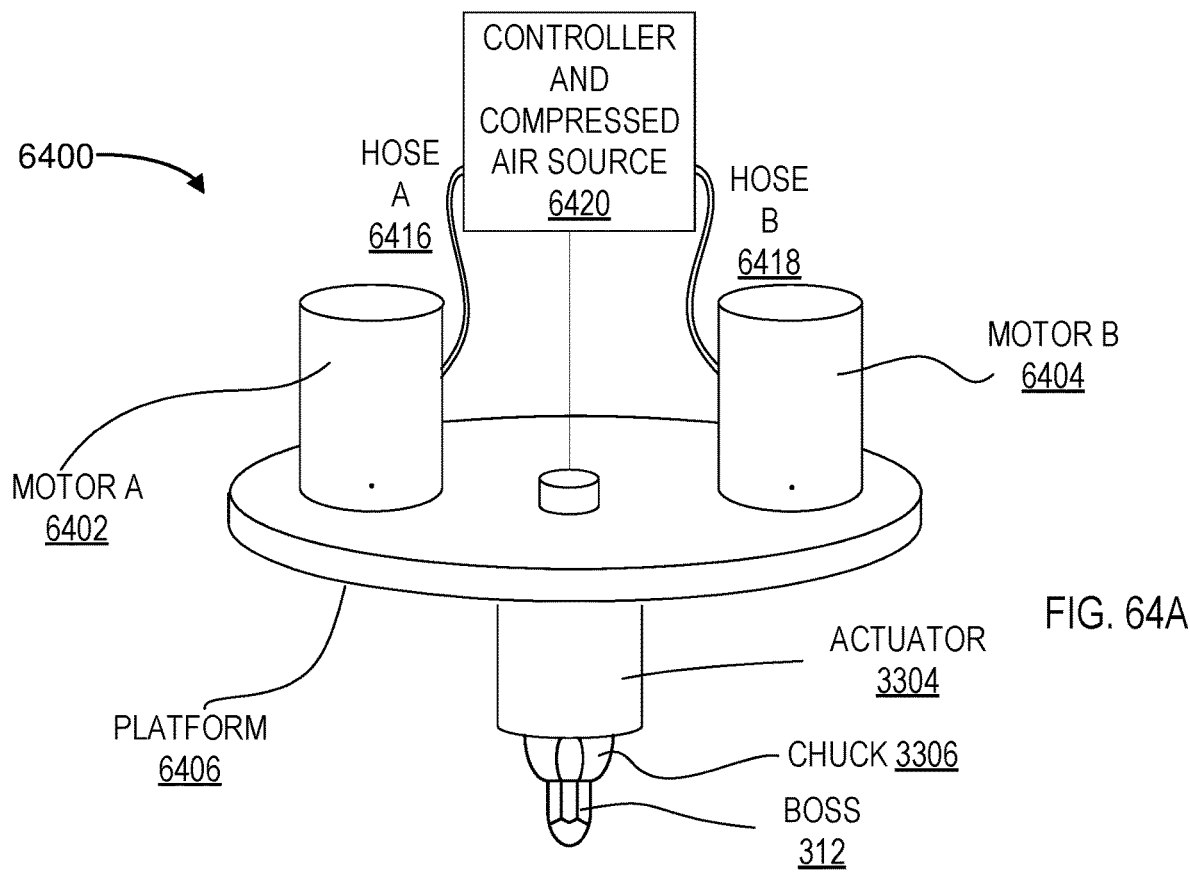
FIG. 64A is an isometric diagram of a multi-motor drive system for doubling the drive capability of a portable friction welding system, according to an implementation.
Figure 64B:
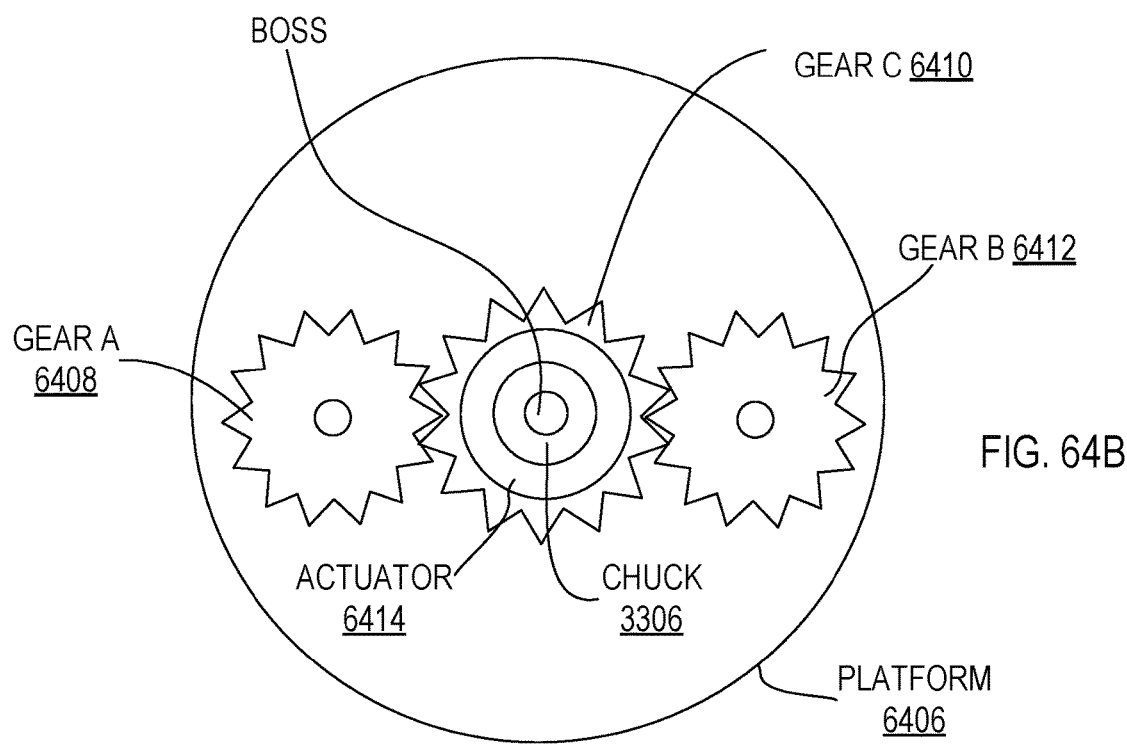
FIG. 64B is a bottom view block diagram of a multi-motor drive system for doubling the drive capability of a portable friction welding system, according to an implementation.

FIG. 64A is an isometric diagram of a multi-motor drive system for doubling the drive capability of a portable friction welding system 6400, according to an implementation. FIG. 64B is a bottom view block diagram of a multi-motor drive system for doubling the drive capability of a portable friction welding system 6400, according to an implementation. Motor A 6402 and motor B 6404 are mounted on a platform 6406. In some implementations, motors 6402 and 6404 are pneumatic motors. Gear A 6408 is connected to the end of the drive shaft of motor A 6402 on the bottom side of the platform 6406 and gear B is connected to the end of the drive shaft of motor B 6404 on the bottom side of the platform 6406. Gear C 6410 is meshed with gear A 6408 and gear B 6412 on the bottom side of the platform 6406 and connected to the drive shaft of the actuator 6414. The chuck 3306 is connected axially to the actuator 6414 and the boss 312 is mounted in the chuck 3306. Hose A 6416 and hose B 6418 connect a controller and a compressed air source 6420 to motor A 6402 and motor B 6404. When the controller and compressed air source 6420 activate motor A 6402 and motor B 6404, gear A 6408 and gear B 6412 drive gear C 6410 in the opposite rotational direction which in turn drives the actuator 3304 in that same opposite rotational direction. If gear A 6408, gear B 6412 and gear C 6410 are the same size, then the torque and horsepower transferred to the actuator will be double that of a single motor, which will allow a larger diameter stud or boss 312 to be friction welded to a work piece with a portable friction welder. Three or more motors could be added to the portable friction welding system 6400 to further to multiply the torque and horsepower transferred to the actuator 3304. Different gear ratios could be used multiply or divide the torque transferred from the motors 6402 and 6404 to the actuator 3304. For example, if gear A 6408 and gear B 6412 contain half the number of teeth as gear C 6410, torque transferred to the actuator 3304 would increase by a factor of two and the rotational speed would be reduce by a factor of two. Likewise, if gear A 6408 and gear B 6412 have more teeth than gear C 6410, torque would be decreased and rotational speed would be increased. It is necessary for the compressed air source 6420 to be capable of delivering twice the air volume at the same pressure as is necessary for driving a portable friction forge bonder (PFFB) 3300. A chain and sprocket or belt and sprocket drive mechanism can add together and transfer the energy from the motors 6402 and 6404 to the actuator 3304. A transmission, differential or any mechanical coupler could also be used in place of the gears 6408, 6410 and 6412 shown in FIG. 64B. Two separate controller and compressed air sources 6420 could be used, one controller with two compressed air sources or two controllers with one compressed air source. It should be obvious to one skilled in the art that other power sources and controllers could be used in place of the controller and compressed air source 6420 and different controllers could be used for controlling these differing power sources. If different controllers and power sources are use, different motors would also have to be used. For example if electric controllers and power sources are used, then electric motors must also be used.

Figure 65:
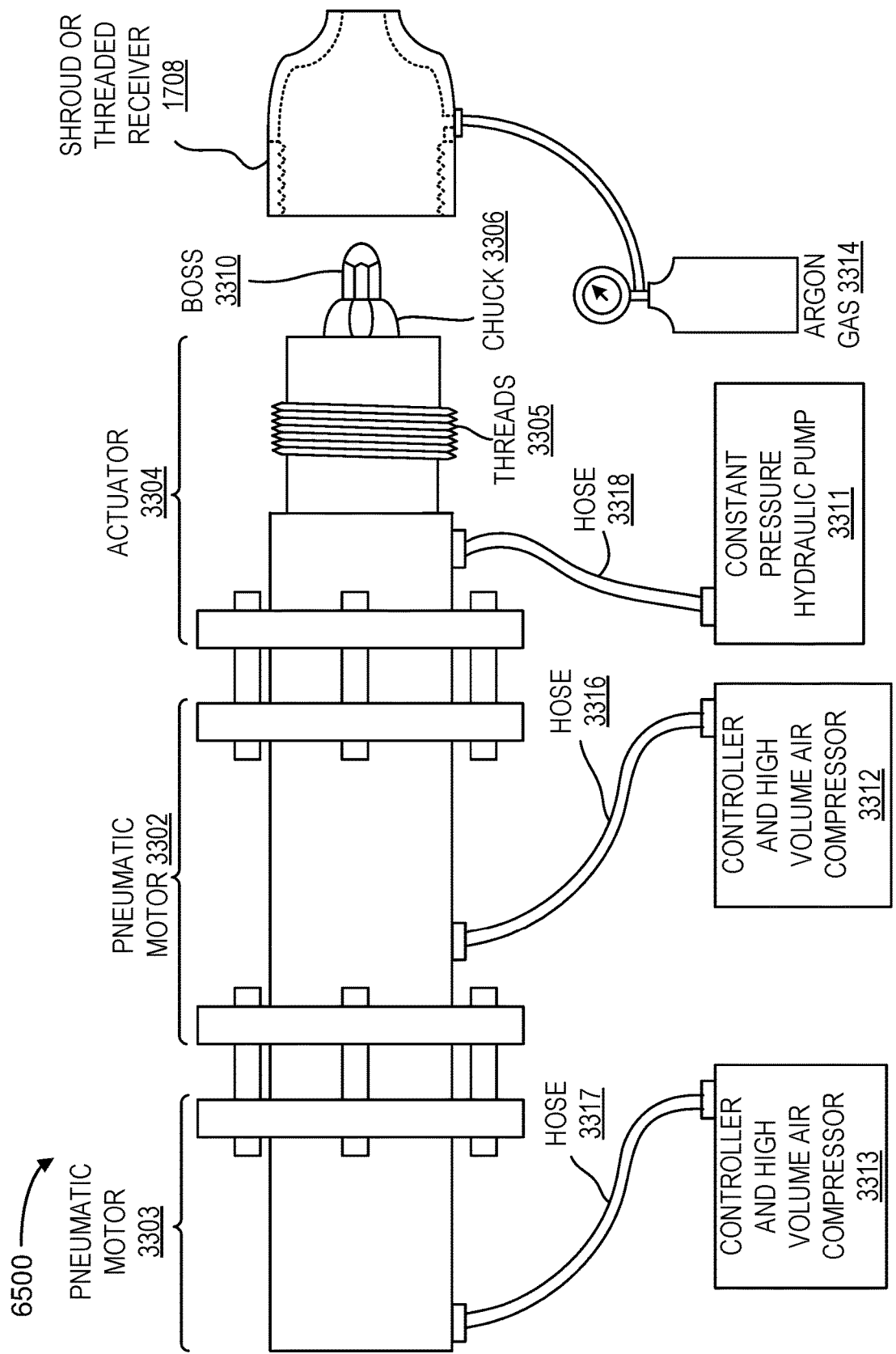
FIG. 65 is a block diagram of a multi-motor drive system for doubling the drive capability of a portable friction welding system, according to an implementation.

FIG. 65 is a block diagram of a multi-motor drive system for doubling the drive capability of a portable friction welding system, according to an implementation. Pneumatic motor 3302 and pneumatic motor 3303 are mounted together, axially aligned in a series configuration. The drive shaft of motor 3302 and motor 3303 are operably and axially coupled together. Motor 3302 is axially and operably coupled to one end of the actuator 3304 and the boss 3306 is operably and axially connected to the other end of the actuator 3304. A boss or boss 3310 is mounted in the chuck 3306 in preparation for a weld. Hose 3316 connects controller and high volume air compressor 3312 to motor 3302 and hose 3317 connects controller and high volume air compressor 3313 to motor 3303. Controller and high volume air compressor 3312 controls the flow of air to motor 3302 and controller and high volume air compressor 3313 controls the flow of air to motor 3303. The controller portion of controller and high volume air compressor 3312 and 3313 control the volume and pressure of air in an on and off manner. A more sophisticated controller could be used to vary the volume and/or pressure of air during the friction welding process. When controller and high volume air compressor 3312 and 3313 activate motor 3302 and motor 3303, the coupled drive shafts transfer the torque from motor 3302 and motor 3303 in the same rotational direction to drive the actuator 3304. Unlike the multi-motor drive system of FIG. 64, different gear ratios cannot be used without the addition of a gear box between motor 3302 and actuator 3304. Therefore, the torque and horsepower transferred to the actuator 3304 will be double that of a single motor, which will allow a larger diameter stud or boss 3310 to be friction welded to a work piece with a portable friction welder. Three or more motors could be added to this multi-motor drive system 6500 in series to further multiply the torque and horsepower transferred to the actuator 3304. It is necessary for the controller and high volume air compressor to be capable of delivering twice the air volume at the same pressure as is necessary for driving a two motor system. One controller and high volume air compressor could be used, one controller with two high volume air compressors or two controllers with one high volume air compressor. Other power sources and controllers could be used in place of the controller and high volume air compressor and different controllers could be used for controlling these differing power sources. If different power sources are use, different motors would also have to be used. For example if electric controllers and power sources are used, then electric motors must also be used.

In this disclosure, friction welding, friction bonding, solid-state welding, friction forging, friction forge bonding, friction forge welding, inertia welding and inertia bonding are all used synonymously. Boss and permanent universal receiver (PUR) are also used synonymously. MIG welding, TIG welding, GMAW, GTAW, FCAW, SMAW and arc welding are used synonymously in this disclosure.

A technical effect of the apparatus and methods of FIG. 3-65 is that positive pressure is provided into a pipe or valve, and the positive pressure significantly reduces or eliminates release of hazardous material from inside the valve or pipe and thus significantly reduces emission of the hazardous material from inside the pipe or valve into the environment endangering the technician and the environment. The injection system of FIGS. 3-6 and 9-10 is also known as a containment system because the positive pressure of the injection system contains the hazardous material within the valve or pipe.

The Abstract of the Disclosure is provided to comply with 37 C.F.R. § 1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

The invention claimed is:

1. An apparatus comprising:
   a pipe;
   a stud that is friction forge bonded to the pipe, creating a friction forge bonded stud;
   a bracket that is operably coupled to the friction forge bonded stud; and
   a ladder support that is operably coupled to the bracket.

2. The apparatus of claim 1 wherein the stud further comprises:
   a nut that is operably coupled to the stud.

3. The apparatus of claim 1 wherein the pipe further comprises:
   a vertical pipe.

4. The apparatus of claim 1 wherein the pipe further comprises:
   a horizontal pipe.

5. The apparatus of claim 1 wherein the pipe further comprises:
a pipe containing volatile materials.

6. An apparatus comprising:
a pipe;
a stud that is friction forge bonded to the pipe, creating a friction forge bonded stud;
a bracket that is operably coupled to the friction forge bonded stud; and
a ladder support that is operably coupled to the bracket.

7. The apparatus of claim 6 wherein the stud further comprises:
a nut that is operably coupled to the stud.

8. The apparatus of claim 6 wherein the pipe further comprises:
a vertical pipe.

9. The apparatus of claim 6 wherein the pipe further comprises:
a horizontal pipe.

10. The apparatus of claim 6 wherein the pipe further comprises:
a pipe containing volatile materials.

11. A method comprising:
friction forge bonding a stud to a pipe;
operably coupling a bracket to the stud; and
operably coupling a ladder support to the bracket.

12. The method of claim 11 wherein the stud further comprises:
a nut that is operably coupled to the stud.

13. The method of claim 11 wherein the pipe further comprises:
a vertical pipe.

14. The method of claim 11 wherein the pipe further comprises:
a horizontal pipe.

15. The method of claim 11 wherein the pipe further comprises:
a pipe containing volatile materials.

* * * * *